United States Patent
Yun et al.

(10) Patent No.: US 9,256,106 B2
(45) Date of Patent: Feb. 9, 2016

(54) LIQUID CRYSTAL DISPLAY

(71) Applicant: Samsung Display Co., Ltd., Yongin (KR)

(72) Inventors: Sung-Jae Yun, Hwaseong-si (KR); Hyun-Cheol Moon, Anyang-si (KR); Jae Hong Park, Seoul (KR); Oh Jeong Kwon, Hwaseong-si (KR); Hyeok Jin Lee, Seongnam-si (KR); Sang-Uk Lim, Yongin-si (KR); Jiang Shuai, Yongin-si (KR); Kyung Hye Park, Seongnam-si (KR); Joo Young Yoon, Seoul (KR); Kwang-Chul Jung, Seongnam-si (KR); Sang Cheol Shin, Yongin-si (KR); Joo Ae Youn, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 171 days.

(21) Appl. No.: 13/743,773

(22) Filed: Jan. 17, 2013

(65) Prior Publication Data

US 2013/0201432 A1    Aug. 8, 2013

(30) Foreign Application Priority Data

Feb. 7, 2012  (KR) .......................... 10-2012-0012564
Mar. 7, 2012  (KR) .......................... 10-2012-0023412

(51) Int. Cl.
| | | |
|---|---|---|
| *G02F 1/1337* | (2006.01) | |
| *G02F 1/1343* | (2006.01) | |
| *G02F 1/1339* | (2006.01) | |
| *G02F 1/1362* | (2006.01) | |

(52) U.S. Cl.
CPC .... *G02F 1/134309* (2013.01); *G02F 1/133707* (2013.01); *G02F 1/13394* (2013.01); *G02F 2001/134318* (2013.01); *G02F 2001/136222* (2013.01)

(58) Field of Classification Search
CPC ............. G02F 1/133707; G02F 2001/134318; G02F 1/134309
USPC .................................................. 349/129, 146
See application file for complete search history.

(56) References Cited

U.S. PATENT DOCUMENTS

| | | | |
|---|---|---|---|
| 5,309,264 A | 5/1994 | Lien et al. | |
| 6,342,938 B1 | 1/2002 | Song et al. | |
| 6,577,366 B1 * | 6/2003 | Kim et al. | 349/139 |
| 2006/0012741 A1 | 1/2006 | Mizusako | |
| 2007/0070273 A1 * | 3/2007 | Yoshida et al. | 349/114 |
| 2007/0211200 A1 * | 9/2007 | Lee et al. | 349/139 |
| 2010/0007837 A1 * | 1/2010 | Ham et al. | 349/139 |
| 2010/0053518 A1 * | 3/2010 | Jeong | G02F 1/133371 349/114 |

(Continued)

FOREIGN PATENT DOCUMENTS

| | | |
|---|---|---|
| KR | 10-0289535 | 2/2001 |
| KR | 10-2005-0097228 | 10/2005 |

(Continued)

Primary Examiner — Nathanael R Briggs
(74) Attorney, Agent, or Firm — H.C. Park & Associates, PLC

(57) ABSTRACT

A liquid crystal display includes: a first substrate; a pixel electrode disposed on the first substrate; a second substrate facing the first substrate; a common electrode disposed on the second substrate; and a liquid crystal layer disposed between the first substrate and the second substrate. The common electrode includes a first cross-shaped cutout overlapping the pixel electrode, and a second cutout parallel to an edge of the pixel electrode, the second cutout being separated from the edge of the pixel electrode.

45 Claims, 36 Drawing Sheets

(56) References Cited

U.S. PATENT DOCUMENTS

| | | |
|---|---|---|
| 2012/0281172 A1 | 11/2012 | Park et al. |
| 2012/0281173 A1 | 11/2012 | Kwon et al. |

FOREIGN PATENT DOCUMENTS

| | | |
|---|---|---|
| KR | 10-2006-0006529 | 1/2006 |
| KR | 10-0543040 | 1/2006 |
| KR | 10-2008-0087336 | 10/2008 |
| KR | 10-2012-0066339 | 6/2012 |
| KR | 10-2012-0067023 | 6/2012 |
| KR | 10-2012-0069381 | 6/2012 |
| KR | 10-2012-0124011 | 11/2012 |
| KR | 10-2012-0124012 | 11/2012 |

\* cited by examiner

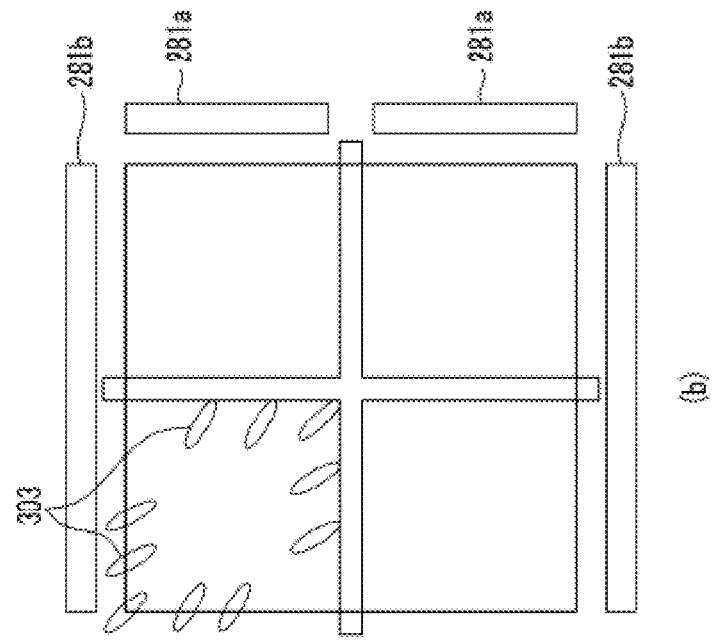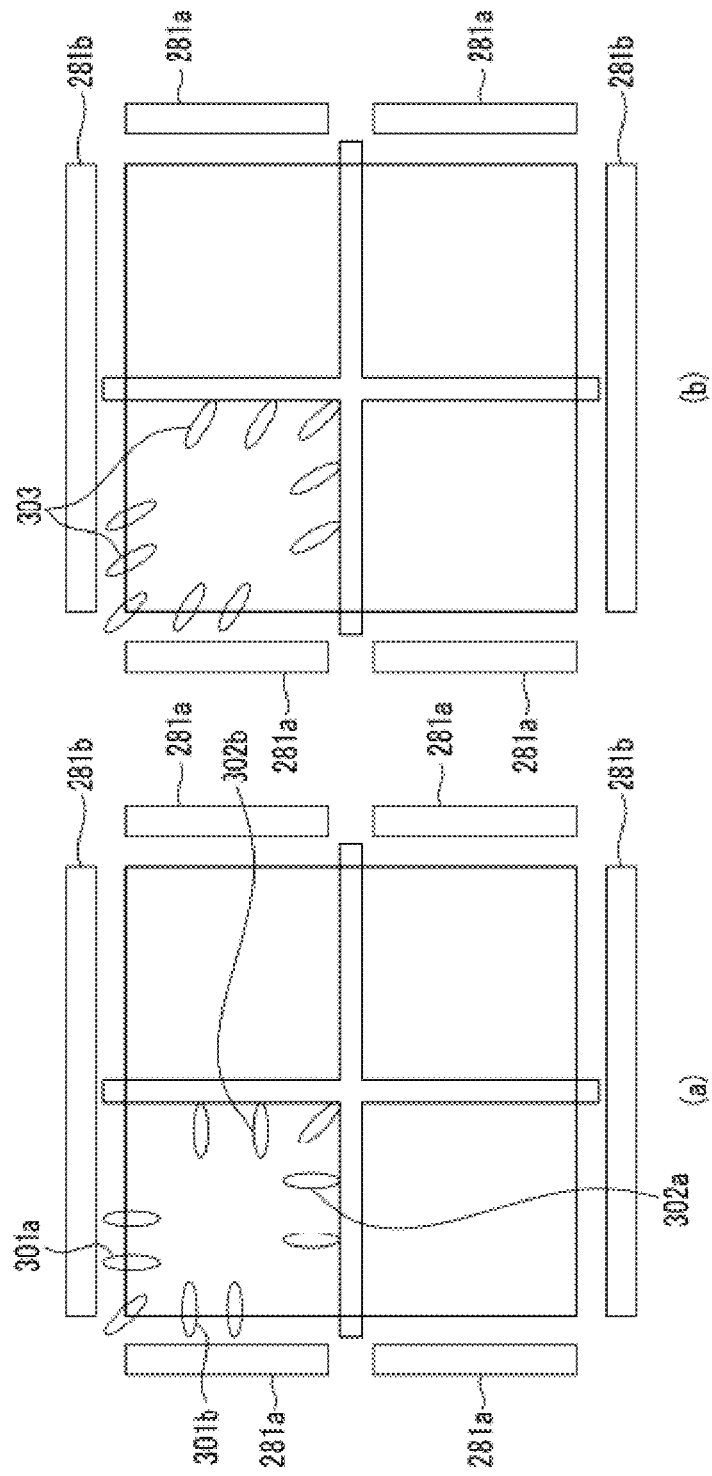

FIG.11
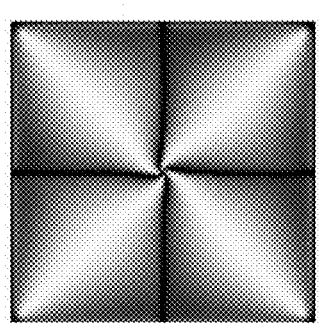
(a)
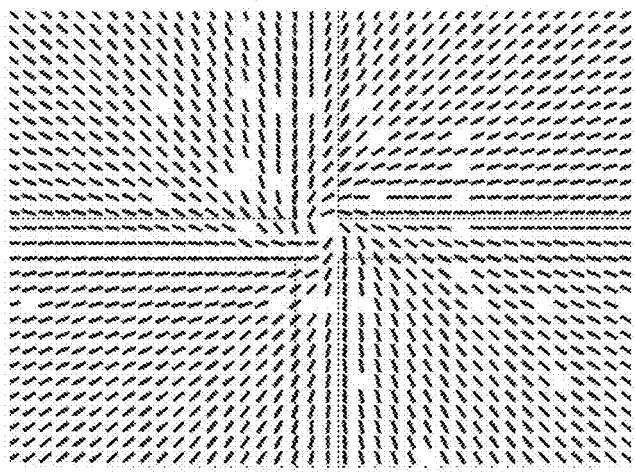
(b)
FIG.12
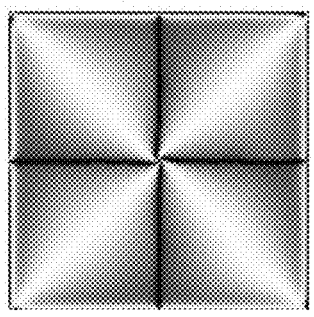
(a)
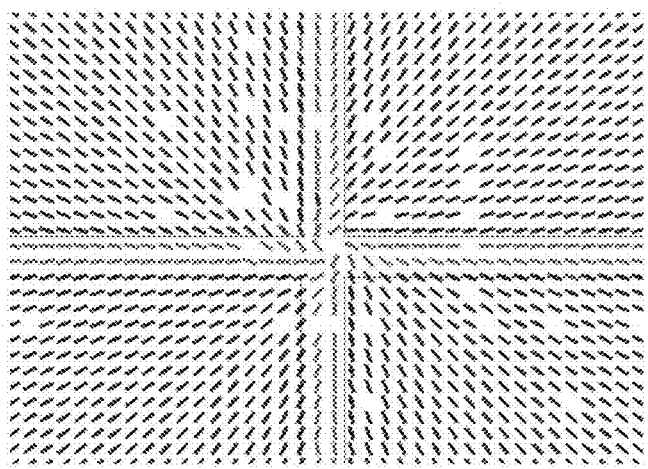
(b)

FIG.13
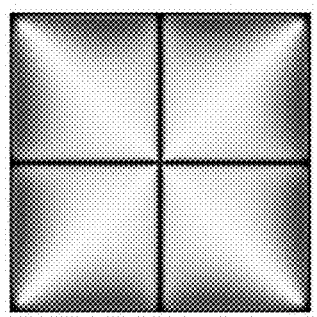
(a)
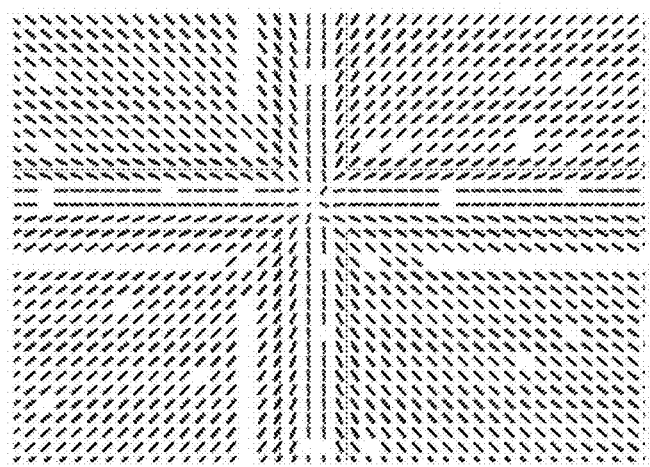
(b)
FIG.14
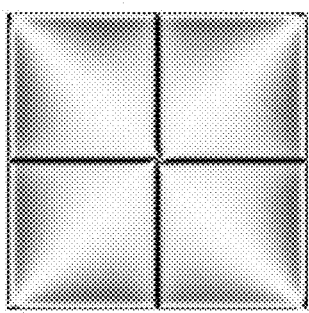
(a)
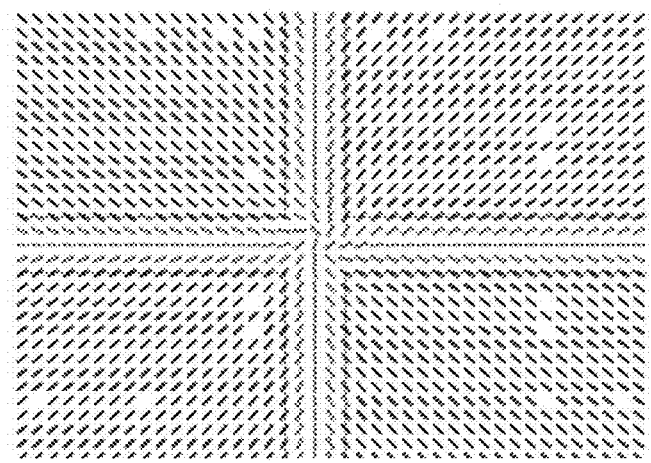
(b)

FIG.15
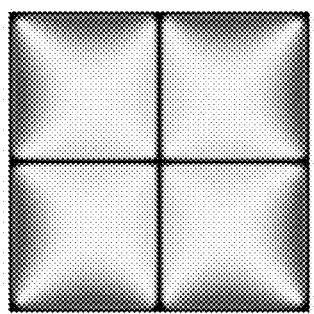
(a)
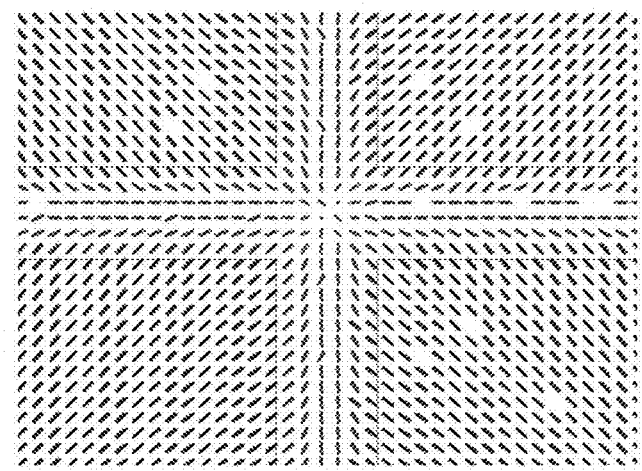
(b)
FIG.16
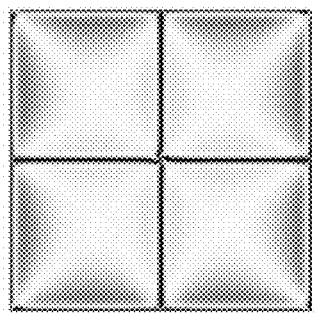
(a)
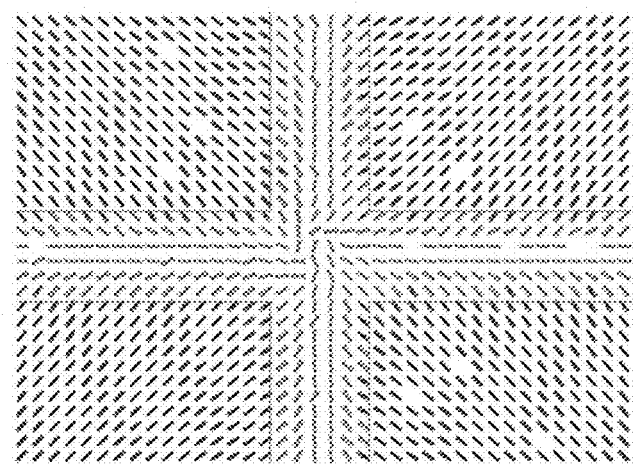
(b)

FIG.17
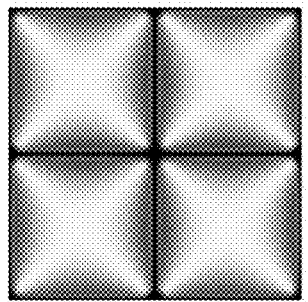
(a)
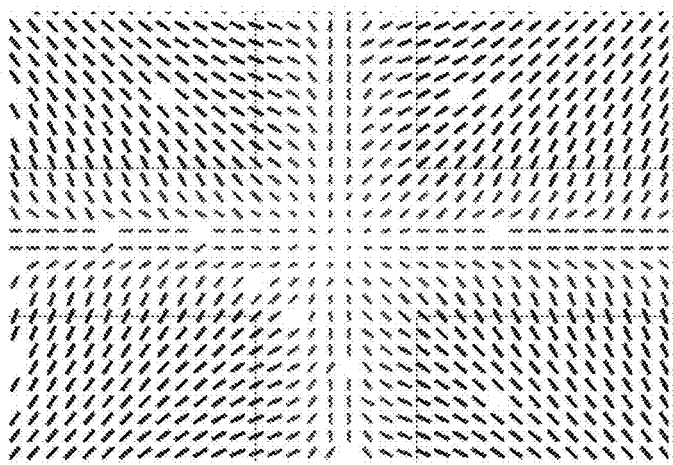
(b)
FIG.18
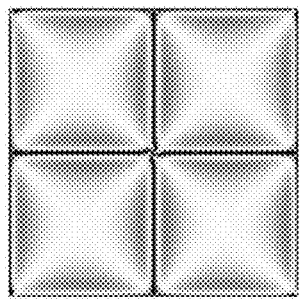
(a)
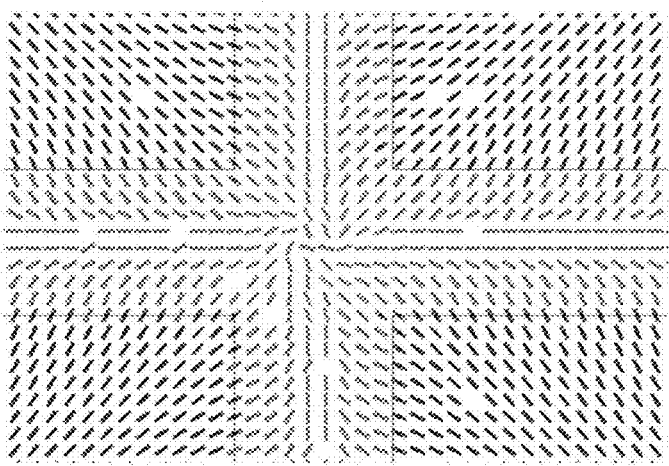
(b)

(a)

(b)

LIQUID CRYSTAL DISPLAY

CROSS-REFERENCE TO RELATED APPLICATIONS

This application claims priority from and the benefit of Korean Patent Application No. 10-2012-0012564, filed on Feb. 7, 2012, and Korean Patent Application No. 10-2012-0023412, filed Mar. 7, 2012, which are hereby incorporated by reference for all purposes as if fully set forth herein.

BACKGROUND

1. Field

The present invention relates to display technology, and more particularly to liquid crystal displays.

2. Discussion

Liquid crystal displays are a type of flat panel display that generally include two is display panels on which one or more field generating electrodes, such as a pixel electrode and a common electrode, are formed. A liquid crystal layer is typically disposed between the two display panels. Conventional liquid crystal displays present images by applying a voltage to one or more field generating electrodes to generate an electric field in the liquid crystal layer and, thereby, control one or more directions of the liquid crystal molecules of the liquid crystal layer, as well as one or more aspects of light radiating therethrough. For instance, a liquid crystal display may control the polarization of incident light via control of the liquid crystal layer.

In a vertically aligned (VA) mode liquid crystal display, the liquid crystal molecules of the liquid crystal layer are homeotropically orientated, i.e., the respective longitudinal axes of the liquid crystal molecules are aligned perpendicular to the display panels, when no electric field is applied to the liquid crystal layer. To enhance light viewing angles, cutouts, such as micro-slits, and protrusions may be formed in one or more of the field generating electrodes. Cutouts and protrusions affect the tilt direction of the liquid crystal molecules, such that a viewing angle may be broadened based on the disposition of the cutouts and protrusions, which can be utilized to disperse the tilt direction of the liquid crystal molecules in various directions. Typically when a plurality of branch electrodes are utilized and include a plurality of micro-slits on a pixel electrode, the cutout ratio is made lower than it would be in a standard non-branch electrode application.

Furthermore, when a plurality of domains is utilized in the liquid crystal layer to vary the tilt direction of the liquid crystal molecules with respect to different portions of the liquid crystal layer, display quality at (or near) the edge portions of the pixel electrode may be deteriorated. It is also noted that the utilization of a plurality of domains in the liquid crystal layer to vary the tilt direction of the liquid crystal molecules with respect to different portions of is the layer may deteriorate display quality between domains, e.g., in the domain interfaces.

Meanwhile, liquid crystal displays may be driven such that data voltage of the same polarity may be applied in a pixel column direction. In such instances, when a storage capacitance is to be charged in each pixel column, display quality may be deteriorated due to coupling effects between a voltage applied to a date line and a voltage applied to a common electrode. Typically, these coupling effects may be prevented (or at least reduced) via utilization of one or more shielding electrodes that are applied with the same voltage applied to the common electrode. Utilization of shielding electrode(s), however, may decrease the luminance of liquid crystal displays. Further, a short-circuit may occur between the shielding electrode and the data line, which may decrease liquid crystal display yield.

Therefore, there is a need for an approach that provides reliable, cost effective techniques to reduce the aperture ratio of a liquid crystal display, while also maintaining wide-viewing angles, quick response times, and high display quality.

The above information disclosed in this Background section is only for enhancement of understanding of the background of the invention, and therefore, it may contain information that does not form any part of the prior art nor what the prior art may suggest to a person of ordinary skill in the art.

SUMMARY

Exemplary embodiments provide a liquid crystal display configured to reduce the aperture ratio of the liquid crystal display, while maintaining wide viewing angles, quick response times, and high display quality. In this manner, exemplary embodiments enable the liquid crystal display to not only reduce (or prevent) display quality deterioration between domains, e.g., in the domain interfaces, but also reduce (or prevent) display quality deterioration at (or near) the edge portions of the pixel electrode. Furthermore, exemplary embodiments enable the liquid crystal display to maintain sufficient luminance levels by preventing (or reducing) coupling effects between a data line and a common electrode, which may further serves to increase liquid crystal display yield.

Additional aspects will be set forth in the detailed description which follows and, in part, will be apparent from the disclosure, or may be learned by practice of the invention.

According to exemplary embodiments, a liquid crystal display includes: a first substrate; a pixel electrode disposed on the first substrate; a second substrate facing the first substrate; a common electrode disposed on the second substrate; and a liquid crystal layer disposed between the first substrate and the second substrate. The common electrode includes: a first cross-shaped cutout overlapping the pixel electrode, and a second cutout parallel to an edge of the pixel electrode, the second cutout being separated from the edge of the pixel electrode.

When the width of the first cutout is W1 and the width of the second cutout is W2, W1 may be equal to or greater than W2.

W1 and W2 may satisfy $W2 \leq W1 \leq 2W2$.

The liquid crystal display further includes a data line connected to the pixel electrode, and at least a part of the second cutout may overlap the data line.

When the first substrate and the second substrate are viewed from above, an end portion of the first cutout may protrude further than the edge of the pixel electrode.

The liquid crystal display further includes a first alignment layer formed on the first substrate and a second alignment layer formed on the second substrate, and at least one of the liquid crystal layer, the first alignment layer, and the second alignment layer may include a photosensitive material.

Liquid crystal molecules of the liquid crystal layer may be arranged to be substantially perpendicular to the surface of the first and second substrates when no electric field is applied to the liquid crystal layer.

The liquid crystal molecules of the liquid crystal layer may be arranged to have a pretilt in a direction that is parallel with a direction toward a center portion of the first cutout of the common electrode from a portion where the edges of the pixel electrode meet each other.

The pixel electrode is divided into a plurality of subregions by the edge of the pixel electrode and the first cutout of the common electrode, and in each subregion, liquid crystal molecules of the liquid crystal layer may be arranged to have a pretilt in different directions.

The pixel electrode includes at least one cutout formed in a portion where two edges extending in different directions among the edges of the pixel electrode meet, and the cutout may be extended in a direction parallel with a direction toward a center portion of a second cutout of the common electrode from the portion where the two edges meet each other.

The width of the pixel electrode may be increased toward the center portion of the pixel electrode from the edges of the pixel electrode facing each other.

The pixel electrode may include a cutout adjacent to at least one of the edges of the pixel electrode and disposed along the edge in parallel therewith.

According to exemplary embodiments, a liquid crystal display includes: a first substrate; a pixel electrode disposed on the first substrate; a first alignment layer disposed on the first substrate and the pixel electrode; a second substrate facing the first substrate; a common electrode disposed on the second substrate; a second alignment layer disposed on the second substrate and the common electrode; and a liquid crystal layer disposed between the first substrate and the second substrate. At least one of the pixel electrode and the common electrode include a first cutout including a horizontal portion and a vertical portion, and the liquid crystal display further includes a first storage electrode overlapping the horizontal portion of the first cutout.

The pixel electrode includes a first subpixel electrode and a second subpixel electrode, the first cutout includes a first portion overlapping the first subpixel electrode and a second portion overlapping the second subpixel electrode, the first portion includes a first horizontal portion and a first vertical portion overlapping the first subpixel electrode, the second portion includes a second horizontal portion and second vertical portion overlapping the second subpixel electrode, and the first storage electrode may overlap at least one of the first horizontal portion and the second horizontal portion.

A voltage difference between the first subpixel electrode and the common electrode may be different from a voltage difference between the second subpixel electrode and the common electrode.

When the first substrate and the second substrate are viewed from above, an end portion of the first cutout may protrude further than the edge of the pixel electrode.

The pixel electrode may include a second cutout disposed adjacent to at least one of the edges of the pixel electrode and disposed along the edge in parallel therewith.

The second cutout may be disposed in a pixel displaying blue among a plurality of pixels.

At least one of the liquid crystal layer, the first alignment layer, and the second alignment layer may include a photosensitive material.

Liquid crystal molecules of the liquid crystal layer may be arranged to be is substantially perpendicular to the surface of the first and second substrates when no electric field is applied to the liquid crystal layer.

The liquid crystal molecules of the liquid crystal layer may be arranged to have a pretilt in a direction that is parallel with a direction toward a center portion of the first cutout from a portion where the edges of the pixel electrode meet each other.

The liquid crystal layer corresponding to the pixel electrode may be divided into a plurality of subregions by the edge of the pixel electrode, the first cutout, and the second cutout, and, in the subregion, liquid crystal molecules of the liquid crystal layer may be arranged to have a pretilt in different directions.

According to exemplary embodiments, it is possible to broaden a viewing angle of a liquid crystal display, as well as increase the response time, visibility, cutout ratio, and transmittance characteristics of the liquid crystal display. Further, exemplary embodiments make it possible to prevent (or reduce) deterioration of display quality at (or near) the edge portions of the pixel electrode and in the domain interfaces, as well as prevent (or reduce) deterioration of display quality due to reduced luminance levels of the liquid crystal display. To this end, exemplary embodiments also make it possible to prevent (or reduce) coupling effects between a data line and a common electrode, as well as increase liquid crystal display yields.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIGS. 6A and 6B schematically illustrate liquid crystal directions in the region of the field generating electrode of FIG. 3, according to exemplary embodiments.

FIGS. 11-18 are plan views illustrating transmittance of a liquid crystal display and alignment direction of liquid crystal molecules, according to exemplary embodiments.

DETAILED DESCRIPTION

Figure 1:
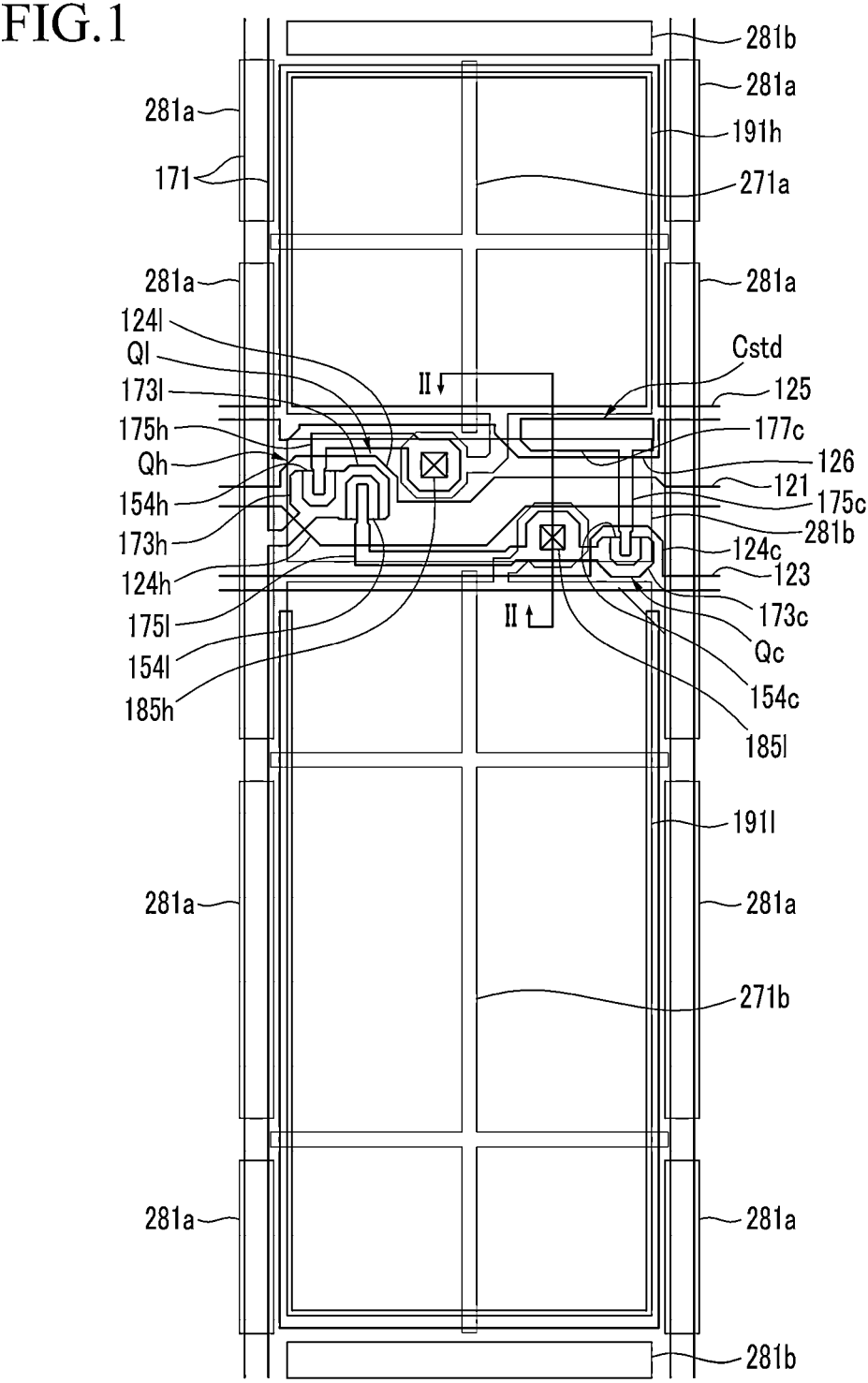
FIG. 1 is a layout view of a liquid crystal display, according to exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of various components, e.g., layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, directly connected to, or directly coupled to the other element or layer, or intervening elements or layers may be present. When, however, an element is referred to as being "directly on," "directly connected to," or "directly coupled to" another element or layer, there are no intervening elements or layers present. For the purposes of this disclosure, "at least one of X, Y, and Z" may be construed as X only, Y only, Z only, or any is combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, third, etc., may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section that is discussed below may be termed a second element, component, region, layer, or section without departing from the teachings of the present invention.

Spatially relative terms, such as "beneath," "below," "lower," "above," "upper," and/or the like, may be used herein for descriptive purposes and, thereby, to describe one element or feature's relationship to another element(s) or feature(s) as illustrated in the drawings. Spatially relative terms are intended to encompass different orientations of an apparatus in use or operation in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations) and, as such, the spatially relative descriptors used herein are to be interpreted accordingly.

The terminology used herein is for the purpose of describing particular embodiments only and is not intended to be limiting. As used herein, the singular forms "a," "an," and "the" are intended to include the plural forms as well, unless the context clearly indicates otherwise. Moreover, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Although exemplary embodiments are described in association with liquid crystal display (LCD) technology, it is contemplated that exemplary embodiments are applicable to other display technology, such as one or more self-emissive or non-self-emissive display technology, e.g., cathode ray tubes (CRTs), electrophoretic displays (EPDs), electrowetting displays (EWs), plasma display panels (PDPs), organic light emitting diodes (OLEDs), field emission displays (FEDs), and/or the like.

Figure 2:
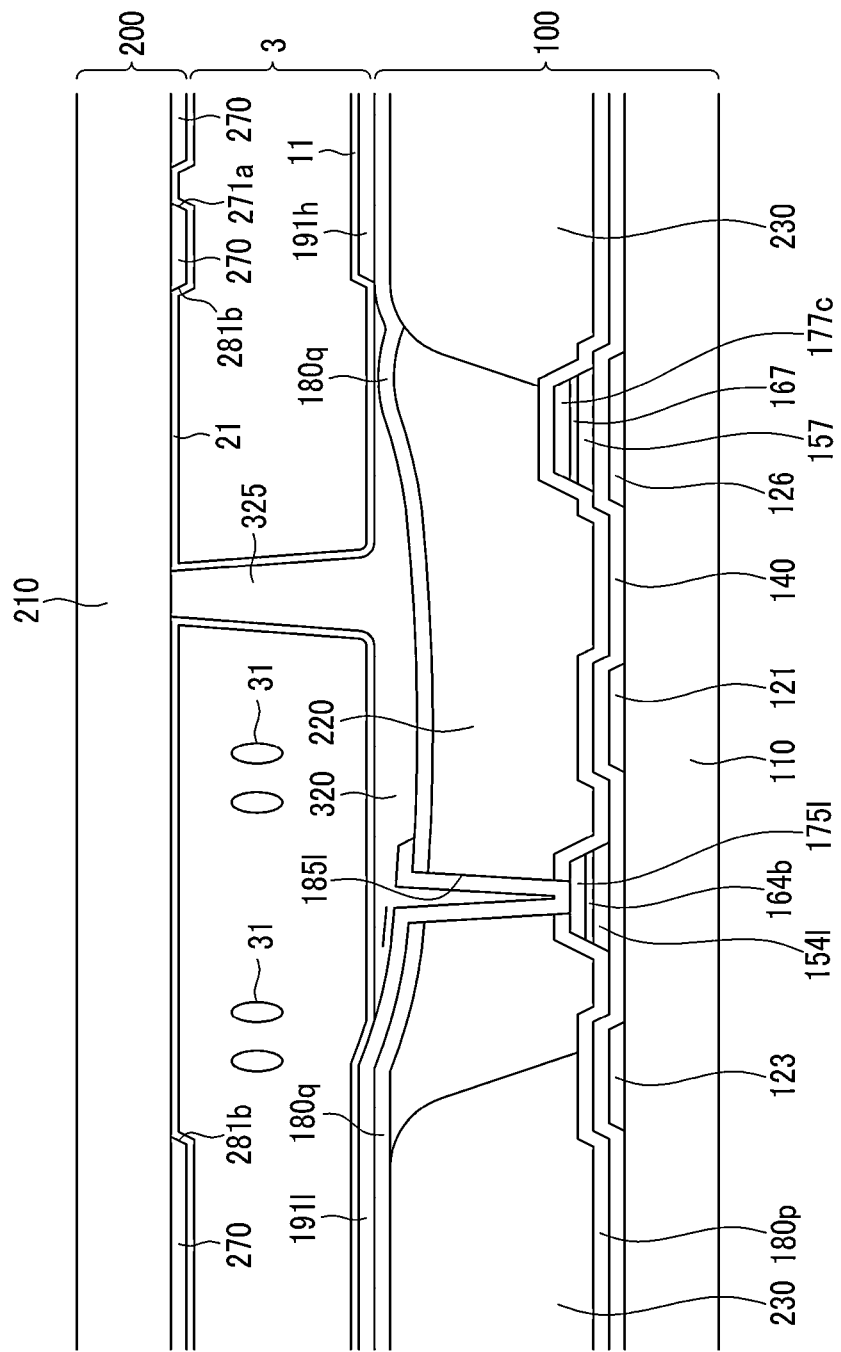
FIG. 2 is a cross-sectional view of the liquid crystal display of FIG. 1 taken along sectional line II-II, according to exemplary embodiments.
Figure 3:
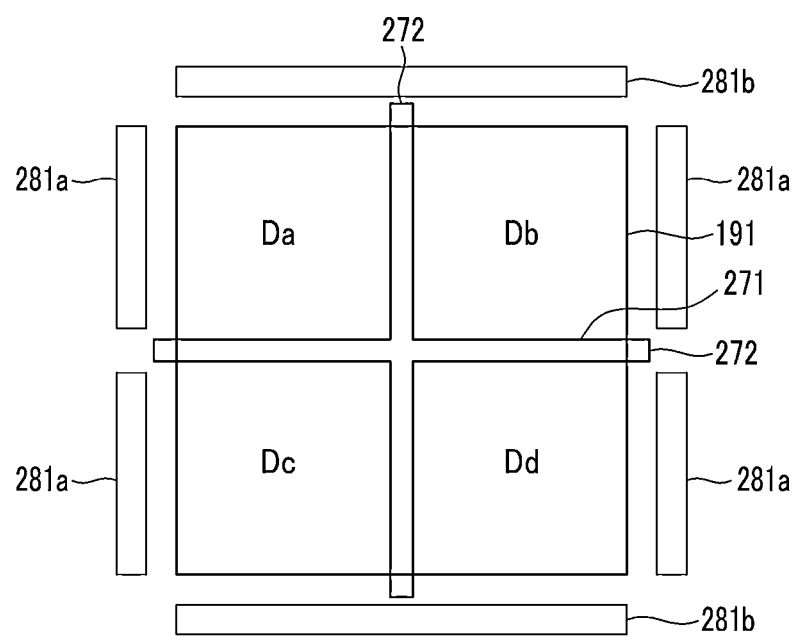
FIG. 3 is a plan view of a region of a field generating electrode of the liquid crystal display of FIG. 1, according to exemplary embodiments.
Figure 4:
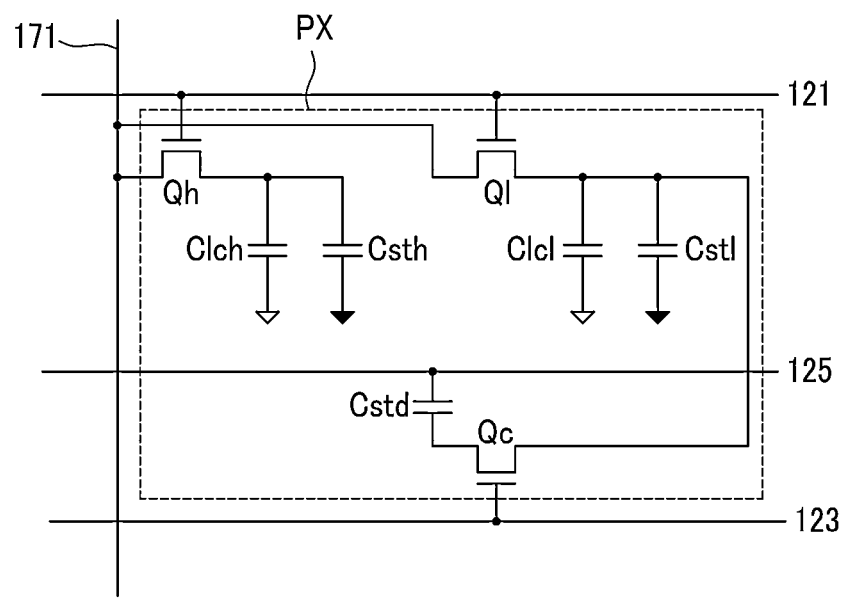
FIG. 4 is a schematic circuit diagram in a pixel region of the liquid crystal display of FIG. 1, according to exemplary embodiments.

FIG. 1 is a layout view of a liquid crystal display, according to exemplary embodiments. FIG. 2 is a cross-sectional view of the liquid crystal display of FIG. 1 taken along sectional line II-II, whereas FIG. 3 is a plan view of a region of a field generation electrode of the liquid crystal display of FIG. 1. FIG. 4 is a schematic circuit diagram in a pixel region of the liquid crystal display of FIG. 1, according to exemplary embodiments.

With reference to FIG. 4, a liquid crystal display includes a plurality of signal lines, such as a gate line 121, a storage electrode line 125, a voltage drop gate line 123, and a data line 171. A pixel PX is connected to the plurality of signal lines.

The pixel PX includes first, second, and third switching elements Qh, Ql, and Qc, first and second liquid crystal capacitors Clch and Clcl, first and second storage capacitors Csth and Cstl, and a voltage drop capacitor Cstd. It is noted that the first switching element Qh and a first thin film transistor Qh, the second switching element Ql and a second thin film transistor Ql, and the third switching element Qc and a third thin film transistor Qc are designated by the same reference symbols.

The first and second switching elements Qh and Ql are connected to the gate line 121 and the data line 171, respectively. The third switching element Qc is connected to the voltage drop gate line 123.

The first and second switching elements Qh and Ql may be three-terminal switching elements, such as a thin film transistor, which may be disposed in a lower panel 100. A control terminal of the first and second switching elements Qh and Ql is connected to the gate line 121, whereas an input terminal of elements Qh and Ql is connected to the data line 171. Output terminals of the first and second switching elements Qh and Ql are connected to the first and second liquid crystal capacitors Clch and Clcl, respectively, and the first and second storage capacitors Csth and Cstl, respectively.

The third switching element Qc may also be a three-terminal switching element, such as a thin-film transistor, which may be disposed in the lower panel 100. A control terminal of the third switching element Qc is connected to the voltage drop gate line 123, whereas an input terminal of element Qc is connected to the second liquid crystal capacitor Clcl and an output terminal of element Qc is connected to the voltage drop capacitor Cstd.

The first and second liquid crystal capacitors Clch and Clcl are formed by overlapping the first and second subpixel electrodes 191h and 191l (which are connected to the first and second switching elements Qh and Ql, respectively) and a common electrode 270 of an upper panel 200. The first and second storage capacitors Csth and Cstl are formed by overlapping a storage electrode and the storage electrode line 125 and the first and the second subpixel electrodes 191h and 191l.

The voltage drop capacitor Cstd is connected to the output terminal of the third switching element Qc and the storage electrode line 125, and is formed by overlapping the storage electrode line 125 and the output terminal of the third switching element Qc, which is disposed in the lower panel 100. It is noted that an insulator may be disposed between the storage electrode line 125 and the output of the third switching element Qc.

Adverting to FIGS. 1 and 2, the liquid crystal display further includes the lower panel 100, the upper panel 200, a liquid crystal layer 3 (disposed between the two panels 100 and 200), and a pair of polarizers (not shown) respective disposed on the outer surfaces of the panels 100 and 200. According to exemplary embodiments, the lower panel 100 and the upper panel 200 face one another.

Lower panel 100 includes a plurality of gate conductors, such as, for example, a plurality of gate lines 121, a plurality of voltage drop gate lines 123, and a plurality of storage electrode lines 125, which may be disposed on an insulation substrate 110.

The gate lines 121 and the voltage drop gate lines 123 substantially extend in a horizontal direction, and are configured to transmit gate signals. The gate line 121 includes a first gate electrode 124h and a second gate electrode 124l that protrude upward and downward, and the voltage drop gate line 123 includes a third gate electrode 124c that protrudes upward. The first gate electrode 124h and the second gate electrode 124l are connected to one another and form one protrusion portion.

The storage electrode line 125 substantially extends in a horizontal direction and is configured to transmit a predetermined voltage, such as a common voltage Vcom. The storage electrode line 125 includes a storage electrode that extends along at least one edge, and includes a capacitive electrode 126 extending downward.

A gate insulating layer 140 is disposed on the gate conductors 121, 123, and 125.

A plurality of semiconductor stripes, including semiconductors 154h, 154l, 154c, and 157 (that may be made of amorphous or crystalline silicon, and/or the like) are disposed on the gate insulating layer 140. The first and second semiconductors 154h and 154l extend toward the first and second gate electrodes 124h and 124l and are connected to one another, and the third semiconductor 154c is connected to the second semiconductor 154l. The third semiconductor 154c extends and, thereby, forms a fourth semiconductor 157.

A plurality of ohmic contacts 164b and 167 are disposed on the semiconductor stripes, such that a first ohmic contact (not shown) is disposed on the first semiconductor 154h, and the second ohmic contact 164b and a third ohmic contact (not shown) are disposed on the second semiconductor 154*l* and the third semiconductor 154*c*, respectively. The third ohmic contact extends and, thereby, forms the fourth ohmic contact 167.

A data conductor that includes a plurality of data lines 171, a plurality of first drain electrodes 175*h*, a plurality of second drain electrodes 175*l*, and a plurality of third drain electrodes 175*c* is disposed on the ohmic contacts 164*l* and 167.

The data line 171 is configured to transmit a data signal and substantially extends in a vertical direction and crosses the gate line 121 and the voltage drop gate line 123. Each data line 171 includes a first source electrode 173*h* and a second source electrode 173*l*. The first source electrode 173*h* and the second source electrode 173*l* are extended toward the first gate electrode 124*h* and the second gate electrode 124*l*, and are connected to one another.

The first drain electrode 175*h*, the second drain electrode 175*l*, and the third drain electrode 175*c* each include one wide end portion and another rod-shaped end portion. The respective rod-shaped end portions of the first drain electrode 175*h* and the second drain electrode 175*l* are partially surrounded by the first source electrode 173*h* and the second source electrode 173*l*. The wide end portion of the second drain electrode 175*l* extends to form a U-shaped third source electrode 173*c*. An extending portion 177*c* of the third drain electrode 175*c* overlaps the capacitive electrode 126 and, thereby, forms the voltage drop capacitor Cstd. The rod-shaped end portion is partially surrounded by the third source electrode 173*c*.

The first, second, and third gate electrodes 124*h*, 124*l*, and 124*c*, the first, second, and third source electrodes 173*h*, 173*l*, and 173*c*, the first, second, and third drain electrodes 175*h*, 175*l*, and 175*c*, and the first, second, and third semiconductors 154*h*, 154*l*, and 154*c* form first, second, and third thin film transistors (TFT) Qh, Ql and Qc. A channel is formed in each of the semiconductors 154*h*, 154*l*, and 154*c* between each of the source electrodes 173*h*, 173*l*, and 173*c* and each of the drain electrodes 175*h*, 175*l*, and 175*c*.

The semiconductors 154*h*, 154*l*, and 154*c* may have substantially the same flat surface shape as the data conductors 171, 175*h*, 175*l*, and 175*c* and the ohmic contacts 164*l* and 167. It is noted, however, that the surface of the semiconductors 154*h*, 154*l*, and 154*c* may include a channel region between the source electrodes 173*h*, 173*l*, and 173*c* and the drain electrodes 175*h*, 175*l*, and 175*c*. That is, respective spaces are disposed between the source electrodes 173*h*, 173*l*, and 173*c* and the drain electrodes 175*h*, 175*l*, and 175*c*, and an exposed portion is not covered by the data conductors 171, 175*h*, 175*l*, and 175*c* in the semiconductor stripes, including the semiconductors 154*h*, 154*l*, and 154*c*.

A lower passivation layer 180*p* that may be made of an inorganic insulator, such as silicon nitride or silicon oxide, is disposed on the data conductors 171, 175*h*, 175*l*, and 175*c* and the exposed portion of the semiconductors 154*h*, 154*l*, and 154*c*.

A color filter 230 is disposed on the lower passivation layer 180*p*. The color filter 230 is disposed in most regions other than regions in which the first thin film transistor Qh, the second thin film transistor Ql, and the third thin film transistor Qc are disposed. It is noted, however, that the color filter 230 may be disposed in the upper panel 200, or may longitudinally extend in a vertical direction along the space between the data lines 171, which are adjacent to one another. Each color filter 230 may be configured to facilitate the presentation of any one of, for instance, three primary colors, e.g., red, green, and blue colors. It is noted, however, that the color filters 230 may be configured to facilitate presentation of any color.

A light blocking member 220 is disposed in the region in which the color filter 230 is not disposed, and disposed on a portion of the color filter 230. The light blocking member 220 may also be referred to as a black matrix. To this end, the light blocking member 220 may be configured to prevent light leakage. The light blocking member 220 extends along the gate line 121 and the voltage drop gate line 123, and includes a first light blocking member (not shown) that covers the region in which the first thin film transistor Qh, the second thin film transistor Ql, and the third thin film transistor Qc are disposed, and a second light blocking member (not shown) extending along the data line 171. The height (or thickness) of a portion of the light blocking member 220 may be smaller than that of the color filter 230.

An upper passivation layer 180*q* is disposed on the color filter 230 and the light blocking member 220. The upper passivation layer 180*q* is configured to prevent the color filter 230 and the light blocking member 220 from being lifted, as well as configured to suppress contamination of the liquid crystal layer 3 by, for instance, an organic material, such as a solvent, flowing from the color filter 230. In this manner, the upper passivation layer 180*q* is configured to prevent defects, such as afterimages, from occurring when driving the liquid crystal display device to present an image.

A plurality of first contact holes (or vias) 185*h* and a plurality of second contact holes (or vias) 185*l* may be formed through the lower passivation layer 180*p*, the light blocking member 220, and the upper passivation layer 180*q*, so that the wide end portion of the first drain electrode 175*h* and the wide end portion of the second drain electrode 175*l* can be exposed. To this end, it is noted that a plurality of pixel electrodes 191 are disposed on the upper passivation is layer 180*q*.

As seen in FIG. 1, each pixel electrode 191 includes a first subpixel electrode 191*h* and a second subpixel electrode 191*l* that are separated from one another. The gate lines 121 and 123 are disposed between the first and second subpixel electrodes 191*h* and 191*l*, which are disposed above and beneath the pixel area with the gate lines 121 and 123 being disposed at (or near) the center. In this manner, the first and second subpixel electrodes 191*h* and 191*l* are adjacent to one another in a column direction.

The first subpixel electrode 191*h* and the second subpixel electrode 191*l* are configured to receive a data voltage via the first contact hole 185*h* and the second contact hole 185*l* from the first drain electrode 175*h* and the second drain electrode 175*l*, respectively. The first subpixel electrode 191*h* and the second subpixel electrode 191*l* to which the data voltage is applied are configured to generate (or otherwise impose) an electric field in conjunction with the common electrode 270 of the upper panel 200. As previously mentioned, the electric field may be utilized to control a direction of the liquid crystal molecules 31 of the liquid crystal layer 3 disposed between the two electrodes 191 and 270. It is noted that the luminance of light propagating through the liquid crystal layer 3 may be affected based on the direction of the liquid crystal molecules 31.

The first subpixel electrode 191*h*, the common electrode 270, and the liquid crystal layer 3 disposed therebetween form the first liquid crystal capacitor Clch, whereas the second subpixel electrode 191*l*, the common electrode 270, and the liquid crystal layer 3 disposed therebetween form the second liquid crystal capacitor Clcl. It is noted that the first and second liquid crystal capacitors Clch and Clcl are utilized to maintain an applied voltage for a period of time when the first and second thin film transistors Qh and Ql are turned off.

The first and second subpixel electrodes 191h and 191l are disposed to overlap the storage electrode and the storage electrode line 125 and, thereby, configured to form the first and second storage capacitors Csth and Cstl. The first and second storage capacitors Csth and Cstl are configured to improve (or strengthen) the voltage storage ability of the first and second liquid crystal capacitors Clch and Clcl.

The capacitive electrode 126 and the extending portion 177c of the third drain electrode 175c are disposed to overlap with the gate insulating layer 140, such that the semiconductor layers 157 and 167 are disposed therebetween and, thereby, disposed to form the voltage drop capacitor Cstd. According to exemplary embodiments, the semiconductor layers 157 and 167 may be disposed between the capacitive electrode 126 and the extending portion 177c of the third drain electrode 175c and, thereby, configured to eliminate the voltage drop capacitor Cstd.

A coloring member 320 is disposed on the upper passivation layer 180q. The coloring member 320 is disposed on the light blocking member 220. The coloring member 320 extends along the gate line 121 and the voltage drop gate line 123, as well as extends upward and downward to cover the gate line 121 and the voltage drop gate line 123. To this end, the coloring member 320 includes a first coloring member (not shown) and a second coloring member (not shown), which are disposed along a first light blocking member covering the region in which the first thin film transistor Qh, the second thin film transistor Ql, and the third thin film transistor Qc are disposed and disposed along a second light blocking member extending along the data line 171.

The coloring member 320 is configured to compensate for a difference in height of the light blocking member 220 and the color filter 230 and, thereby, enables a cell gap between the portion of the liquid crystal layer 3 disposed on the color filter 230 and the portion of liquid crystal layer 3 disposed on the light blocking member 220 to be controlled. The coloring member 320 is also configured to reduce the amount of light leakage associated with the light blocking member 220. Since the coloring member 320 is configured to compensate for a difference in height (or thickness) of the light blocking member 220 and the color filter 230, the liquid crystal molecules 31 disposed between the light blocking member 220 and the color filter 230 that may not be precisely controlled in the step region between the light blocking member 220 and the color filter 230, that the coloring member 320 enables the occurrence of light leakage of the edge portion of the pixel electrode 191 to be prevented (or reduced). In addition, since the cell gap in the region associated with the light blocking member 220 is decreased, the average cell gap is decreased. This enables the total amount of liquid crystal utilized in the liquid crystal display to be decreased.

A lower alignment layer (11) may be disposed on the pixel electrode 191, the exposed upper passivation layer 180q, and the coloring member 320. The lower alignment layer 11 may be a vertical alignment layer, and may include a photosensitive material.

The upper panel 200 includes a common electrode 270 disposed on an insulation substrate 210. The common electrode 270 includes a first cutout 271a, a second cutout 271b, a plurality of third cutouts 281a, and a plurality of fourth cutouts 281b. The first and second cutouts 271a and 27b may be cross-shaped. The width of an individual third cutout 281a of the common electrode 270 may be less than or equal to the width of the cross-shaped cutouts 271a and 271b, and the width of the cross-shaped cutouts 271a and 271b may be equal to or two times larger than the width of a third cutout 281a of the common electrode 270. That is, when the width of the cross-shaped cutouts 271a and 271b of the common electrode 270 is W1 and the width of a third cutout 281a of the common electrode 270 is W2, then the inequality, W2≤W1≤2*W2, may be satisfied.

The first cutout 271a of the common electrode 270 is disposed in association with the first subpixel electrode 191h, and the second cutout 271b is disposed in association with the second subpixel electrode 191l.

As previously mentioned, the first cutout 271a and the second cutout 271b may exhibit a cross shape including four ends, such that one or more of the ends protrude farther than the corresponding edges of the first subpixel electrode 191h and the second subpixel electrode 191l. As such, the fringe field may be stabilized as the fringe field may be applied up to the edge of the pixel area because the edge of the first and second cutouts 271a and 271b of the common electrode 270 protrude further than the edge of the pixel electrode 191, itself. In this manner, the arrangement of the liquid crystal molecules 31 may be more effectively controlled in a desired direction even at the edge of the pixel area. It is also noted that the first subpixel electrode 191h and the second subpixel electrode 191l may be divided into a plurality of subregions. That is, a plurality of subregions may be defined by the edges of the first cutout 271a and the second cutout 271b.

The third cutout 281a of the common electrode 270 is disposed parallel to an edge parallel to the data line 171 among the various edges of the first and second subpixel electrodes 191h and 191l. When viewed down upon, the third cutout 281a is disposed beyond the edges of the first and second subpixel electrodes 191h and 191l.

The fourth cutout 281b of the common electrode 270 is disposed parallel to an edge parallel to the gate line 121 among the various edges of the first and second subpixel electrodes 191h and 191l. When viewed down upon, the fourth cutout 281b is disposed beyond the edges of the first and second subpixel electrodes 191h and 191l. The third cutout 281a of the common electrode 270 may overlap at least a portion of the data line 171. In this manner, the third cutout 281a may be configured to reduce the coupling effect between the data line 171 (which is disposed in the lower panel 100) and the common electrode 270 (that is disposed in the upper panel 200). As such, deterioration of image quality due to a coupling effect that would otherwise exist between the data line 171 and the common electrode 270 can be prevented (or at least reduced). Further, a shielding electrode applied with a voltage that is equal to the common voltage Vcom applied to the common electrode may not be disposed on the data line 171, such that a potential short-circuit between the shielding electrode and the data line 171 can be prevented. This enables liquid crystal display yields to be higher, as unintended short-circuits between the shielding electrode and the data line 171 can be prevented. It is further noted that the third and fourth cutouts 281a and 281b of the common electrode 270 may be separated from the first and second cutout 271a and 271b of the common electrode 270.

According to exemplary embodiments, the third and fourth cutouts 281a and 281b of the common electrode 270 may be configured to control the fringe field effect on the edge of the pixel electrode 191h and 191l, as well as configured to control an inclination direction of liquid crystal molecules disposed in the edge of the pixel electrodes 191h and 191l. Further, the third cutout 281a of the common electrode 270 is disposed to at least partially overlap the data line 171, and therefore, the formation of parasitic capacitances between the common electrode 270 and the data line 171 can be reduced. Accordingly, deterioration of the image quality of the liquid crystal display due to the coupling effects between the data line 171 and the common electrode 270 can be prevented without utilization of a shielding electrode.

An upper alignment layer (21) may be disposed on the common electrode 270. The upper alignment layer 21 may be a vertical alignment layer, and may include a photo-sensitive material.

Polarizers (not shown) may be disposed on the outer surfaces of the lower and upper panels 100 and 200. In exemplary embodiments, the transmissive axes of the polarizers may be orthogonal to one another, such that one transmissive axis of the above-noted transmissive axes is parallel to the gate line 121. It is noted, however, that only one polarizer may be utilized and, thereby, disposed on an outer surface of only one of the two panels 100 and 200.

The liquid crystal layer 3 includes liquid crystal molecules 31 exhibiting a negative dielectric anisotropy. The liquid crystal layer 3 may include one or more polymers. In exemplary embodiments, the liquid crystal molecules 31 may be aligned so that their longitudinal axes are vertical (or perpendicular) to the surface of the lower and upper panels 100 and 200 in an unexcited state, i.e., when no electric field is imposed upon liquid crystal layer 3. According to exemplary embodiments, the liquid crystal molecules 31 may be initially arranged to have a pretilt, such that ones of their longitudinal axes are arranged substantially parallel to one of four directions extending toward the center portion of the cross-shaped cutouts 271*a* and 271*b* of the common electrode 270 from one of four different portions where the edges of the subpixel electrodes 191*h* and 191*l* meet the cutouts 271*a* and 271*b*. Thus, each of the first and second subpixel electrodes 191*h* and 191*l* has four subregions of which the pretilt directions of the liquid crystals 31 are different from one another. Accordingly, a cross polarizer may be formed, such that incident light may be prevented from propagating therethrough and, as such, the incident light may be blocked in a state when an electric field is not imposed upon liquid crystal layer 3.

As described above, the first sub-pixel electrode 191*h* and the second sub-pixel electrode 191*l* respectively applied with the data voltage are configured, with the common electrode 270, to impose an electric field on the liquid crystal layer 3 so that the liquid crystal molecules 31 of the liquid crystal layer 3 (which are vertically aligned when no electric field is imposed on liquid crystal layer 3) are inclined in a horizontal direction to the surfaces of the pixel electrode 191 and the common electrode 270. In this manner, the luminance of light propagating through the liquid crystal layer 3 may vary according to the degree of inclination of the liquid crystal molecules 31.

According to exemplary embodiments, the liquid crystal display may further include a spacer 325 configured to maintain the cell gap between the lower and upper panels 100 and 200. The spacer 325 may be disposed on the same layer as the coloring member 320.

A driving method of the liquid crystal display of FIGS. 1 and 2 will be described in association FIGS. 1, 2, and 4.

If a gate on signal is applied to the gate line 121, the first switching element Qh, and the second switching element Ql connected thereto, the gate line 121, the first switching element Qh, and the second switching element Ql may be turned on. Accordingly, the data voltage applied to the data line 171 is applied to the first subpixel electrode 191*h* and the second subpixel electrode 191*l* via the respectively "turned on" first switching element Qh and second switching element Ql. The magnitudes of the data voltages applied to the first subpixel electrode 191*h* and the second subpixel electrode 191*l* may be the same or substantially similar. Therefore, the voltages charged in the first and second liquid crystal capacitors Clch and Clcl may also be the same or substantially similar. Thereafter, if a gate off signal is applied to the gate line 121 and a gate on signal is applied to the voltage drop gate line 123, the first switching element Qh and the second switching element Ql can be turned off, and the third switching element Qc can be turned on. As such, electric charges may move from the second subpixel electrode 191*l* through the third switching element Qc to the voltage drop capacitor Cstd. The charge voltage of the second liquid crystal capacitor Clcl will be lowered and the voltage drop capacitor Cstd will be charged. Since the charge voltage of the second liquid crystal capacitor ClCl is lowered by the capacitance of the voltage drop capacitor Cstd, the charge voltage of the second liquid crystal capacitor Clcl may be lower than the charge voltage of the first liquid crystal capacitor Clch.

According to exemplary embodiments, the charge voltages of the first and second liquid crystal capacitors Clch and Clcl may exhibit different gamma curves, and the gamma curve of one pixel voltage may be a gamma curve synthesizing the aforementioned gamma curves. The synthetic gamma curve at a front side may be identical to a standard gamma curve that is set to be the most suitable at the front side, and the synthetic gamma curve at a lateral side may be set to be the closest to the standard gamma curve at the front side. As such, the side visibility of the liquid crystal display may be improved by changing the image data as described above.

FIG. 3 is a plan view of a region of a field generating electrode of the liquid crystal display of FIG. 1, according to exemplary embodiments.

With continued reference to FIGS. 1 and 2, the region of the field generating electrode depicted in FIG. 3 is formed via cutouts 271, 281*a*, and 281*b* of the common electrode 270 and the pixel electrode 191. When the liquid crystal display is viewed from above, the region defined by the cutout 271 of the common electrode 270 and the edge of the pixel electrode 191 may be divided into a plurality of subregions Da, Db, Dc, and Dd. In exemplary embodiments, the plurality of subregions Da, Db, Dc, and Dd may be symmetrical configured based on the cutout 271 of the common electrode 270.

As previously mentioned, the cutout 271 of the common electrode 270 may have a cross shape, and an end portion 272 of the cutout 271 may protrudes beyond the corresponding edge of the pixel electrode 191. It is noted that the width of the cutout 271 of the common electrode 270 may be about 2 μm to about 10 μm, e.g., about 5 μm to about 7 μm, such as 6 μm.

The third cutout 281*a* of the common electrode 270 is disposed parallel to the two edges of the pixel electrode 191 that are parallel to the data line 171. It is further noted that the third cutout 281*a* may be separated from (e.g., disposed beyond) the edges of the pixel electrode 191.

The fourth cutout 281*b* of the common electrode 270 is disposed parallel to the two edges of the pixel electrode 191 that are parallel to the gate line 171 It is noted that the fourth cutout 281*b* may be separated from (e.g., disposed beyond) the edges of the pixel electrode 191.

The third cutout 281*a* and the fourth cutout 281*b* of the common electrode 270 may be separated from (e.g., disposed beyond) the cutout 271 of the common electrode 270. The width of the third cutout 281 of the common electrode 270 may be less than or equal to the cross-shaped width of the cutout 271, and the width of the cross-shaped cutout 271 of the common electrode 270 may be equal to or two times greater than the width of the third cutout 281*a* of the common electrode 270. That is, when the width of the cross-shaped cutout 271 of the common electrode 270 is W1 and the width of the third cutout 281a of the common electrode 270 is W2, than the inequality, W2≤W1≤2*W2, may be satisfied.

As described above, the liquid crystal layer 3 disposed between the lower panel 100 and the upper panel 200 includes the liquid crystal molecules 31, which may exhibit a negative dielectric anisotropy, and may further include one or more polymers.

Figure 5:
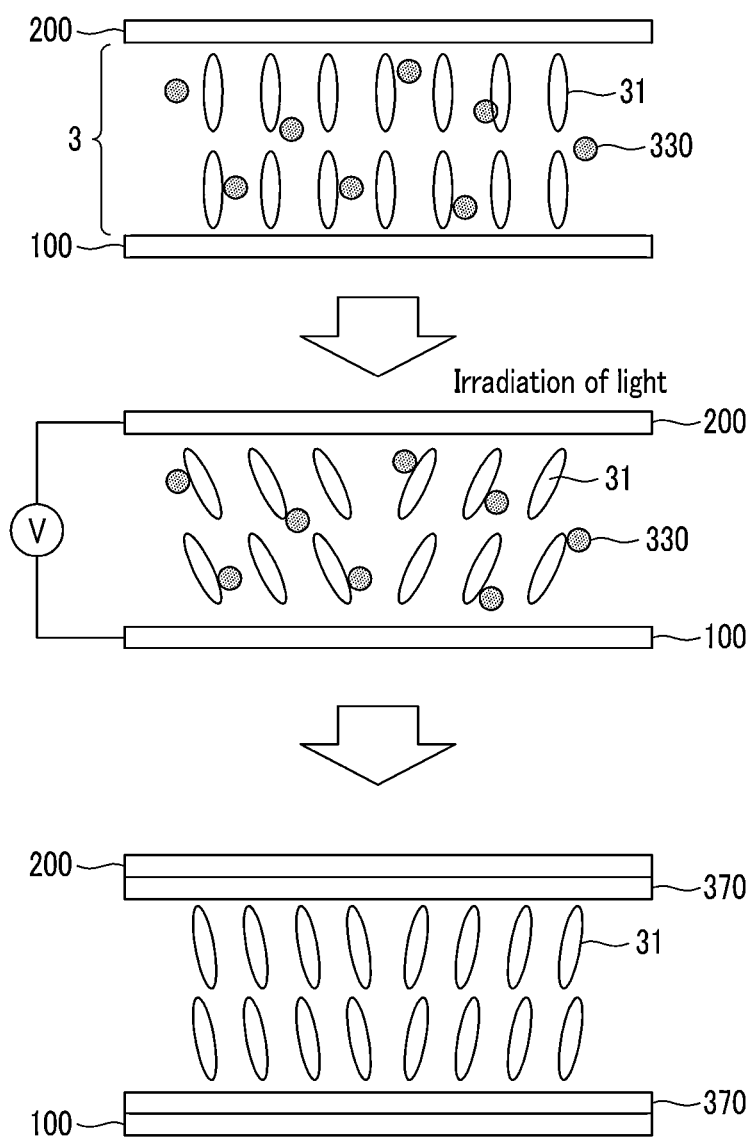
FIG. 5 illustrates a process to enable liquid crystal molecules to exhibit a pretilt angle, according to exemplary embodiments.

FIG. 5 illustrates a process to enable liquid crystal molecules to exhibit a pretilt angle, according to exemplary embodiments. FIGS. 6A and 6B schematically illustrate liquid crystal directions in the region of the field generating electrode of FIG. 3, according to exemplary embodiments. It is noted that the process of FIG. 5 may be utilized in association with configuring a pretilt angle via a prepolymer polymerized using rays, such as ultraviolet rays. As seen in FIG. 5, prepolymers 330 (such as monomers) cured by polymerization via light (such as ultraviolet rays) and liquid crystal material(s) may be injected between the lower and upper panels 100 and 200. The prepolymer 330 may be included in an alignment layer (not shown) disposed on the lower and upper panels 100 and 200, as well as included in the liquid crystal layer 3. The prepolymer 330 may be a reactive mesogen polymerized by light, such as ultraviolet rays.

Accordingly, data voltage may be applied to the first and second subpixel electrodes 191h and 191l, whereas the common voltage may be applied to the common electrode 270 of the upper panel 200 to impose an electric field on the liquid crystal layer 3, which is disposed between the lower and upper panels 100 and 200. In the presence of the applied electric field, the liquid crystal molecules 31 of the liquid crystal layer 3 will respond to the corresponding fringe field, such that the liquid crystal molecules 31 will be tilted approximately parallel to one of four directions extending from four portions at which the edges of the pixel electrode 191 meet and, thereby, directed toward the center portion of the cutout 271 In this manner, the four tilt directions of the liquid crystal molecules 31 will become four directions in one region of the field generating electrode.

As seen in FIG. 6A, directors 301a and 301b of the liquid crystal molecules 31 at the portion adjacent to the edge of the pixel electrode 191 meet the edge of the pixel electrode 191 at a predetermined angle. In addition, directors 302a and 302b of the liquid crystal molecules 31 at the portion adjacent to the cutout 271 of the common electrode 270 are vertical to the edge of the cutout 271. Liquid crystal directors aligned according to the fringe field imposed by the edge of the pixel electrode 191 forming the region of the field generating electrode, a cutout 91 of the pixel electrode 191, and the cutout 271 of the common electrode may be determined and arranged in a direction to enable the liquid crystal molecules 31 to meet one another to minimize deformation. In this manner, the arrangement direction may be considered a vector sum direction of directions of the aforementioned directors.

As seen in FIG. 6B, the liquid crystal directors 303 will become substantially parallel to one of the four directions extending toward the center portion of the cutout 271. That is, the liquid crystal directors 303 in subregions may converge upon or diverge from the center portion of the cutout 271. The third and fourth cutouts 281a and 281b formed in the common electrode 270 may be utilized to control the size (or extent) of the fringe field applied to the edge of the pixel electrode 191 and, thereby, utilized to reduce the number of liquid crystal molecules 31 aligned in the directors 301a and 301b that are perpendicular to the edge of the pixel electrode 191 in a portion adjacent to the edge of the pixel electrode 191. Accordingly, in the edge of the pixel electrode, the inclination of the liquid crystal molecules toward a direction perpendicular to the edge of the pixel electrode can be prevented so that deterioration of the image quality can be prevented. In other words, the directors of the liquid crystal molecules 31 may be arranged to be tilted to form a predetermined angle with the edge of the pixel electrode 191, rather than being arranged in the direction perpendicular to the edge of the pixel electrode 191.

In exemplary embodiments, the directors of the liquid crystal molecules 31 formed according to the fringe field may be similarly arranged in the subregions Da, Db, Dc, and Dd, so as to extend towards the center portion of the cutout 271. As such, the tilt directions of the liquid crystal molecules 31 in each region of the field generating electrode will become four directions converging or diverging from the center portion of cutout 271. Specifically, the directors of the liquid crystal molecules 31 may be arranged in a rightward and downward direction from the pixel edge toward the center portion of the cutout 271 in a first region of each subregion, the directors of the liquid crystal molecules 31 may be arranged in a leftward and downward direction from the pixel edge toward the center portion of the cutout 271 in a second region, the directors of the liquid crystal molecules 31 may be arranged in a rightward and upward direction from the pixel edge toward the center portion of the cutout 271 in a third region, and the directors of the liquid crystal molecules 31 may be arranged in a leftward and upward direction from the pixel edge toward the center portion of the cutout 271 in a fourth region.

When the electric field is imposed upon the liquid crystal layer 3 and light, such as ultraviolet light, is irradiated on the liquid crystal layer 3, the prepolymer 330 may be polymerized and, thereby, form a polymer 370. According to exemplary embodiments, respective polymer 370 layers may be disposed in contact with the lower and upper panels 100 and 200. If the prepolymer 330 is included in the alignment layer, the prepolymer of the alignment layer may also be polymerized, such that the polymer 370 is also disposed in the alignment layer. The liquid crystal molecules 31 may be aligned with pretilts in the alignment direction associated with the polymer 370. Accordingly, the liquid crystal molecules 31 may be aligned with pretilts in the above-noted four different directions even though no voltage is applied to the field generating electrodes 191 and 270.

Figure 7A:
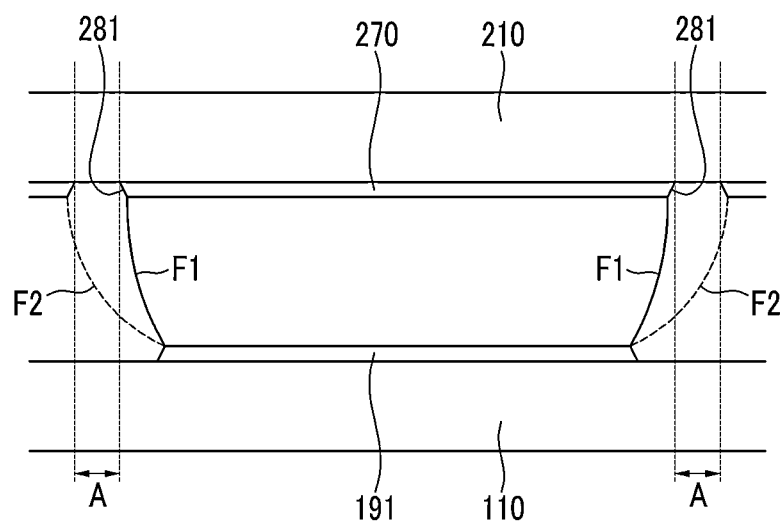
FIGS. 7A and 7B schematically illustrate generation of a fringe field in a liquid crystal layer of the liquid crystal display of FIG. 1, according to exemplary embodiments.
Figure 7B:
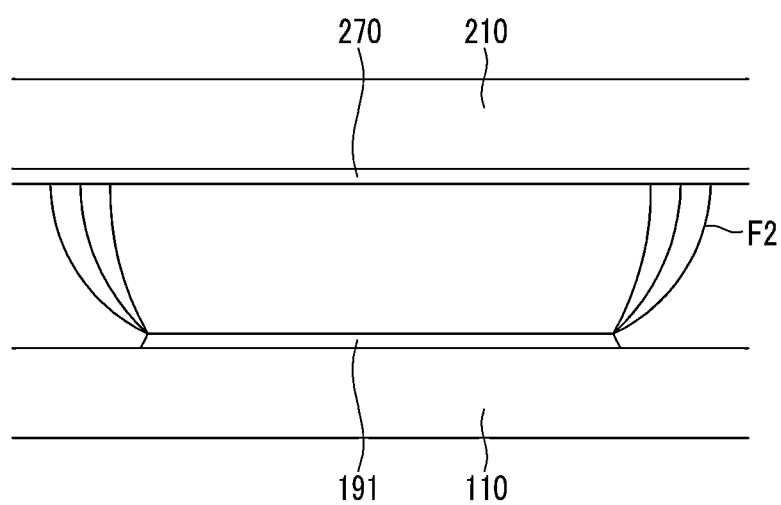

FIGS. 7A and 7B schematically illustrate generation of a fringe field in a liquid crystal layer of the liquid crystal display of FIG. 1, according to exemplary embodiments.

As seen in FIG. 7A, the cutout 281 of the common electrode 270 is parallel to the edge of the pixel electrode 191 and is disposed in the outer side of the pixel electrode 191, whereas in FIG. 7B, cutout 281 of a common electrode 270 is parallel with an edge of a pixel electrode 191, but is not formed in an outer side of the pixel electrode 191. It is noted that the configuration of FIG. 7B is typically utilized in conventional liquid crystal displays.

With reference to FIG. 7A, the cutout 281 of the common electrode 270 is parallel to the edge of the pixel electrode 191, and is disposed in the outer side of the pixel electrode 191. As such, a voltage may be applied to the common electrode 270 and the pixel electrode 191, such that fringe fields F1 and F2 are formed and the fringe fields F1 and F2 may be divided into a first fringe field F1 and a second fringe field F2 by the cutout 281 of the common electrode 270. That is, the cutout 281 of the common electrode 270 may be configured to reduce the size of the fringe field formed along the edge of the pixel electrode 191. Namely, the cutout 281 in the common electrode 270 eliminates the common electrode 270 in an area A between a region where the first fringe field F1 is formed (e.g., between an end portion of the common electrode 270 and adjacent to the edge of the pixel electrode 191) and a region where the second fringe field F2 is formed (e.g., between an end portion of the common electrode 270 and separated by the cutout 281 from the edge 191 of the pixel electrode 191). As such, a fringe field is not formed between fringe fields F1 and F2, such that the size of the second fringe field F2 becomes smaller than the size of the first fringe field F1. However, the fringe field F2 can be continuously formed in the edge of the pixel electrode 191 by a continuously formed common electrode 270, i.e., a common electrode not including cutout 281, which is illustrated in FIG. 7B. Thus, in exemplary embodiments, no fringe field is formed in the area A where the cutout 281 is formed and, as such, the size of the fringe field applied to the edge of the pixel electrode 191 can be controlled. Accordingly, the influence of the fringe field applied to the liquid crystal molecules 31 arranged adjacent to the edge of the pixel electrode 191 can be reduced, such that the inclination of the liquid crystal molecules 31 toward the direction perpendicular to the edge of the pixel electrode 191 can be prevented, thereby preventing deterioration of display quality.

Figure 8:
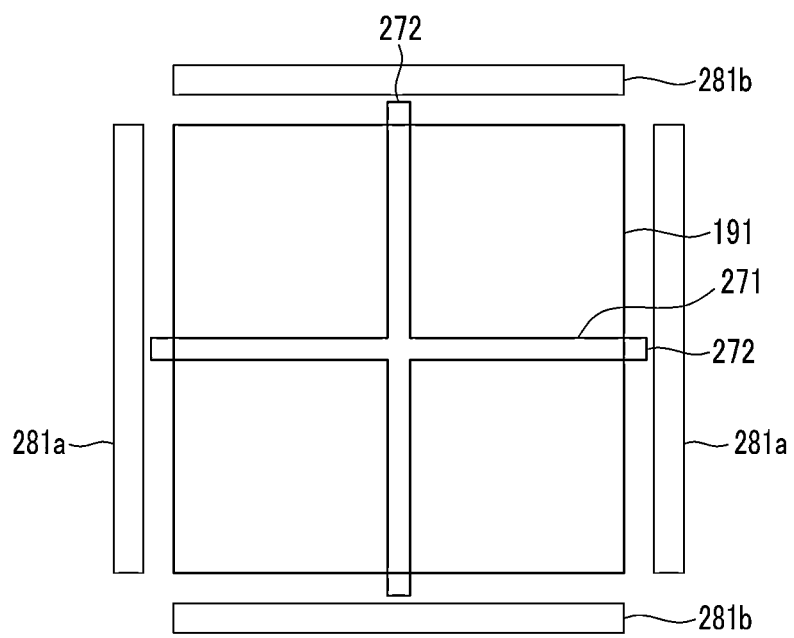
FIG. 8 is a plan view of a pixel area of the liquid crystal display of FIG. 1, according to exemplary embodiments.

FIG. 8 is a plan view of a pixel area of the liquid crystal display of FIG. 1, according to exemplary embodiments As seen in FIG. 8, a third cutout 281a of a common electrode 270 is separated from (e.g., disposed beyond) the pixel electrode 191, and extended to be substantially equal in length to an edge of the pixel electrode 191. As opposed to the third cutouts 281a illustrated in FIG. 3, the third cutout 281a of FIG. 8 extends at least the length of the edge of the pixel electrode 191, such that the third cutout 281a is formed in a portion adjacent to the cross-shaped cutout 271. As seen in FIG. 3, however, the third cutout 281a is not formed in the portion adjacent to a cross-shaped cutout 271.

According to exemplary embodiments, the shape and size of the third cutout 281 of the common electrode 270 can be variously modified, as well as variously disposed to correspond to a location separated from the pixel electrode 191 by a predetermined distance, but parallel to at least a part of the edge of the pixel electrode 191.

As previously described in association with FIG. 3, the common electrode 270 includes one cross-shaped cutout 271 that is disposed in a location corresponding to the respective subpixel electrodes 191h and 191l, such that the common electrode 270 includes four subregions. As seen in FIG. 8, however, the square ring-shaped cutout 271 is formed in association with one unit pixel and, as such, a region of the field generating electrode described with reference to FIG. 4 may be formed in one pixel region. In other words, the unit pixel of FIG. 3 is divided into four subpixel regions Da, Db, Dc, and Dd, whereas the unit pixel of FIG. 8 defines one pixel region.

Figure 9:
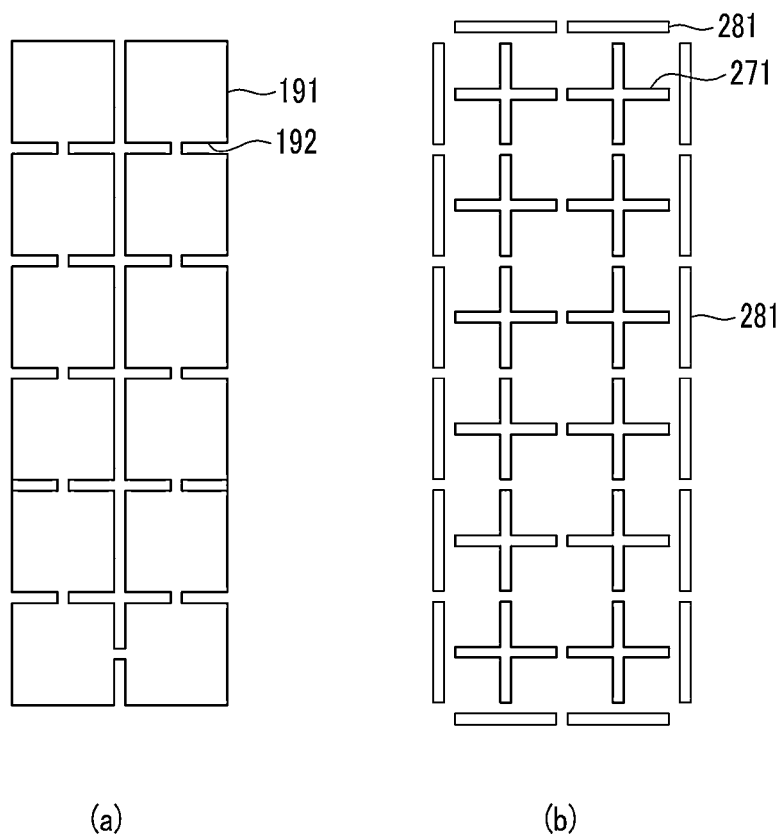
FIG. 9 is a plan view of a liquid crystal display, according to exemplary embodiments.

FIG. 9 is a plan view of a pixel area of a liquid crystal display, according to exemplary embodiments.

As seen in FIG. 9, the cutout 271 of the common electrode 270, corresponding to the pixel electrode 191, is disposed in each pixel area, such that 12 basic cross shapes are shown. In addition, the pixel electrode 191 includes an edge 192 disposed to surround the basic cross-shapes of the cutout 271 of the common electrode 270. Thus, each pixel area may have 12 basic regions of the field generating electrode described in association with FIG. 4. As such, the number of the regions of the field generating electrode formed in each pixel area may be modified based on the application, as well as changed in accordance with the size of the pixel or any other condition. As such, it is contemplated that a unit pixel may be subdivided in any suitable manner.

Figure 10A:
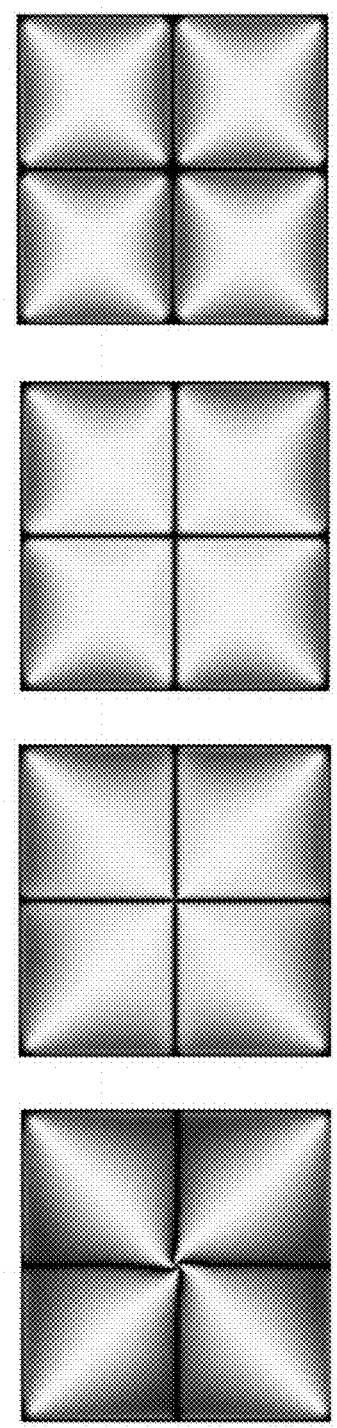
FIGS. 10A and 10B are plan views illustrating transmittance results of a liquid crystal display, according to exemplary embodiments.
Figure 10B:
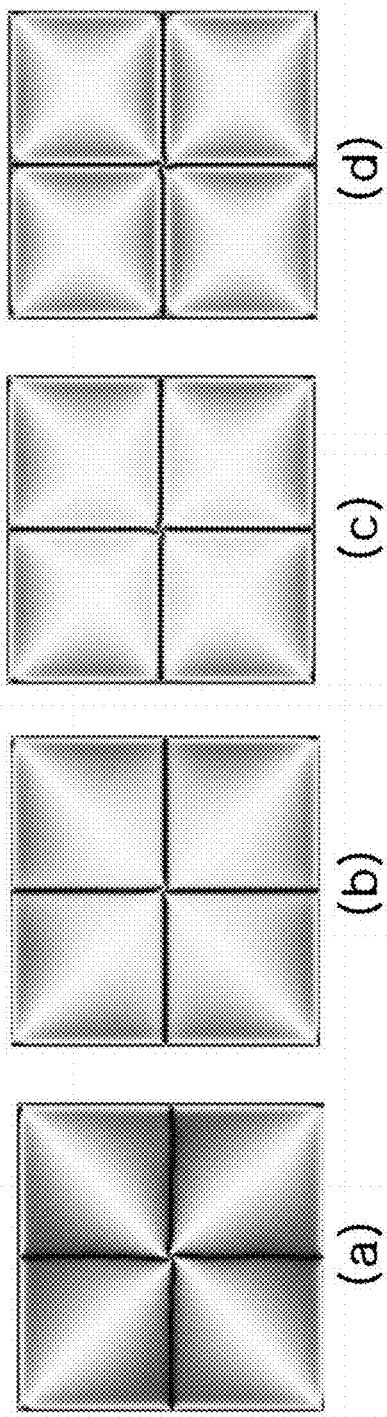

FIGS. 10A and 10B are plan views illustrating transmittance results of a liquid crystal display, according to exemplary embodiments. It is noted that the luminance conditions illustrated in association with FIGS. 10A and 10B demonstrate respective luminance levels determined in association with various experiments.

As shown, the width of the cross-shaped cutout 271 of the common electrode 270 was set to about 3 µm, about 5 µm, about 7 µm, and about 10 µm, and the width of the third cutout 281a formed in a location surrounding the edge of the pixel electrode 191 of the common electrode 270 was set to about 5 µm. In this manner, FIG. 10A demonstrates transmittance when a voltage difference between two field generating electrodes applying electric fields to the liquid crystal layer was set to about 2 V, and FIG. 10B demonstrates transmittance when the voltage different was set to about 7 V. In the respective drawings, case (a) shows an implementation having the width of the cross-shaped cutout 271 set to is about 3 µm and the width of the third cutout 281a set to about 5 µm, case (b) shows an implementation having the width of the cross-shaped cutout 271 set to about 5 µm and width of the third cutout 281a set to about 5 µm, case (c) shows an implementation having the width of the cross-shaped cutout 271 set to about 7 µm and the width of the third cutout 281a set to about 5 µm, and case (d) shows an implementation having the width of the cross-shaped cutout 271 set to about 10 µm and the width of the third cutout 281a set to about 5 µm.

As seen in FIGS. 10A and 10B, in comparison to the implementations where the width of the third cutout 281a of the common electrode 270 is larger than the cross-shaped cutout 271 of the common electrode 270 (e.g., implementation (a)), the transmittance of the liquid crystal display was high and deterioration of transmittance in the edge of the pixel electrode 191 could be prevented in the implementation having the width of the cross-shaped cutout 271 of the common electrode 270 equal to or two times larger than the width of the third cutout 281a of the common electrode 270. That is, when the inequality W2≤W1≤2*W2 was satisfied (i.e., implementations (b), (c), and (d)), where the width of the cross-shaped cutout 271 of the common electrode 270 is W1 and the width of the third cutout 281a of the common electrode 270 is W2.

The results of FIGS. 10A and 10B are shown in more detail in association with FIGS. 11-18, which also include illustrations of the arrangement directions of the liquid crystal is directors associated with the illumination depictions. Accordingly, it is noted that FIGS. 11-18 are plan views illustrating transmittance of a liquid crystal display and alignment directions of liquid crystal molecules, according to exemplary embodiments. In each of FIGS. 11-18, (a) depicts the transmittance result, and (b) depicts a plan view of an arrangement direction of the liquid crystal directors of the liquid crystal layer 3.

FIGS. 11 and 12 correspond to implementations (a) of FIGS. 10A and 10B, FIGS. 13 and 14 correspond to implementations (b) of FIGS. 10A and 10B, FIGS. 15 and 16 correspond to implementations (c) of FIGS. 10A and 10B, and FIGS. 17 and 18 correspond to implementations (d) of FIGS. 10A and 10B.

Adverting to FIG. 11, the width of the cross-shaped cutout 271 is about 3 µm and the width of the third cutout 281a is about 5 µm. In this case, liquid crystal molecules 31 in the center portion of the pixel electrode 191 are arranged in a shape that is similar to a whirlwind when an electric field applied to the liquid crystal layer was relatively weak in intensity, e.g., 2 V. With reference to FIG. 12, the width of the cross-shaped cutout 271 is about 3 µm and the width of the third cutout 281a is about 5 µm. In this case, unlike the liquid crystal directors in each domain, the liquid crystal molecules arranged in a region corresponding to the cross-shaped cutout 271 are arranged in a direction parallel with the cross-shaped cutout 271 even though the intensity of the electric field applied to the liquid crystal layer was relatively high, e.g., 7 V. That is, the movement of liquid crystal molecules 31 was significantly irregular in the domain interface of the pixel electrode 191.

Adverting to FIGS. 13 and 14, the width of the cross-shaped cutout 271 is about 5 μm and the width of the third cutout 281a is about 5 μm. In the example of FIG. 13, irregular movement of the liquid crystal molecules 31 rarely occurred in the center portion of the pixel electrode 191 even though the intensity of the electric field applied to the liquid crystal layer 3 was very weak (e.g., 2 V). Likewise, in the example of FIG. 14, irregular movement of the liquid crystal molecules 31 also rarely occurred the domain interfaces of the pixel electrode 191 even though the intensity of the electric field applied to the liquid crystal layer 3 was increased (e.g., to 7 V).

In the example of FIGS. 15 and 16, the width of the cross-shaped cutout 271 is about 7 μm and the width of the third cutout 281a is about 5 μm, and in the example of FIGS. 17 and 18, the width of the cross-shaped cutout 271 is about 10 μm and the width of the third cutout 281a is about 5 μm. Accordingly, each of these cases rarely exhibited irregular movement of the liquid crystal molecules 31 in the center portion of the pixel electrode 191 even though the intensity of the electric field applied to the liquid crystal layer 3 was very weak (e.g., 2 V in association with the examples of FIGS. 15 and 17). To this end, irregular movement of the liquid crystal molecules 31 also rarely occurred the domain interface of the pixel electrode 191 even though the intensity of the electric field applied to the liquid crystal layer 3 was increased (e.g., to 7 V in the examples of FIGS. 16 and 18).

That is, when the width of the cross-shaped cutout 271 is equal to or two times larger than the width of the third cutout 281a, and if W1 is the width of the cross-shaped cutout 271 and W2 is the width of the third cutout 281a, the transmittance of the liquid crystal display was relatively high when in the inequality, $W2 \leq W1 \leq 2*W2$ was satisfied. In these cases, irregular movement of the liquid crystal molecules 31 in the domain interfaces of the pixel electrode 191 was reduced, and accordingly, deterioration of transmittance in the domain interfaces could be prevented.

Figure 19:
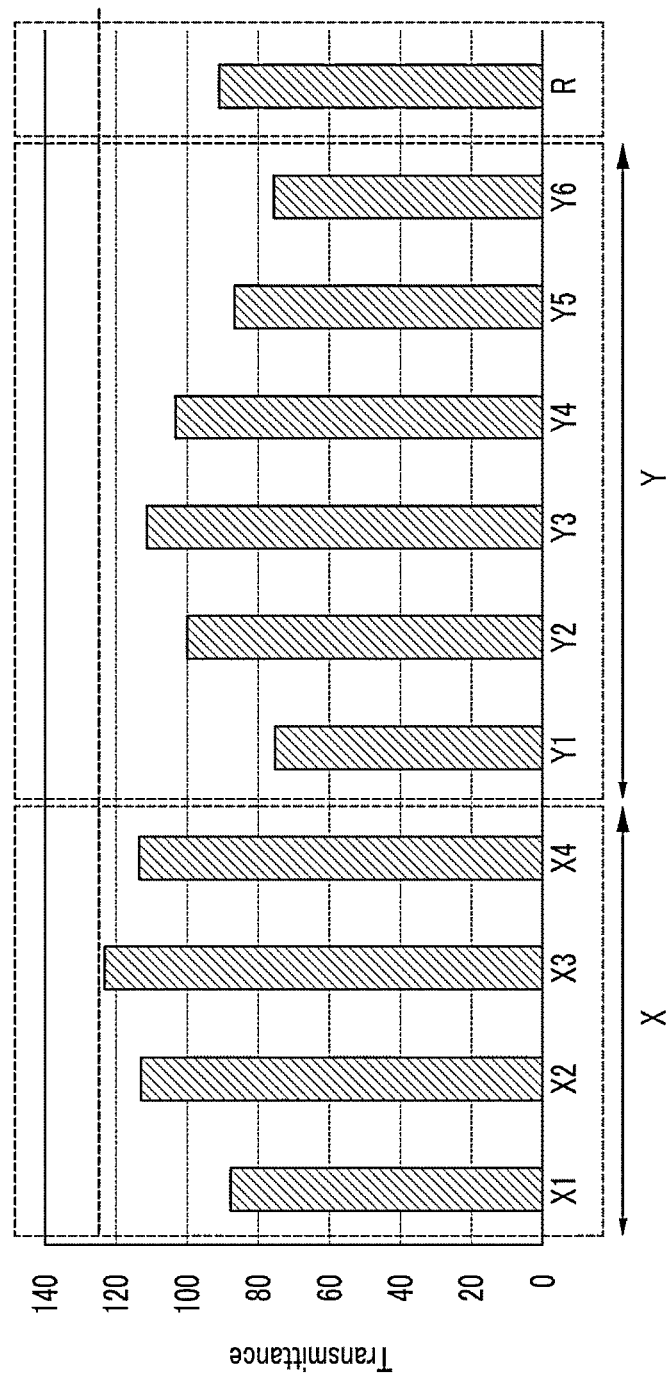
FIG. 19 is a graph illustrating transmittance results of a liquid crystal display, according to exemplary embodiments.

The above-noted results are further exemplified in association with FIG. 19, which provides a graph illustrating the transmittance results of a liquid crystal display, according to exemplary embodiments.

In the illustrated embodiment, a transmittance ratio (R) is of a conventional liquid crystal display, where a pixel electrode was formed of a cross-shaped stem portion and fine branch electrodes were extended from the stem, such that four domains were formed. In exemplary embodiments associated with cases X and Y, the third cutout 281a of the common electrode 270 was formed in a location surrounding the edges of the pixel electrode 191, in addition to the cross-shaped cutout 271.

In the first example (case X), the width of the third cutout 281a of the common electrode 270 was set to about 5 μm, and the width of the cross-shaped cutout 271 was set differently in each of the four cases X1, X2, X3, and X4. In the case X1, the width of the cross-shaped cutout 271 was set to about 3 μm, whereas in the case X2, the width was set to about 5 μm. To this end, case X3 is associated with the width being set to about 7 μm, whereas in the case X4, the width was set to about 10 μm.

In the second experimental example (case Y), the width of the third cutout 281a of the common electrode 270 was set to about 10 μm, and the width of the cross-shaped cutout 271 was respectively set to about 3 μm in the case Y1, about 5 μm in the case Y2, about 7 μm in the case Y3, about 10 μm in the case Y4, about 15 μm in the case Y5, and about 20 μm in the case Y6.

As seen in FIG. 19, when the width of the cross-shaped cutout 271 was equal to or two time larger than the width of the third cutout 281a, the transmittance level was higher than the case R, where the pixel electrode was formed of a cross-shaped stem and fine branch electrodes were extended from the stem as in a conventional liquid crystal display. That is, when the inequality, $W2 \leq W1 \leq 2*W2$ was satisfied (i.e., the cases associated with X2, X3, X4, Y2, Y3, and Y4) the transmittance level was higher than case R, associated with a conventionally configured display. As previously mentioned, W1 is the width of the cross-shaped cutout 271 and W2 is the width of the third cutout 281a. In this manner, it can be readily seen that, in association with exemplary embodiments, deterioration of display quality can be prevented in the edge portion of the pixel electrode 191, while having high transmittance, as compared to a conventional liquid crystal display having a pixel electrode formed of a cross-shaped stem and fine branch electrodes extended from the stem.

According to exemplary embodiments, a region of a field generating electrode of a liquid crystal display may be alternatively (or additionally) configured in various manners. For instance, FIGS. 20-23 illustrate plan views of various regions of a field generating electrode of a liquid crystal display, according to exemplary embodiments.

Figure 20:
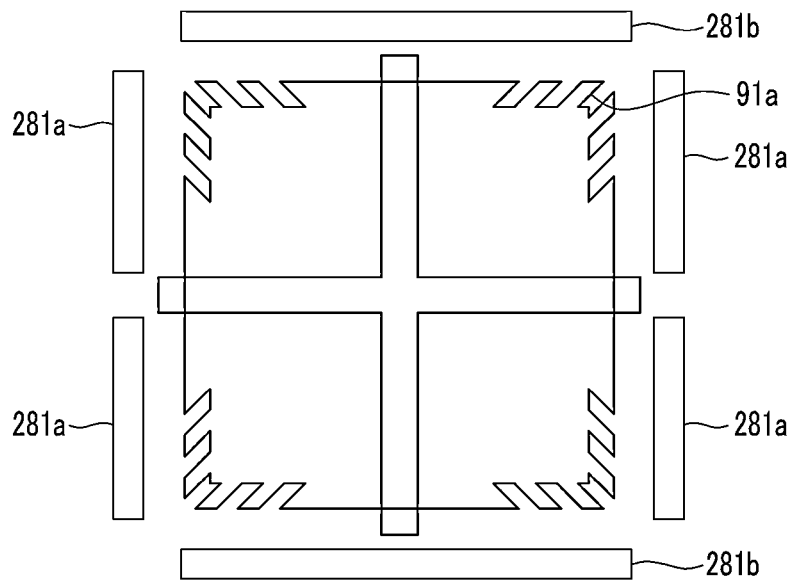
FIG. 20 is a plan view of a region of a field generating electrode of the liquid crystal display of FIG. 9, according to exemplary embodiments.

As seen in FIG. 20, the region of the field generating electrode of the liquid crystal display is similar to the region of the field generating electrode illustrated in FIG. 3, however, unlike the region depicted in FIG. 3, the region of the field generating electrode seen in FIG. 20 includes a plurality of cutouts 91a disposed in the uppermost left and right vertices and lowermost left and right vertices of the pixel electrode 191. In this manner, cutouts 91a of each respective vertex are formed by partially eliminating the pixel electrode 191 in a direction parallel to the four directions extending toward a center portion of the region of the field generating electrode where each of the respective directions intersect. In this manner, it is noted that cutouts 91a of each vertex may be considered to either converge upon the center portion or diverge away from the center portion. It is further noted that the particular cutout 91a lying at each specific vertex of pixel electrode 191 may be alternatively configured than one or more cutouts 91a disposed along the edges of pixel electrode 191 that extend away from each vertex toward another vertex. For instance, the cutout 91a lying on the vertex may include additional notches, which enable a "new" vertex to be formed closer to a center portion of pixel electrode 191 than if cutouts 91a were not formed in pixel electrode 191.

Accordingly, the configuration of the plurality of cutouts 91a of the pixel electrode 191 strongly induces an alignment direction of directors of liquid crystal molecules 31. To this end, the alignment of the liquid crystal directors can be induced to a desired direction in edges of the regions of the field generating electrode. That is, the liquid crystal directors may be induced to align toward the center portion of the region of the field generating electrode, i.e., in directions extending from each outermost vertex toward the center portion of the pixel electrode 191 where each of the directions intersect.

Figure 21:
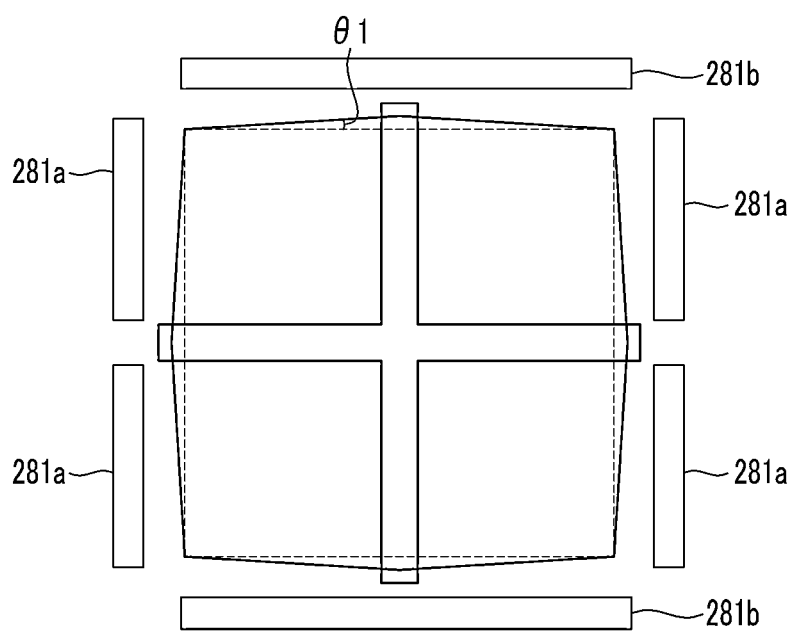
FIG. 21 is a plan view of a region of a field generating electrode of the liquid crystal display of FIG. 9, according to exemplary embodiments.

Adverting to FIG. 21, the depicted region of the field generating electrode of the liquid crystal display may be similar to the region illustrated in association with FIG. 3, however, unlike the region depicted in FIG. 3, the region shown in FIG. 20 includes edges of the pixel electrode 191 being widened toward the center portion of the pixel electrode 191. Namely, instead of substantially forming a "square" shaped pixel electrode 191 pattern (as illustrated in association with the dashed line), the pixel electrode 191 substantially forms an "octagonal" shaped pixel electrode 191. In this manner, the width of the pixel electrode 191 is extended by a first angle θ1 that extends from each vertex coinciding with the "square" shaped pixel electrode 191 of FIG. 3, toward a center portion of each lateral edge including at least two vertices of the pixel electrode 191. Accordingly, such a configuration of pixel electrode 191 enables arrangement of the liquid crystal directors of liquid crystal layer 3 in a desired direction in the edge of the pixel area.

As previously described, the edge of the pixel electrode 191 is inclined to form a predetermined angle θ1 in each subregion, such that an arrangement direction of the liquid crystal directors can be induced to a tilt direction of the liquid crystal directors in the edge of the pixel electrode 191 with reference to a constant horizontal surface. Accordingly, arrangement of the liquid crystal directors can be induced to a desired direction in the edge of the pixel area. That is, liquid crystal directors can be induced toward the center portion of the region of the field generating electrode from each portion where edges of the pixel electrode 191, which extend in different directions, converge.

Figure 22:
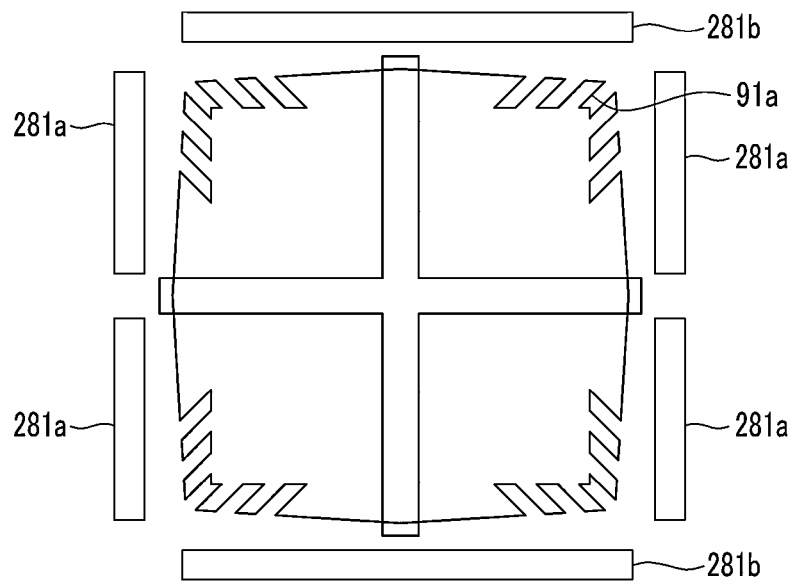
FIG. 22 is a plan view of a region of a field generating electrode of the liquid crystal display of FIG. 9, according to exemplary embodiments.

As seen in FIG. 22, the region of the field generating electrode of the liquid crystal display may be configured similarly to the region of the field generating electrode depicted in FIG. 3, however, unlike the region of the field generating electrode shown in FIG. 3, the region illustrated in FIG. 22 may combine the cutouts 91a illustrated in association with FIG. 20 and the general overall "octagonal" shape of the pixel electrode 191 shown in association with FIG. 21. Accordingly, arrangement of the liquid crystal directors can be induced to a desired direction in the edge of the pixel area.

Figure 23:
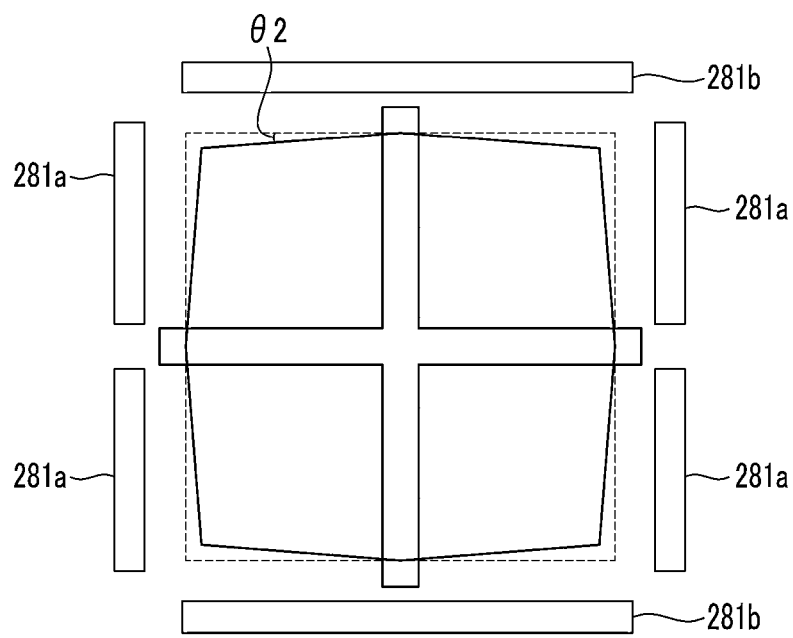
FIG. 23 is a plan view of a region of a field generating electrode of the liquid crystal display of FIG. 9, according to exemplary embodiments.

Adverting to FIG. 23, the region of the field generating electrode of the liquid crystal display may be similar to the region depicted in association with FIG. 3, however, unlike the region of the field generating electrode shown in FIG. 3, the region illustrated in FIG. 23 includes the edges of the pixel electrode 191 being narrowed toward the center portion of the pixel electrode 191. Namely, instead of substantially forming a "square" shaped pixel electrode 191 pattern (as illustrated in association with the dashed line), the pixel electrode substantially forms an "octagonal" shaped pixel electrode 191, which is inscribed within the "square" shaped pixel electrode 191 represented by the dashed line. In this manner, the width of the pixel electrode 191 is reduced by a second angle θ2 that extends from each centerline lying on the cutout 271 toward each outermost vertex. To this end, it is noted that the overall shape of the pixel electrode 191 portion may be similar to the shape described in association with FIG. 21; however, instead of increasing the overall size of the pixel electrode 191 as in FIG. 21, the overall size of the pixel electrode 191 depicted in FIG. 23 is decreased.

Accordingly, the lateral edges of the pixel electrode 191 are formed to be declined by a constant angle θ2 in each subregion, such that the alignment direction of the liquid crystal directors in the edge of the pixel electrode 191 can be induced to a tilt direction of the liquid crystal directors. That is, the arrangement of the liquid crystal directors can be induced to a desired direction in the edge of the pixel area, such that the liquid crystal directors are induced toward the center portion of the region of the field generating electrode from each portion where the edges of the pixel electrode 191, extended in different directions, coincide.

Figure 24:
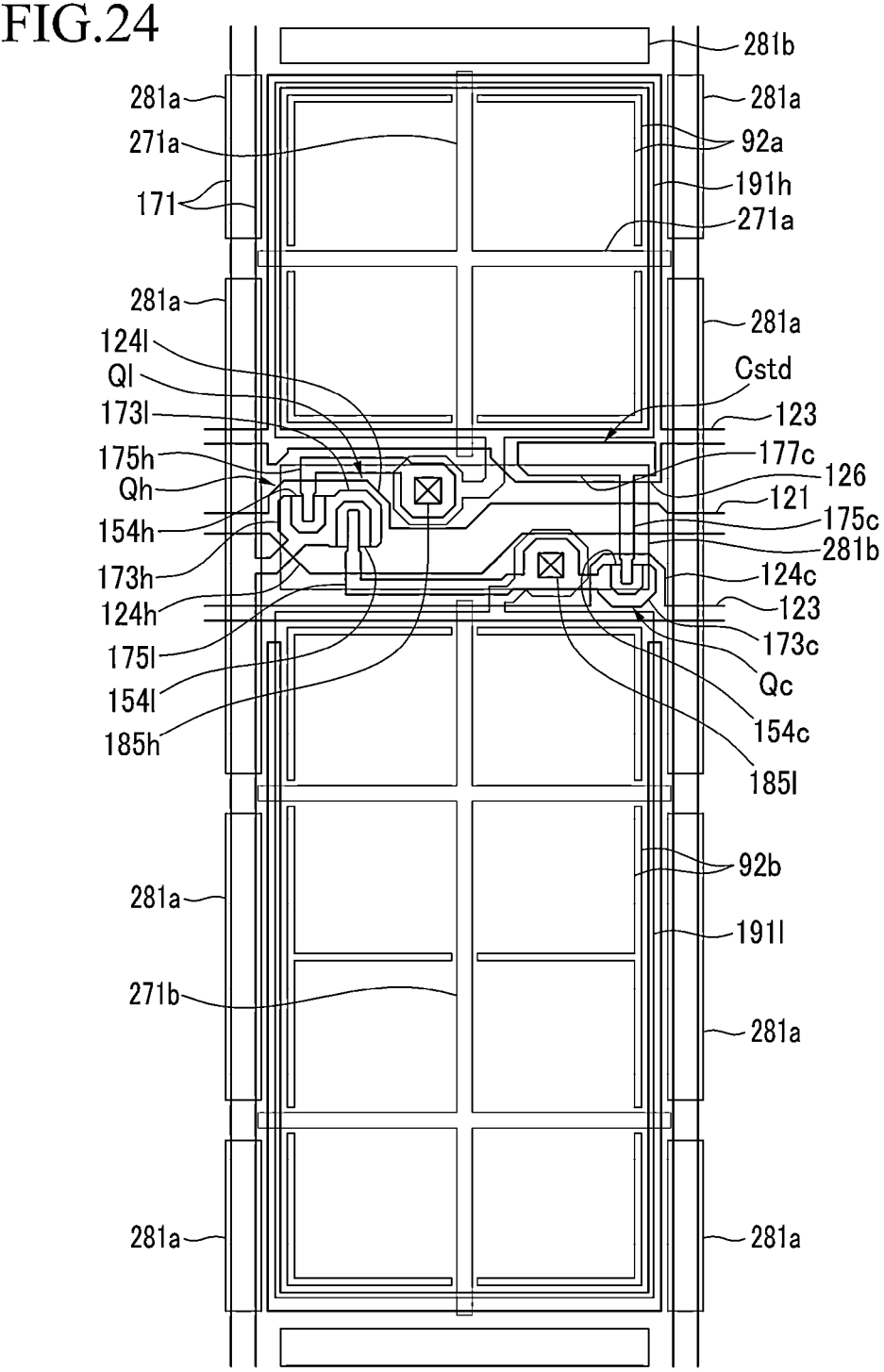
FIG. 24 is a layout view of a liquid crystal display, according to exemplary embodiments.

According to exemplary embodiments, the liquid crystal display may be configured to include additional (or alternative) cutouts. FIG. 24 is a layout view of a liquid crystal display, according to exemplary embodiments.

As seen in FIG. 24, the liquid crystal display is similar to the liquid crystal display of FIG. 1; however, unlike the liquid crystal display shown in FIG. 1, the liquid crystal display of FIG. 24 includes a first subpixel electrode 191h and a second subpixel electrode 191l, each including a cutout 92a, 92b extending along the edges thereof. That is, the pixel electrodes 191h and 191l form the cutouts 92a, 92b along the outermost bounding edges thereof so as to enable the liquid crystal directors to be induced toward a center portion of each corresponding pixel electrode 191h and 191l. In this manner, the arrangement of the liquid crystal molecules 31 can be controlled in a desired direction via the imposition of an applied electric field on liquid crystal layer 3.

According to exemplary embodiments, the liquid crystal display includes a common electrode 270 having a cross-shaped first cutout 271a, a second cutout 271b, a plurality of third cutouts 281a, and a plurality of fourth cutouts 281b. The width of the third cutout 281a is equal to or smaller than the width of the cross-shaped cutouts 271a and 271b, and the width of the cross-shaped cutouts 271a and 271b may be equal to or two times larger than the width of the third cutouts 281a. That is, when the width of the cross-shaped cutouts 271a and 271b is W1 and the width of the third cutouts 281a is W2, then the inequality, $W2 \leq W1 \leq 2*W2$, can be satisfied.

Figure 25A:
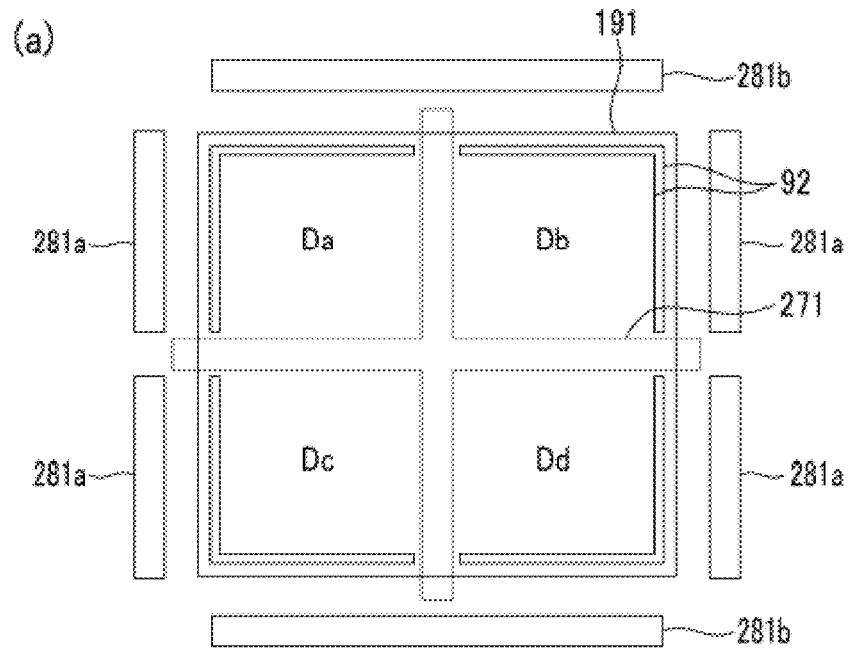
FIGS. 25A and 25B are plan views of a pixel area of a liquid crystal display, according to exemplary embodiments.
Figure 25B:
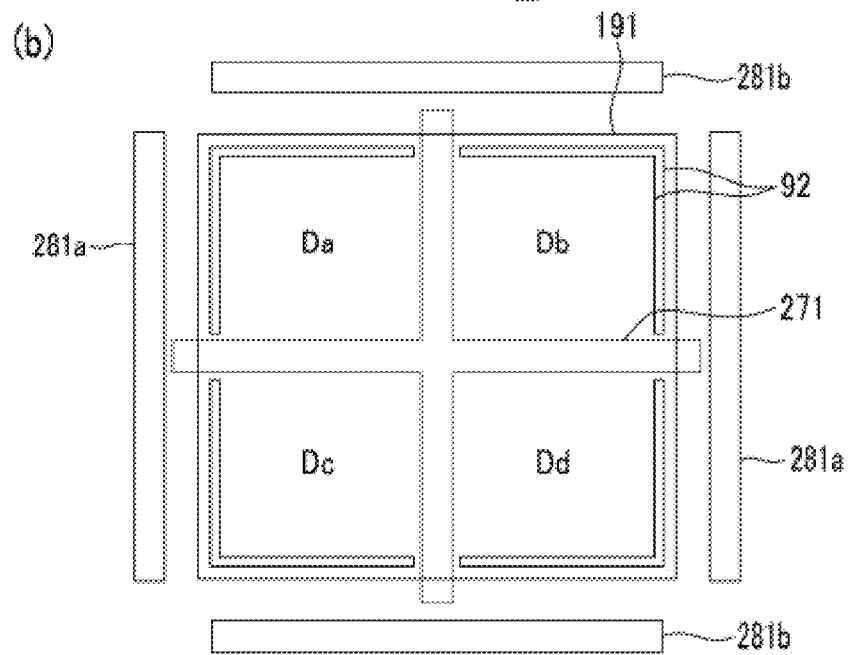

FIGS. 25A and 25B are plan views of a pixel area of a liquid crystal display, according to exemplary embodiments. In order to avoid obscuring exemplary embodiments described in association with FIGS. 25A and 25B, like aspects described in association with FIGS. 3 and 8, respectively, are not described.

As seen in FIG. 25A, the region of the field generating electrode is similar to the region of the field generating electrode illustrated in FIG. 3, however, in FIG. 25A, the pixel electrode 191 includes a cutout 92 formed along the edge of the pixel electrode 191, such that the cutout extends from the outmost vertices toward the cutout 271. It is noted that the extension of cutouts 92 toward cutout 271 may terminate before reaching cutout 271, such that each subregion Da, Db, Dc, and Dd includes a respective cutout 92. It is noted that cutout 92 may form a right-angled cutout, such that the respective extensions of the cutout 92 are correspondingly parallel to respective outer lateral edges of pixel electrode 191. To this end, cutouts 271, 281a, and 281b may be similarly formed and disposed as described in association with FIG. 3.

As seen in FIG. 25B, the region of the field generating electrode may be similar to the region of the field generating electrode shown in FIG. 8, but the pixel electrode 191 of FIG. 25B further includes a plurality of cutouts 92 formed along the edges of the pixel electrode 191, which are similarly formed as in FIG. 25A. To this end, cutouts 271, 281a, and 281b may be similarly formed and disposed as described in association with FIG. 8.

To this end, in each of FIGS. 25A and 25B, the cutout 92 of the pixel electrode 191 is generally formed in the shape of a square ring along the bounding lateral edge of the pixel electrode 191, however, the cutout 92 is disconnected in respective regions of pixel electrode 191 where corresponding extensions of the cutout 271 of the common electrode 270 are formed. In this manner, the portion where the cutout 92 formed in the pixel electrode 191 is disconnected may be utilized as a connection portion of the pixel electrode 191. The width of the connection portion of the pixel electrode 191 is larger than the width of the cutout 271. Further, it is notated that the cutout 92 of the pixel electrode 191 may be spaced apart from the edge of the pixel electrode 191 by an interval (or multiple) of two times or less than the cell gap of the liquid crystal display. For instance, the width of the cutout 92 may be two times or less than the cell gap of the liquid crystal display.

Figure 26A:
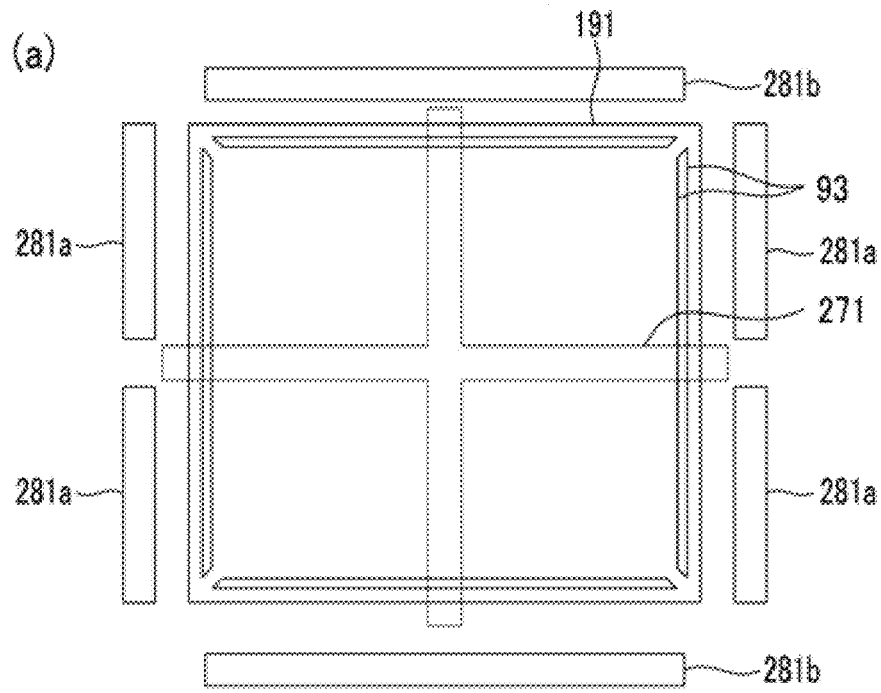
FIGS. 26A and 26B are plan views of a pixel area of a liquid crystal display, according to exemplary embodiments.
Figure 26B:
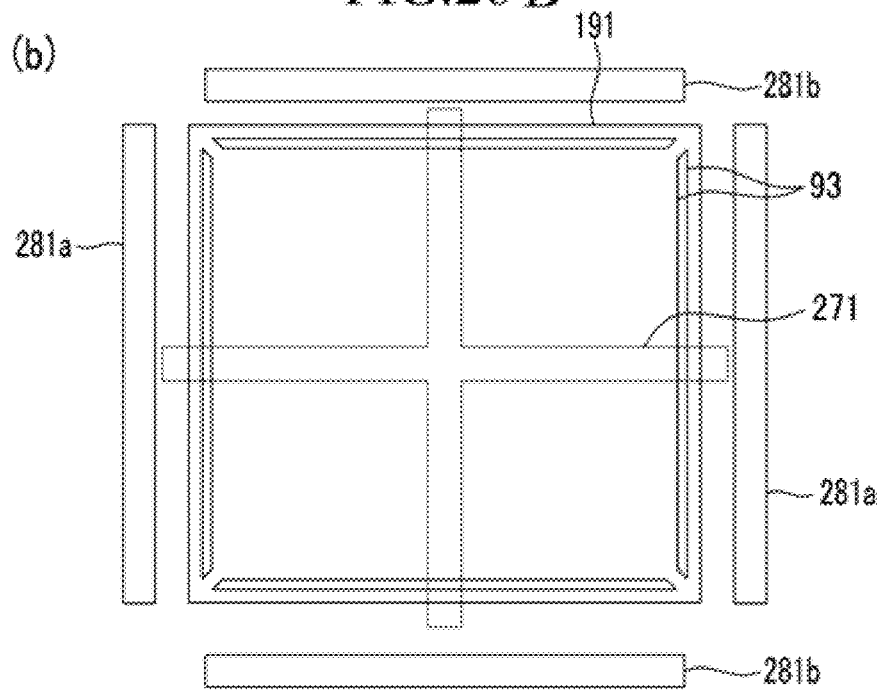

FIGS. 26A and 26B are plan views of a pixel area of a liquid crystal display, according to exemplary embodiments. In order to avoid obscuring exemplary embodiments described in association with FIGS. 26A and 26B, like aspects described in association with FIGS. 3, 8, 25A, and 25B are not described.

As seen in FIG. 26A, the region of the field generating electrode may be similar to the region of the field generating electrode shown in FIG. 3, however, in FIG. 26A, the pixel electrode 191 includes a cutout 93 formed along the corresponding edges of the pixel electrode 191, such that each lateral edge of the pixel electrode 191 includes a cutout 93 extending between the respective vertices of the corresponding lateral edge of the pixel electrode 191. It is noted that the extension of cutouts 93 may terminate before reaching each corresponding vertex and may be parallel to respective lateral edges of pixel electrode 191. To this end, cutouts 271, 281a, and 281b may be similarly formed and disposed as described in association with FIG. 3.

With reference to FIG. 26B, the region of the field generating electrode may be similar to the region of the field generating electrode shown in FIG. 8, however, in FIG. 26B, the pixel electrode 191 includes a cutout 93 formed along the corresponding edges of the pixel electrode 191, which are similarly formed as in FIG. 26A. To this end, cutouts 271, 281a, and 281b may be similarly formed and disposed as described in association with FIG. 8.

In exemplary embodiments, the cutout 93 of the pixel electrode 191 illustrated in association with FIGS. 26A and 26B, is formed in the shape of a square ring along the lateral edges of the pixel electrode 191, and is disconnected at the four portions (e.g., vertices) at which the edges of the pixel electrode 191 extending in different directions meet. In this manner, the portion where the cutout 93 formed in the pixel electrode 191 is disconnected may be utilized as a connection portion of the pixel electrode 191. Unlike the cutout 92 illustrated in FIGS. 25A and 25B, the cutout 93 of the pixel electrode 191 partially overlaps the cutout 271 of the common electrode 270.

Further, it is noted that the cutout 93 of the pixel electrode 191 may be spaced apart from the edge of the pixel electrode 191 by an interval (or multiple) of two times or less than the cell gap of the liquid crystal display. For instance, the width of the cutout 93 may be two times or less than the cell gap of the liquid crystal display. In exemplary embodiments, the width of the cross-shaped cutout 271 may be about three times or less than the thickness of the liquid crystal layer 3, that is, the aforementioned cell gap.

As seen in FIGS. 24-26, the liquid crystal display may include the cutouts 92a, 92b, 92, 93 formed in the edge of the pixel electrode 191, which that different regions of the pixel electrode 191 includes a different cutout. In this manner, a fringe field formed in the edge of the pixel electrode 191 can be reduced via the combined utilization of the cutouts 92a, 92b, 92, 93, such that the effect of the fringe field applied to the liquid crystal molecules 31 arranged adjacent to the edge of the pixel electrode 191 can be reduced. This effect may also be achieved via the cutouts 281a and 281b that are disposed along separated portions of the edge of the pixel electrode 191. Accordingly, the tilting of the liquid crystal molecules 31 in a direction perpendicular to the edge of the pixel electrode 191 can be controlled to prevent deterioration of display quality that may otherwise occur due to tilting of the liquid crystal molecules 31 in the direction perpendicular to the edge of the pixel electrode 191.

Figure 27:
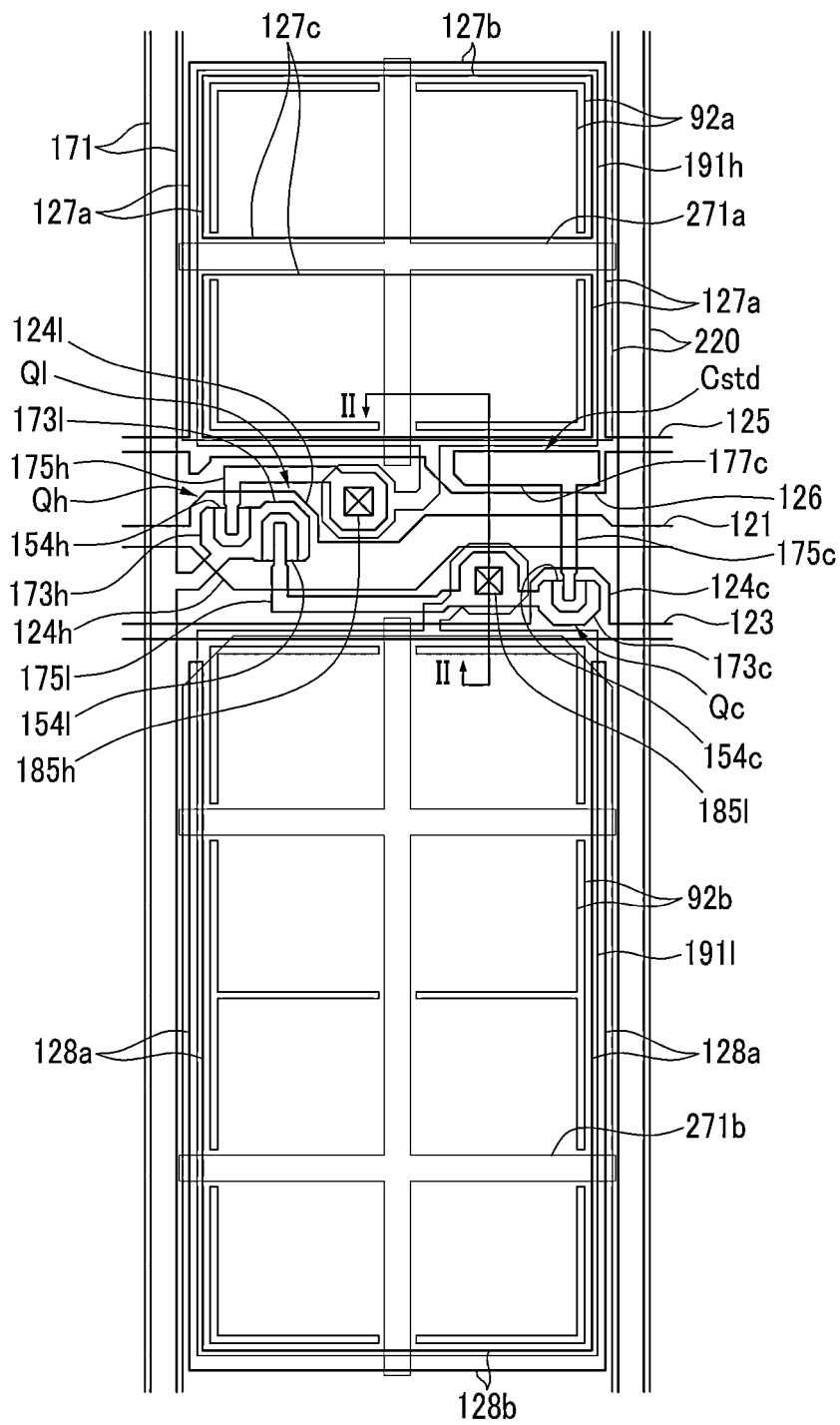
FIG. 27 is a layout view of a liquid crystal display, according to exemplary embodiments.
Figure 28:
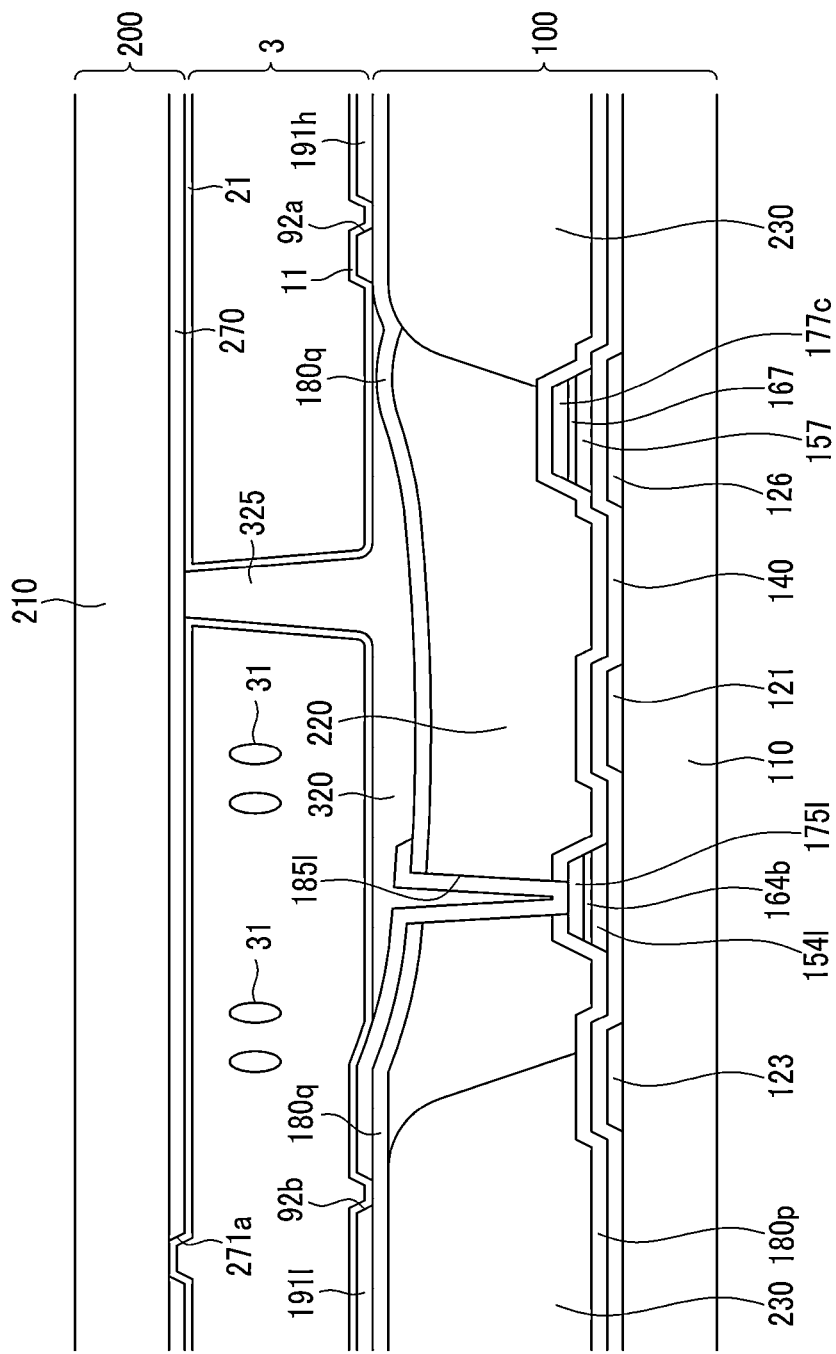
FIG. 28 is a cross-sectional view of the liquid crystal display of FIG. 27 taken along sectional line II-II, according to exemplary embodiments.

According to exemplary embodiments, alternative and/or additional cutouts may be provided in one or more of the pixel electrode 191 and the common electrode 270. FIG. 27 is a layout view of such an exemplary liquid crystal display. FIG. 28 is a cross-sectional view of the liquid crystal display of FIG. 27 taken along sectional line II-II, according to exemplary embodiments.

As seen in FIGS. 27 and 28, the liquid crystal display includes a lower panel 100 and an upper panel 200 that faces the lower panel 100, as well as includes a liquid crystal layer 3 disposed between the lower and upper panels 100 and 200. To this end, a pair of polarizers (not shown) may be attached to the outer surfaces of the lower and upper panels 100 and 200.

Lower panel 100 includes a plurality of gate conductors, such as a plurality of gate lines 121, a plurality of voltage drop gate lines 123, and a plurality of storage electrode lines 125, that are formed on an insulation substrate 110.

The gate line 121 and the voltage drop gate line 123 substantially extend in a horizontal direction and are configured to transmit gate signals. The gate line 121 includes a first gate electrode 124h and a second gate electrode 124l that protrude upward and downward, and the voltage drop gate line 123 includes a third gate electrode 124c that protrudes upward. The first gate electrode 124h and the second gate electrode 124l are connected to one another and form one protrusion portion.

The storage electrode line 125 substantially extends in a horizontal direction and is configured to transmit a predetermined voltage, such as a common voltage Vcom. The storage electrode line 125 includes storage electrodes 127a, 127b, and 127c and a capacitive electrode 126 extending downward. The storage electrode line 125 includes two first vertical storage electrodes 127a extending upward, a first horizontal storage electrode 127b connecting the two first vertical storage electrodes 127a, and a first central vertical storage electrode 127c that is separated from the first horizontal storage electrode 127b and is configured to connect the two first vertical storage electrodes 127a.

The first vertical storage electrode 127a and the first horizontal storage electrode 127b are disposed along the edge of the first pixel electrode 191h and, as such, partially overlap the first pixel electrode 191h.

Further, the liquid crystal display of FIG. 27 may also include two additional second vertical storage electrodes 128a and a second horizontal storage electrode 128b that connect the two second vertical storage electrodes 128a. The second vertical storage electrode 128a and the second horizontal storage electrode 128b are disposed along the edge of the second pixel electrode 191l, and as such, partially overlap the second pixel electrode 191l. The second storage electrodes 128a and 128b may be connected to an additional storage electrode line (not shown).

A gate insulating layer 140 is disposed on the gate conductors 121, 123, and 125.

A plurality of semiconductor stripes, including semiconductors 154h, 154l, 154c, and 157 (that may be made of amorphous or crystalline silicon, and/or the like) are disposed on the gate insulating layer 140. The semiconductor stripes substantially extend in a vertical direction, such that the first and second semiconductors 154*h* and 154*l* extend toward the first and second gate electrodes 124*h* and 124*l* and are connected to one another, whereas the third semiconductor 154*c* is connected to the second semiconductor 154*l*. The third semiconductor 154*c* extends and, thereby, forms a fourth semiconductor 157.

A plurality of ohmic contacts (e.g., ohmic contacts 164*b* and 167) are disposed on the semiconductors 154*h*, 154*l*, and 154*c*, such that a first ohmic contact (not shown) is disposed on the first semiconductor 154*h*, and a second ohmic contact 164*b* and a third ohmic contact (not shown) are disposed on the second semiconductor 154*l* and the third semiconductor 154*c*, respectively. The third ohmic contact is configured to extend and, thereby, forms a fourth ohmic contact 167.

A data conductor that includes a plurality of data lines 171, a plurality of first drain electrodes 175*h*, a plurality of second drain electrodes 175*l*, and a plurality of third drain electrodes 175*c* is disposed on the ohmic contacts 164*b* and 167.

The data line 171 is configured to transmit a data signal and substantially extends in a vertical direction and crosses the gate line 121 and the voltage drop gate line 123. Each data line 171 includes a first source electrode 173*h* and a second source electrode 173*l*. The first source electrode 173*h* and the second source electrode 173*l* are extended toward the first gate electrode 124*h* and the second gate electrode 124*l*.

The first drain electrode 175*h*, the second drain electrode 175*l*, and the third drain electrode 175*c* each include one wide end portion and another rod-shaped end portion. The respective rod-shaped end portions of the first drain electrode 175*h* and the second drain electrode 175*l* are partially surrounded by the first source electrode 173*h* and the second source electrode 173*l*. The wide end portion of the second drain electrode 175*l* extends to form a U-shaped third source electrode 173*c*. The wide end portion 177*c* of the third drain electrode 175*c* overlaps the capacitive electrode 126 and, thereby, forms the voltage drop capacitor Cstd. The rod-shaped end portion is partially surrounded by the third source electrode 173*c*.

The first, second, and third gate electrodes 124*h*, 124*l*, and 124*c*, the first, second, and third source electrodes 173*h*, 173*l*, and 173*c*, the first, second, and third drain electrodes 175*h*, 175*l*, and 175*c*, and the first, second, and third semiconductors 154*h*, 154*l*, and 154*c* form first, second, and third thin film transistors (TFT) Qh, Ql, and Qc. A channel is formed in each of the semiconductors 154*h*, 154*l*, and 154*c* between each of the source electrodes 173*h*, 173*l*, and 173*c* and each of the drain electrodes 175*h*, 175*l*, and 175*c*.

The semiconductors 154*h*, 154*l*, and 154*c* may have substantially the same flat surface shape as the data conductors 171, 175*h*, 175*l*, and 175*c* and the ohmic contacts 164*l* and 167. It is noted, however, that the surface of the semiconductors 154*h*, 154*l*,*a* and 154*c* may include a channel region between the source electrodes 173*h*, 173*l*, and 173*c* and the drain electrodes 175*h*, 175*l*, and 175*c*. That is, respective spaces are disposed between the source electrodes 173*h*, 173*l*, and 173*c* and the drain electrodes 175*h*, 175*l*, and 175*c*, and an exposed portion is not covered by the data conductors 171, 175*h*, 175*l*, and 175*c* in the semiconductor stripes, including the semiconductors 154*h*, 154*l*, and 154*c*.

A lower passivation layer 180*p* that may be made of an inorganic insulator, such as silicon nitride or silicon oxide, is disposed on the data conductors 171, 175*h*, 175*l*, and 175*c* and the exposed portion of the semiconductors 154*h*, 154*l*, and 154*c*.

A color filter 230 is disposed on the lower passivation layer 180*p*. The color filter 230 is disposed in most regions other than regions in which the first thin film transistor Qh, the second thin film transistor Ql, and the third thin film transistor Qc are disposed. It is noted, however, that the color filter 230 may be disposed in the upper panel 200, or may longitudinally extend in a vertical direction along the space between the data lines 171, which are adjacent to one another. Each color filter 230 may be configured to facilitate the presentation of any one of, for instance, three primary colors, e.g., red, green, and blue colors. It is noted, however, that the color filters 230 may be configured to facilitate presentation of any color.

A light blocking member 220 is disposed in the region in which the color filter 230 is not disposed, and disposed on a portion of the color filter 230. The light blocking member 220 may also be referred to as a black matrix. To this end, the light blocking member 220 may be configured to prevent light leakage. The light blocking member 220 extends along the gate line 121 and voltage drop gate line 123 to extend upward and downward, and includes at least one of a first light blocking member (not shown) that covers the region in which the first thin film transistor Qh, the second thin film transistor Ql, and the third thin film transistor Qc are disposed, and a second light blocking member (not shown) extending along the data line 171. The height (or thickness) of a portion of the light blocking member 220 may be smaller than that of the color filter 230.

An upper passivation layer 180*q* is disposed on the color filter 230 and the light blocking member 220. The upper passivation layer 180*q* is configured to prevent the color filter 230 and the light blocking member 220 from being lifted, as well as configured to suppress contamination of the liquid crystal layer 3 by, for instance, an organic material, such as a solvent, flowing from the color filter 230. In this manner, the upper passivation layer 180*q* is configured to prevent defects such, as afterimages, from occurring when driving the liquid crystal display device to present an image. A plurality of first contact holes (or vias) 185*h* and a plurality of second contact holes (or vias) 185*l* may be formed through the lower passivation layer 180*p*, the light blocking member 220, and the upper passivation layer 180*q*, so that the wide end portion of the first drain electrode 175*h* and the wide end portion of the second drain electrode 175*l* can be exposed. To this end, it is noted that a plurality of pixel electrodes 191 are disposed on the upper passivation layer 180*q*. The pixel electrode 191 includes cutouts 92*a* and 92*b* that are disposed along the edges of pixel electrode 191. The arrangement of the liquid crystal molecules 31 may be controlled in a desired direction via the disposition of the cutouts 92*a* and 92*b* along the edges of the pixel electrode 191, which may be applied with voltage to form a horizontal electric field even at the edge of the pixel area.

As seen in FIG. 27, each pixel electrode 191 includes a first subpixel electrode 191*h* and a second subpixel electrode 191*l* that are separated from one another. The gate lines 121 and 123 are disposed between the first and second subpixel electrodes 191*h* and 191*l*, which are disposed above and beneath the pixel area with the gate lines 121 and 123 being disposed at (or near) the center. In this manner, the first and second subpixel electrodes 191*h* and 191*l* are adjacent to one another in a column direction.

The first subpixel electrode 191*h* and the second subpixel electrode 191*l* are configured to receive a data voltage via the first contact hole 185*h* and the second contact hole 185*l* from the first drain electrode 175*h* and the second drain electrode 175*l*, respectively. The first subpixel electrode 191*h* and the second subpixel electrode 191*l* to which the data voltage is applied are configured to generate (or otherwise impose) an electric field in conjunction with the common electrode 270 of the upper panel 200. As previously mentioned, the electric field may be utilized to control a direction of the liquid crystal molecules 31 of the liquid crystal layer 3 disposed between the two electrodes 191 and 270. It is noted that the luminance of light propagating through the liquid crystal layer 3 may be affected based on the direction of the liquid crystal molecules 31.

The first subpixel electrode 191h, the common electrode 270, and the liquid crystal layer 3 disposed therebetween form the first liquid crystal capacitor Clch, whereas the second subpixel electrode 191l, the common electrode 270, and the liquid crystal layer 3 disposed therebetween form the second liquid crystal capacitor Clcl. It is noted that the first and second liquid crystal capacitors Clch and Clcl are utilized to maintain an applied voltage for a period of time when the first and second thin film transistors Qh and Ql are turned off.

The first and second subpixel electrodes 191h and 191l are disposed to overlap the storage electrodes 127a, 127b, 127c, 128a, 128b and the storage electrode line 125 and, thereby, configured to form the first and second storage capacitors Csth and Cstl. The first and second storage capacitors Csth and Cstl are configured to improve (or strengthen) the voltage storage ability of the first and second liquid crystal capacitors Clch and Clcl.

The capacitive electrode 126 and an extending portion 177c of the third drain electrode 175c are disposed to overlap with the gate insulating layer 140, such that the semiconductor layers 157 and 167 are disposed therebetween and, thereby, disposed to form the voltage drop capacitor Cstd. According to exemplary embodiments, the semiconductor layers 157 and 167 may be disposed between the capacitive electrode 126 and the extending portion 177c of the third drain electrode 175c and, thereby, configured to eliminate the voltage drop capacitor Cstd.

A coloring member 320 is disposed on the upper passivation layer 180q. The coloring member 320 is disposed on the light blocking member 220. The coloring member 320 extends along the gate line 121 and the voltage drop gate line 123, as well as expands upward and downward. To this end, the coloring member 320 includes at least one of a first coloring member (not shown) that extends along a first light blocking member (not shown) covering the region in which the first thin film transistor Qh, the second thin film transistor Ql, and the third thin film transistor Qc are disposed and disposed along a second coloring member (not show) extending along a second light blocking member (not show) that extends along the data line 171.

The coloring member 320 is configured to compensate for a difference in height of the light blocking member 220 and the color filter 230 and, thereby, enables a cell gap between the portion of the liquid crystal layer 3 disposed on the color filter 230 and the portion of liquid crystal layer 3 disposed on the light blocking member 220 to be controlled. The coloring member 320 is also configured to reduce the amount of light leakage associated with the light blocking member 220. Since the coloring members 320 is configured to compensate for a difference in height (or thickness) of the light blocking member 220 and the color filter 230, the liquid crystal molecules 31 disposed between the light blocking member 220 and the color filter 230 that may not be precisely controlled in the step region between the light blocking member 220 and the color filter 230, that the coloring member 320 enables the occurrence of light leakage of the edge portion of the pixel electrode 191 to be prevented (or reduced). In addition, since the cell gap in the region associated with the light blocking member 220 is decreased, the average cell gap is decreased. This enables the total amount of liquid crystal utilized in the liquid crystal display to be decreased.

A lower alignment layer (11) may be disposed on the pixel electrode 191, the exposed upper passivation layer 180q, and the coloring members 320. The lower alignment layer may 11 be a vertical alignment layer, and may include a photosensitive material.

The upper panel 200 includes a common electrode 270 disposed on the insulation substrate 210. The common electrode 270 includes a plurality of cutouts 271a and 271b.

The first cutout 271a of the common electrode 270 is disposed in association with the first subpixel electrode 191h, and the second cutout 271b is disposed in association with the second subpixel electrode 191l.

As previously mentioned, the first cutout 271a and the second cutout 271b may exhibit a cross shape including four ends, such that one or more of the ends protrude farther than the corresponding edges of the first subpixel electrode 191h and the second subpixel electrode 191l. As such, the fringe field may be stabilized as the fringe field may be applied up to the edge of the pixel area because the edge of the first and second cutouts 271a and 271b of the common electrode 270 protrude further than the edge of the pixel electrode 191, itself. In this manner, the arrangement of the liquid crystal molecules 31 may be more effectively controlled in a desired direction even at the edge of the pixel area.

According to exemplary embodiments, the widths of the first cutout 271a and the second cutout 271b may be about three times or less than the thickness of the liquid crystal layer 3, i.e., the cell gap of the liquid crystal display device. Further, the first subpixel electrode 191h and the second subpixel electrode 191l may be divided into a plurality of subregions. That is, a plurality of subregions may be defined by the edges of the first cutout 271a and the second cutout 271b and the first subpixel electrode 191h and the second subpixel electrode 191l.

An upper alignment layer (21) may be disposed on the common electrode 270. The upper alignment layer 21 may be a vertical alignment layer, and may include a photo-sensitive material.

A polarizer (not shown) may be disposed on the outer surfaces of the lower and upper panels 100 and 200. In exemplary embodiments, the transmissive axes of the polarizers may be orthogonal to one another, such that one transmissive axis of the above-noted transmissive axes is parallel to the gate line 121. It is noted, however, that only one polarizer may be utilized and, thereby, disposed on only one outer surface of the lower and upper panels 100 and 200.

The liquid crystal layer 3 includes liquid crystal molecules 31 exhibiting a negative dielectric anisotropy. In exemplary embodiments, the liquid crystal molecules 31 of the liquid crystal layer 3 may be aligned so that their longitudinal axes are vertical (or perpendicular) to the surfaces of the lower and upper panels 100 and 200 in an unexcited state, i.e., when no electric field is imposed upon liquid crystal layer 3. According to exemplary embodiments, incident light may not be able to pass through crossed polarizers of the lower and upper panels 100 and 200, and as such, may be blocked in a state when an electric field is not imposed upon liquid crystal layer 3.

As described above, the first subpixel electrode 191h and the second subpixel electrode 191l respectively applied with the data voltage are configured, with the common electrode 270, to impose an electric field on the liquid crystal layer 3, so that the liquid crystal molecules 31 of the liquid crystal layer 3 (which are vertically aligned when no electric field is imposed on liquid crystal layer 3), are inclined in in a horizontal direction to the surfaces of the pixel electrode 191 and the common electrode 270. In this manner, the luminance of light propagating through the liquid crystal layer 3 may vary according to the degree of inclination of the liquid crystal molecules 31.

According to exemplary embodiments, the liquid crystal display may further include a spacer 325 configured to maintain the cell gap between the lower and upper panels 100 and 200. The spacer 325 may be disposed on the same layer as the coloring members 320.

As previously mentioned, the liquid crystal layer 3 disposed between the lower panel 100 and the upper panel 200 includes liquid crystal molecules 31 exhibiting a negative dielectric anisotropy. The liquid crystal layer 3 may include one or more polymers. In exemplary embodiments, the liquid crystal molecules 31 may be aligned so that their longitudinal axes are vertical (or perpendicular) to the surface of the lower and upper panels 100 and 200 in an unexcited state, i.e., when no electric field is imposed upon liquid crystal layer 3. According to exemplary embodiments, the liquid crystal molecules maybe initially arranged to exhibit a pretilt, such that ones of their longitudinal axes are arranged substantially parallel to one of four directions extending toward the center portion of cutouts 271a and 271b of the common electrode 270 from one of four different portions where the edges of the first and second subpixel electrodes 191h and 191l meet the cutouts 271a and 271b. Accordingly, each of the first and second subpixel electrodes 191h and 191l has four subregions of which the pretilt directions of the liquid crystal modules 31 are different from one another. In this manner, a cross polarizer may be formed, such that incident light may be prevented from propagating therethrough and, as such, the incident light may be blocked in a state when an electric field is not imposed upon liquid crystal layer 3.

The previously described storage electrodes 127a, 127b, and 127c may be disposed along the lateral edges of the four subregions of the first subpixel electrode 191h. Thus, a texture (or pattern) that may be generated in an interface of the subregions of the first subpixel electrode 191h can be covered. Accordingly, deterioration of display quality that may occur in the interface of the subregions of the first subpixel electrode 191h can be prevented (or at least reduced).

In exemplary embodiments, the cutout 271a and 271b having the cross shape are formed on the common electrode 270, but the cutout 271a and 271b may be formed on at least one of the pixel electrode 191 and the common electrode 270 that are the field generating electrodes. Specifically, the cutout 271a and 271b exhibiting the cross shape may be formed on the pixel electrode 191, or may be formed on both of the pixel electrode 191 and the common electrode 270.

Figure 29:
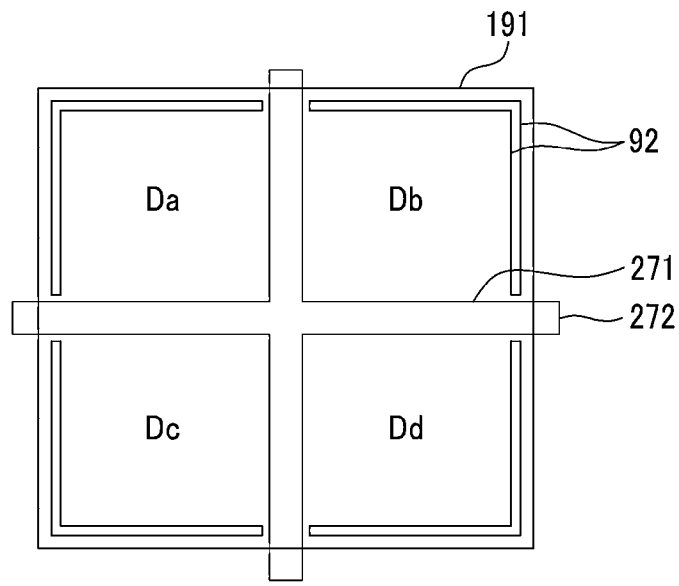
FIG. 29 is a plan view of a region of a field generating electrode of the liquid crystal display of FIG. 27, according to exemplary embodiments.

FIG. 29 is a plan view of a region of a field generating electrode of the liquid crystal display of FIG. 27, according to exemplary embodiments.

As shown in FIG. 29, the region of the field generating electrode includes pixel electrode 191 facing the cutout 271 of the common electrode 270, and a cutout 92 of the pixel electrode 191 surrounding the cutout 271 of the common electrode 270. The cutout 92 may not extend in those regions where cutout 271 exists in the common electrode 270. When viewed from above, the region defined by the cutout 271 of the common electrode 270 and the edge of the pixel electrode 191 may be divided into a plurality of subregions Da, Db, Dc, and Dd, and the plurality of subregions may be symmetrical to one another about the cross-extensions of the cutout 271. In this manner, the pixel electrode 191 including cutouts 92 may be similarly configured as the pixel electrode 191 and cutouts 92 described in association with FIG. 25A.

In exemplary embodiments, when viewed down upon, the cutout 271 of the common electrode 270 may have a cross shape, and an edge 272 of the cutout 271 that protrudes farther than the corresponding lateral edge of the pixel electrode 191. The width of the cutout 271 of the common electrode 270 may be about 2 μm to about 10 μm, e.g., about 5 μm to about 7 μm, such as 6 μm.

The cutout 92 of the pixel electrode 191 is generally formed in the shape of a quadrilateral (e.g., square) ring along the bounding lateral edges of the pixel electrode 191, however, the cutout 92 is disconnected in respective regions of pixel electrode 191 where corresponding extensions of the cutout 271 of the common electrode 270 are formed. In this manner, the portion where the cutout 92 formed in the pixel electrode 191 is disconnected may be utilized as a connection portion of the pixel electrode 191. The width of the connection portion of the pixel electrode 191 is larger than the width of the corresponding cutout 271.

Further, it is noted that the cutout 92 of the pixel electrode 191 may be spaced apart from the edge of the pixel electrode 191 by an interval (or multiple) of two times or less than the cell gap of the liquid crystal display. For instance, the width of the cutout 92 may be two times or less than the cell gap of the liquid crystal display. Also, the width of the cutout 271 may be about three times or less than the thickness of the liquid crystal layer 3, i.e., the cell gap of the liquid crystal display device.

While the cutout 271 is depicted in association with the common electrode 270, it is contemplated that the cutout 271 may be associated with (e.g., formed in) the pixel electrode 191 and the common electrode 270. For instance, the cutout 271 may be formed on the pixel electrode 191, or may be formed on both of the pixel electrode 191 and the common electrode 270.

Figure 30:
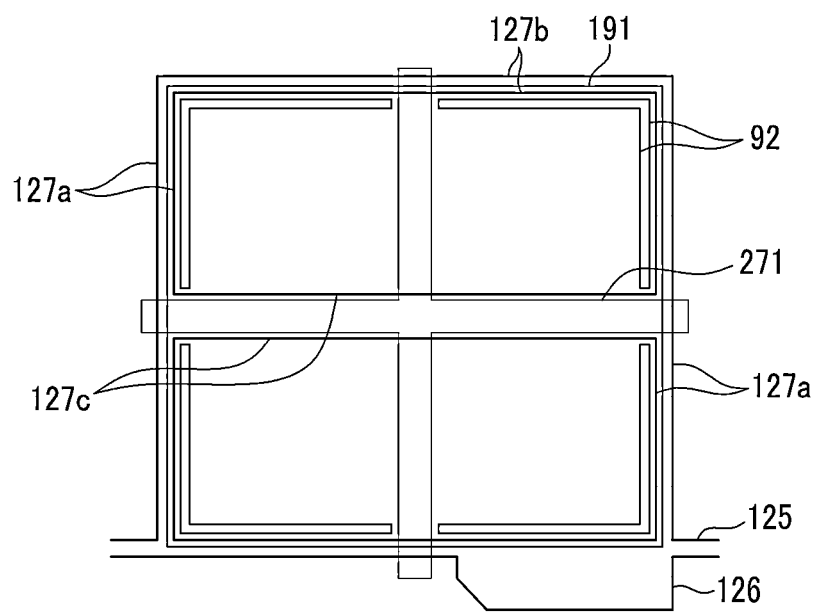
FIG. 30 is a plan view of a region of a field generating electrode and a storage electrode of a liquid crystal display, according to exemplary embodiments.

FIG. 30 is a plan view of a region of a field generating electrode and a storage electrode of a liquid crystal display, according to exemplary embodiments.

As shown in FIG. 30, a storage electrode line 125 of the liquid crystal display includes two vertical storage electrodes 127a that extend upward and downward, a horizontal storage electrode 127b that connects the two vertical storage electrodes 127a, and a central horizontal storage electrode 127c that is separated from the horizontal storage electrode 127b and connects the two vertical storage electrodes 127a to one another.

The vertical storage electrode 127a and the horizontal storage electrode 127b are disposed along the edge of the first pixel electrode 191h and, as such, at least partially overlap the first pixel electrode 191h.

The central horizontal storage electrode 127c is disposed along a horizontal center line of the first pixel electrode 191h, and overlaps a horizontal portion of the cross-shaped cutout 271.

When the liquid crystal display is viewed, if the optical axis of the liquid crystal is viewed in association with the presentation of an image, the optical axis does not contribute to luminance, whereas if the longitudinal axis of the liquid crystal is viewed in association with the presentation of an image, the longitudinal axis will contribute to luminance. When the liquid crystal display is viewed from the left or right side of the liquid crystal display (i.e., from an "off-center" vantage point), the optical axis or longitudinal axis of the liquid crystal may be viewed in each portion where a texture is generated.

In general, the longitudinal axis of the liquid crystal molecule 31 is arranged perpendicular to the cross-shaped cutout 271 in the interface of the cross-shaped cutout 371. The longitudinal axis of the liquid crystal molecule 31 is arranged in a vertical direction in the interface of the horizontal portion of the cross-shaped cutout 271, such that the texture due to the longitudinal axis of the liquid crystal molecule 31 can be viewed when the liquid crystal display is viewed from the left side or the right side, i.e., from an "off-center" vantage point.

The central horizontal storage electrode 127c indicates a texture that exposes a longitudinal axis of the liquid crystal molecule 31 when the liquid crystal display is viewed from the left side or the right side of the display. Accordingly, texture generated in the edges of the plurality of subregions Da, Db, Dc, and Dd of the first pixel electrode 191h that exhibits relatively high luminance can be covered so that the deterioration of display quality that may occur in the interface of the subregions Da, Db, Dc, and Dd can be prevented.

Accordingly, the liquid crystal display includes the storage electrodes 127a, 127b, and 127c disposed along the edges of the plurality of subregions Da, Db, Dc, and Dd of the pixel electrode 191. The storage electrodes 127a, 127b, and 127c at least partially overlapping the pixel electrode 191 such that the storage capacity can be assured, and at the same time, the texture that may be generated from the interface of the plurality of subregions Da, Db, Dc, and Dd of the pixel electrode 191 can be covered. As such, deterioration of display quality in the interface of the subregions can be prevented.

In particular, since the central horizontal storage electrode 127c disposed along the horizontal center line of the first pixel electrode 191h that expresses a relatively bright gray and overlapping a horizontal portion of the cross-shaped cutout 271 is included, portions that expose longitudinal axes of liquid crystals modules 31 from the left side or the right side of the liquid crystal display can be covered. To this end, the texture that may be generated from exposure of the longitudinal axes of the liquid crystals 31 can be reduced.

Figure 31:
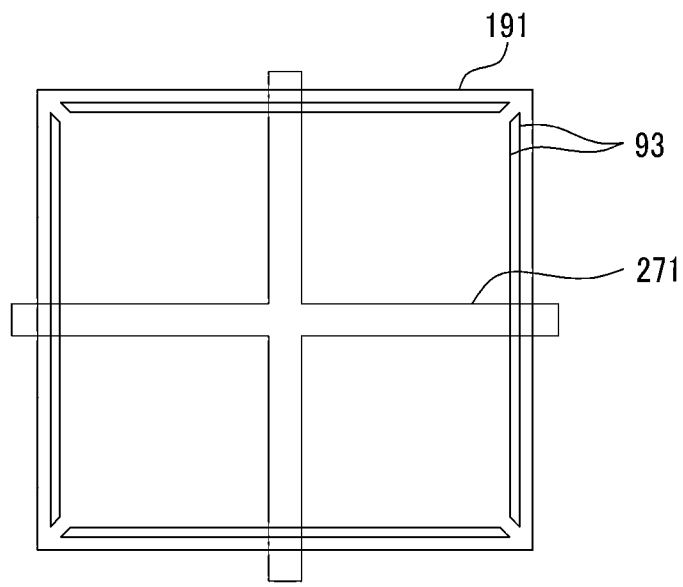
FIG. 31 is a plan view of a region of a field generating electrode of a liquid crystal display, according to exemplary embodiments.

FIG. 31 is a plan view of a region of a field generating electrode of a liquid crystal display, according to exemplary embodiments.

As shown in FIG. 31, the region of the field generating electrode includes a pixel electrode 191 facing the cutout 271 of the common electrode 270, and a cutout 93 of the pixel electrode 191 surrounding the cutout 271 of the common electrode 270. When the liquid crystal display is viewed from above, the region defined by the cutout 271 of the common electrode 270 and the edge of the pixel electrode 191 may be divided into a plurality of subregions Da, Db, Dc, and Dd. The plurality of subregions Da, Db, Dc, and Dd may be symmetrical to one another about central axes of the cutout 271.

As described above, the cutout 271 of the common electrode 270 may have a cross shape, and an edge 272 of the cutout 271 protrudes beyond the corresponding edge of the pixel electrode 191. The width of the cutout 271 of the common electrode 270 may be about 2 μm to about 10 μm, e.g., about 5 μm to about 7 μm, such as 6 μm.

The cutout 93 of the pixel electrode 191 is disposed in almost a quadrilateral ring shape along the edge of the pixel electrode 191. That is, the ring shape is disconnected at four portions at which the edges of the pixel electrode 191 extending in different directions meet, i.e., at the vertices of pixel electrode 191. The respective portions at which the cutout 93 is disconnected may be utilized as a connection portion of the pixel electrode 191. Dissimilarly to the pixel region described in association with FIG. 29, the cutout 93 of the pixel electrode 191 partially overlaps the cutout 271 of the common electrode 270.

The cutout 93 of the pixel electrode 191 may be disposed at a position spaced apart from the edge of the pixel electrode 191 by an interval (or multiple) of two times or less than the cell gap of the liquid crystal display. For instance, the width of the cutout 93 may be two times or less than the cell gap of the liquid crystal display.

In exemplary embodiments, the width of the cutout 271 may be about three times or less than the thickness of the liquid crystal layer 3, i.e., the cell gap of the liquid crystal display.

It is noted that while the cutout 271 is illustrated as being disposed in association with the common electrode 270, it is contemplated that the cutout 271 may be disposed in association with at least one of the pixel electrode 191 and the common electrode 270. For instance, the cutout 271 may be disposed in association with the pixel electrode 191, or may be disposed in association with both the pixel electrode 191 and the common electrode 270.

Figure 32:
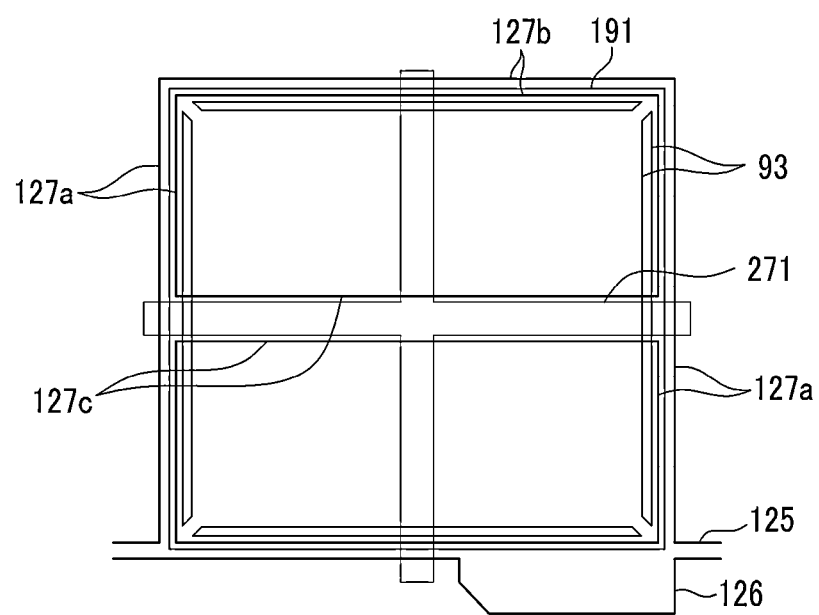
FIG. 32 is a plan view of a region of a field generating electrode and a storage electrode of a liquid crystal display, according to exemplary embodiments.

FIG. 32 is a plan view of a region of a field generating electrode and a storage electrode of a liquid crystal display, according to exemplary embodiments.

As shown in FIG. 32, a storage electrode line 125 of the liquid crystal display includes two vertical storage electrodes 127a that extend upward and downward, a horizontal storage electrode 127b that connects the two vertical storage electrodes 127a, and a central vertical storage electrode 127c that is separated from (e.g., spaced apart from) the horizontal storage electrode 127b and configured to connect the two vertical storage electrodes 127a.

The vertical storage electrode 127a and the horizontal storage electrode 127b are disposed along the edge of the first pixel electrode 191h and, as such, may partially overlap the first pixel electrode 191h.

The central horizontal storage electrode 127c is formed along a horizontal center line of the first pixel electrode 191h and overlaps a horizontal portion of the cross-shaped cutout 271.

Accordingly, the central horizontal storage electrode 127c enables a texture that shows the longitudinal axes of the liquid crystal when the liquid crystal display device is viewed from the left side or the right side to be covered and, thereby, increases display quality. Further, a texture that may be generated in edges of the subregions Da, Db, Dc, and Dd of the first pixel electrode 191h that exhibits relatively high luminance can be covered so that deterioration of display quality that may occur in an interface of the plurality of subregions Da, Db, Dc, and Dd can be prevented.

As described, the liquid crystal display includes the storage electrodes 127a, 127b, and 127c disposed along the edges of the plurality of subregions Da, Db, Dc, and Dd of the pixel electrode 191 and at least partially overlapping the pixel electrode 191, such that the storage capacity can be assured, and at the same time, the texture that may be generated at the interface of the plurality of subregions Da, Db, Dc, and Dd of the pixel electrode 191 can be covered. As such, deterioration of display quality in the interface of the subregions Da, Db, Dc, and Dd can be prevented.

To this end, since the central horizontal storage electrode 127c formed along the horizontal center line of the first pixel electrode 191h that exhibits a relatively bright gray and overlapping a horizontal portion of the cross-shaped cutout 271 is included, portions that expose the longitudinal axes of liquid crystals from the left side or the right side of the liquid crystal display can be covered, and accordingly, the texture that may be generated from exposure of the longitudinal axes of the liquid crystals can be reduced.

Figure 33:
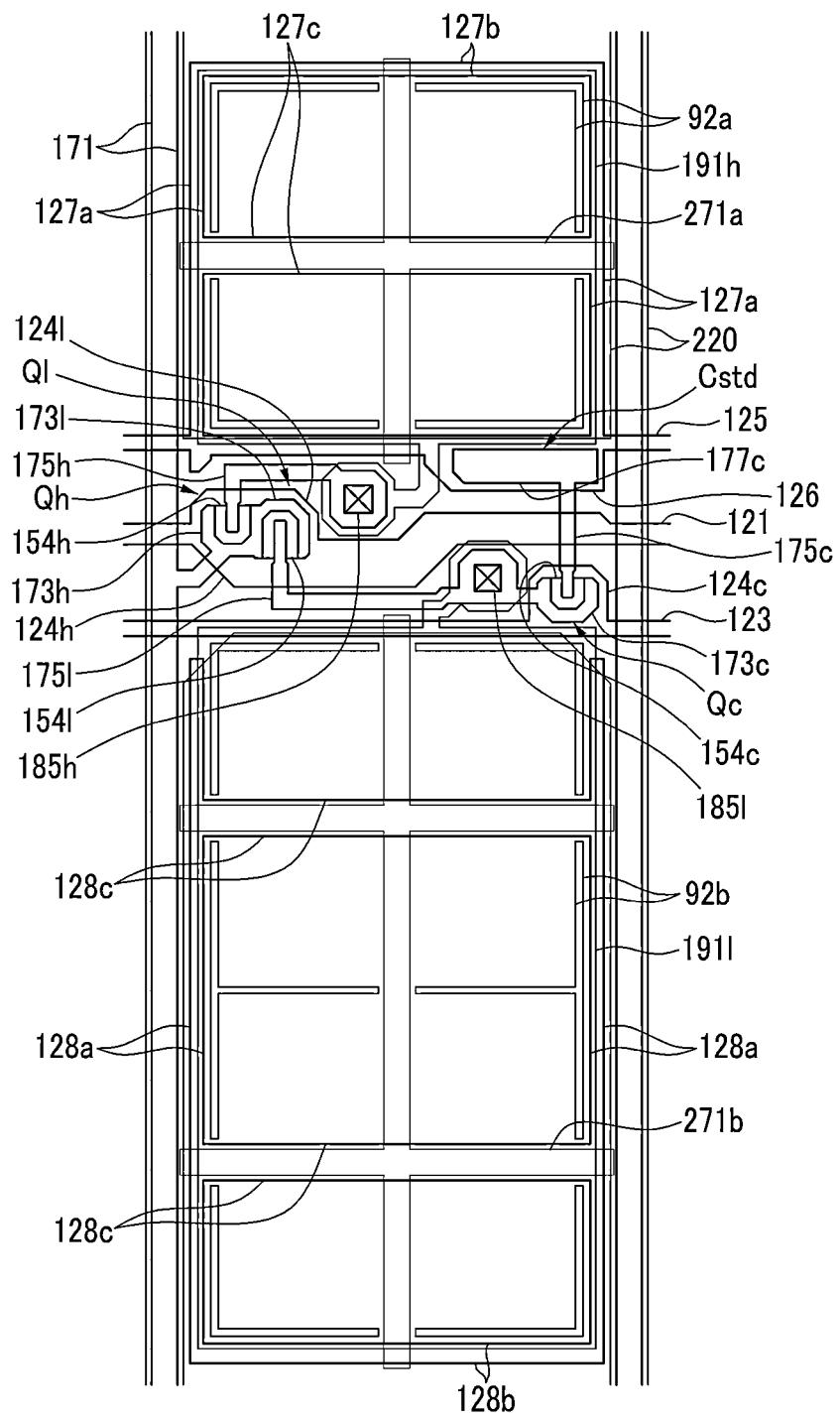
FIG. 33 is a layout view of a liquid crystal display, according to exemplary embodiments.
Figure 34:
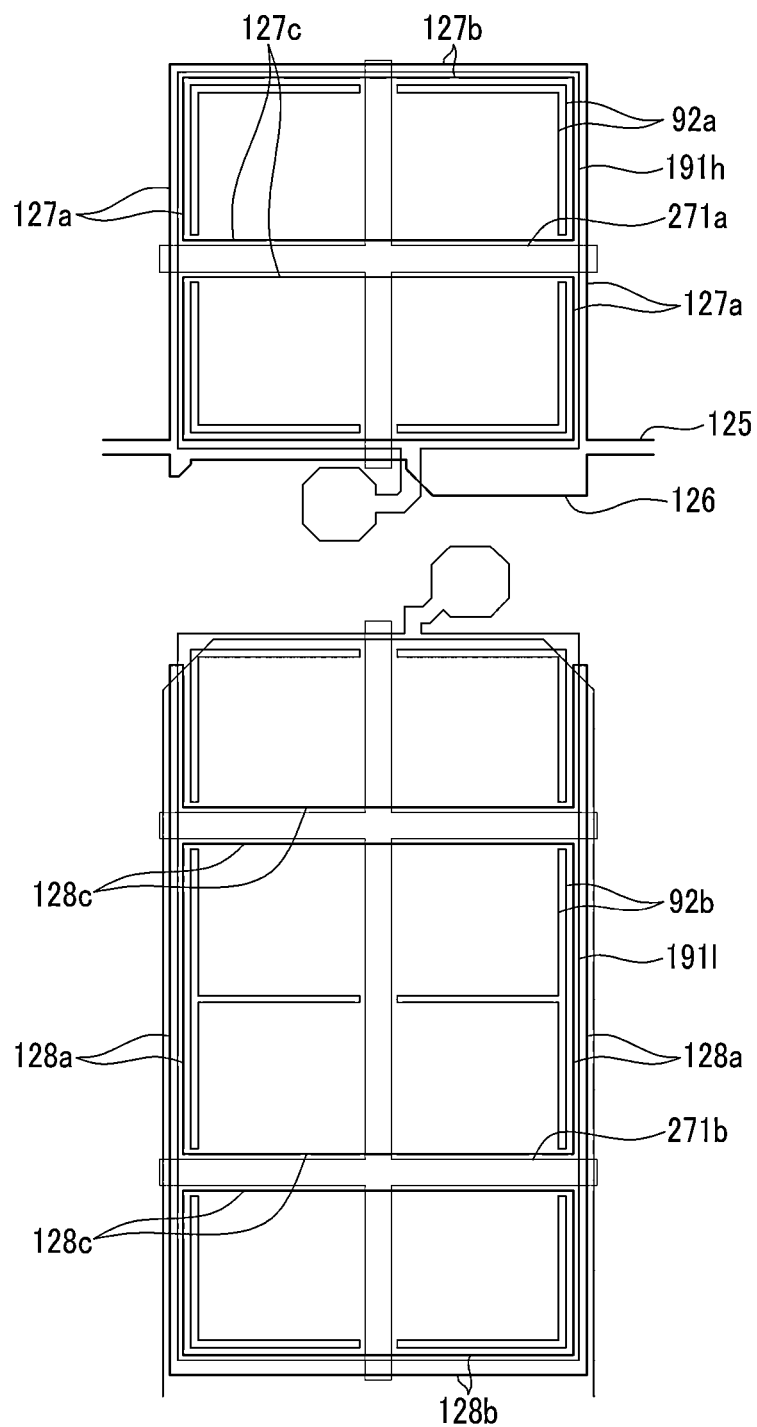
FIG. 34 is a plan view of a region of a field generating electrode and a storage electrode of the liquid crystal display of FIG. 33, according to exemplary embodiments.

FIG. 33 is a layout view of a liquid crystal display, according to exemplary embodiments. FIG. 34 is a plan view of a region of a field generating electrode and a storage electrode of the liquid crystal display of FIG. 33.

As shown, the liquid crystal display is similar to the liquid crystal display described in association with FIGS. 27-31. As such, to avoid unnecessarily obscuring exemplary embodiments described herein, similar descriptions for similar components are omitted.

Unlike the liquid crystal display descried in association with FIGS. 27-31, the liquid crystal display of FIG. 33 includes a second central horizontal storage electrode 128c that overlaps a horizontal portion of a cross-shaped second cutout 271b disposed in correspondence with a second pixel electrode 191l. It is noted that the second central horizontal storage electrode 128c is provided in addition to a second vertical storage electrode 128a and a second horizontal storage electrode 128b that partially overlap the second pixel electrode 191l.

Namely, a storage electrode line 125 includes a storage electrode at least partially overlapping a first pixel electrode 191h, two first vertical storage electrodes 127a extending upward, a first horizontal storage electrode connecting the two first vertical storage electrodes 127a, and a first central horizontal storage electrode 127c separated from the first vertical storage electrode 127b and connecting the two first vertical storage electrodes 127a.

The first vertical storage electrode 127a and the first horizontal storage electrode 127b are disposed along the edge of the first pixel electrode 191h and, as such, at least partially overlap the first pixel electrode 191h.

In exemplary embodiments, the storage electrode line 125 includes two second vertical storage electrodes 128a at least partially overlapping the second pixel electrode 191l, a second horizontal storage electrode 128b connecting the two second vertical storage electrodes 128a, and a second central horizontal storage electrode disposed corresponding to a horizontal portion of the cross-shaped second cutout 271b to connect the two second vertical storage electrodes 128a. The second vertical storage electrode 128a, the second horizontal storage electrode 128b, and the second central horizontal storage electrode 128c are disposed along the edge of the second pixel electrode 191l and, as such, at least partially overlap the second pixel electrode 191l.

The first central horizontal storage electrode 127c and the second central horizontal storage electrode 128c of the liquid crystal display cover a texture that exposes longitudinal axes of the liquid crystal 31 in the first and second pixel electrodes 191h and 191l when the liquid crystal display is viewed from the left side or the right side of the liquid crystal display.

As described, the liquid crystal display includes the storage electrodes disposed along the edges of the plurality of subregions Da, Db, Dc, and Dd of the pixel electrode 191 and at least partially overlapping the pixel electrode 191, such that the storage capacity can be assured. At the same time, the texture that may be generated from the interface of the plurality of subregions Da, Db, Dc, and Dd of the pixel electrode 191 can be covered, and accordingly deterioration of display quality in the interface of the subregions Da, Db, Dc, and Dd can be prevented.

It is noted that the features of the liquid crystal display illustrated in FIGS. 27 and 28 may be implemented in association with the liquid crystal display of FIGS. 33 and 34. In addition, the features and effects of the various constituent elements (or components) of the previously described exemplary embodiments may be the same as the corresponding constituent elements of the exemplary embodiments of FIGS. 33 and 34.

Figure 35:
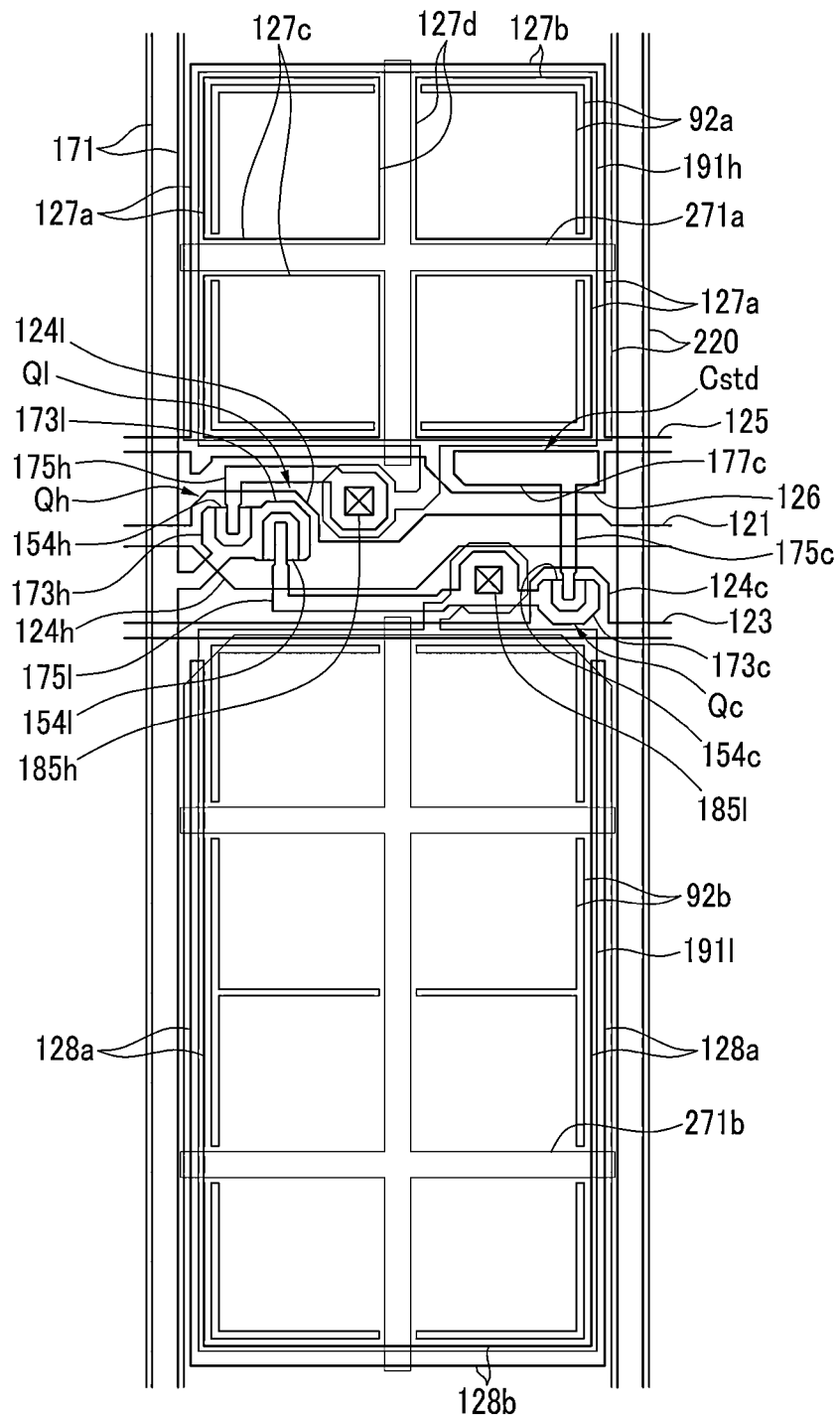
FIG. 35 is a layout view of a liquid crystal display, according to exemplary embodiments.
Figure 36:
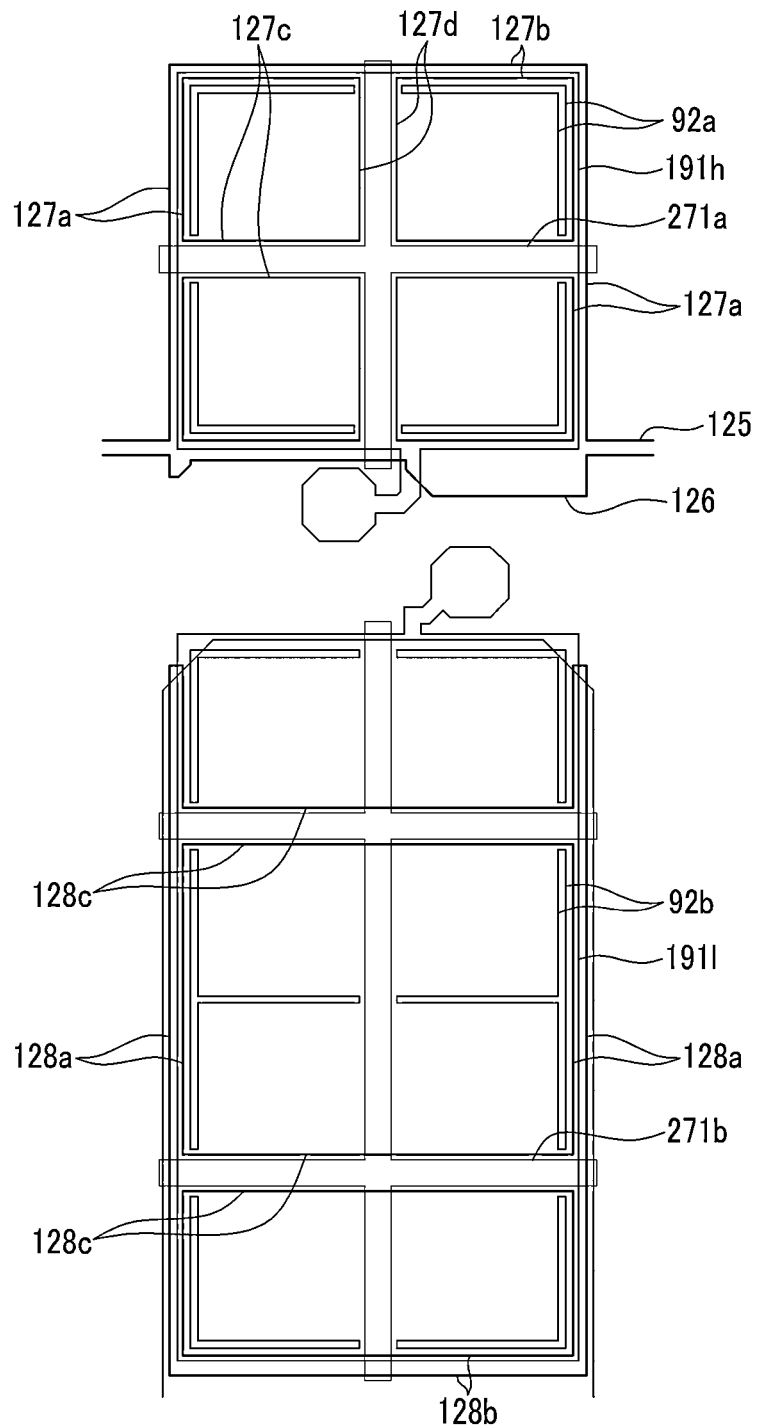
FIG. 36 is a plan view of a region of a field generating electrode and a storage electrode of the liquid crystal display of FIG. 35, according to exemplary embodiments.

FIG. 35 is a layout view of a liquid crystal display, according to exemplary embodiments FIG. 36 is a plan view of a region of a field generating electrode and a storage electrode of the liquid crystal display of FIG. 35.

Referring to FIGS. 35 and 36, the liquid crystal display is similar to the liquid crystal display described in association with FIGS. 27-31. As such, to avoid unnecessarily obscuring exemplary embodiments described herein, similar descriptions for similar components are omitted.

Unlike the liquid crystal display descried with reference to FIGS. 27-31, the liquid crystal display of FIGS. 35 and 36 includes two first vertical storage electrodes 127a at least partially overlapping a first pixel electrode 191h, a first horizontal storage electrode 127b connecting the two first vertical storage electrodes 127a, and a first central vertical storage electrode 127c separated from the first horizontal storage electrode 127b to connect the two first vertical storage electrodes 127a and overlapping a horizontal portion of a first cross-shaped cutout 271a. The liquid crystal display further includes a first central vertical storage electrode 127d overlapping a vertical portion of the first cutout 271a.

In exemplary embodiments, a storage electrode line 125 includes a storage electrode at least partially overlapping the first pixel electrode 191h, two first vertical storage electrodes 127a extending upward, a first horizontal storage electrode 127b connecting the two first vertical storage electrodes 127a, a first central horizontal storage electrode 127c separated from the first horizontal storage electrode 127b to connect the two first vertical storage electrodes 127a and overlapping a horizontal portion of the cross-shaped first cutout 271a. A first central vertical storage electrode 127d overlaps a vertical portion of the first cutout 271a.

The first vertical storage electrode 127a and the first horizontal storage electrode 127b are disposed along the edge of the first pixel electrode 191h and, as such, at least partially overlap the first pixel electrode 191h.

The first central horizontal storage electrode 127c and the first central vertical storage electrode 127d overlap the cross-shaped first cutout 271a.

In addition, the storage electrode line 125 includes two second vertical storage electrodes 128a that at least partially overlap the second pixel electrode 191l and the second horizontal storage electrode 128b connecting the two second vertical storage electrodes 128a.

Accordingly, when the liquid crystal display is viewed from the left side or the right side of the display, the first central horizontal storage electrode 127c is configured to cover a texture exposing a longitudinal axis of liquid crystal in the first pixel electrode 191h. To this end, the first central vertical storage electrode 127d is configured to cover a texture exposing a longitudinal axis of liquid crystal in the first pixel electrode 191h.

In general, in an interface of a cross-shape cutout, longitudinal axes of liquid crystal molecules are arranged in a direction that is perpendicular to the cross-shaped cutout. Thus, the longitudinal axes of the liquid crystal molecules are arranged in a vertical direction in the interface of the horizontal portion of the cross-shaped cutout. As such, texture associated with the longitudinal axes of the liquid crystal molecules may be viewed when the liquid crystal display is viewed from the left side or the right side of the display. The longitudinal axes of the liquid crystal molecules are arranged in a horizontal direction in the interface of the vertical portion of the cross-shaped cutout and, in this manner, texture associated with the longitudinal axes of the liquid crystal molecules may be viewed when the liquid crystal display is viewed from the upper side or the lower side of the display.

However, since the liquid crystal display according to exemplary embodiments includes the first central horizontal storage electrode 127c and the first central vertical storage electrode 127d arranged in locations overlapping the horizontal portion and the vertical portion of the cross-shaped cutout 271, the texture that may be viewed at edges of the subregions Da, Db, Dc, and Dd of the first pixel electrode 191h that exhibit relatively high luminance can be covered. Accordingly, deterioration of display quality in the interfaces of the subregions Da, Db, Dc, and Dd can be prevented.

As described, the liquid crystal display of FIGS. 35 and 36 includes the storage electrodes formed along the edges of the plurality of subregions Da, Db, Dc, and Dd of the pixel electrode 191 and at least partially overlap the pixel electrode 191, such that the storage capacity can be assured. At the same time the texture that may be generated from the interface of the plurality of subregions Da, Db, Dc, and Dd of the pixel electrode 191 can be covered. In this manner, deterioration of display quality in the interface of the subregions Da, Db, Dc, and Dd can be prevented.

It is noted that the features of the liquid crystal display illustrated in FIGS. 27 and 28 may be implemented in association with the liquid crystal display of FIGS. 35 and 36. In addition, the features and effects of the various constituent elements (or components) of the previously described exemplary embodiments may be the same as the corresponding constituent elements of the exemplary embodiments of FIGS. 35 and 36.

Figure 37:
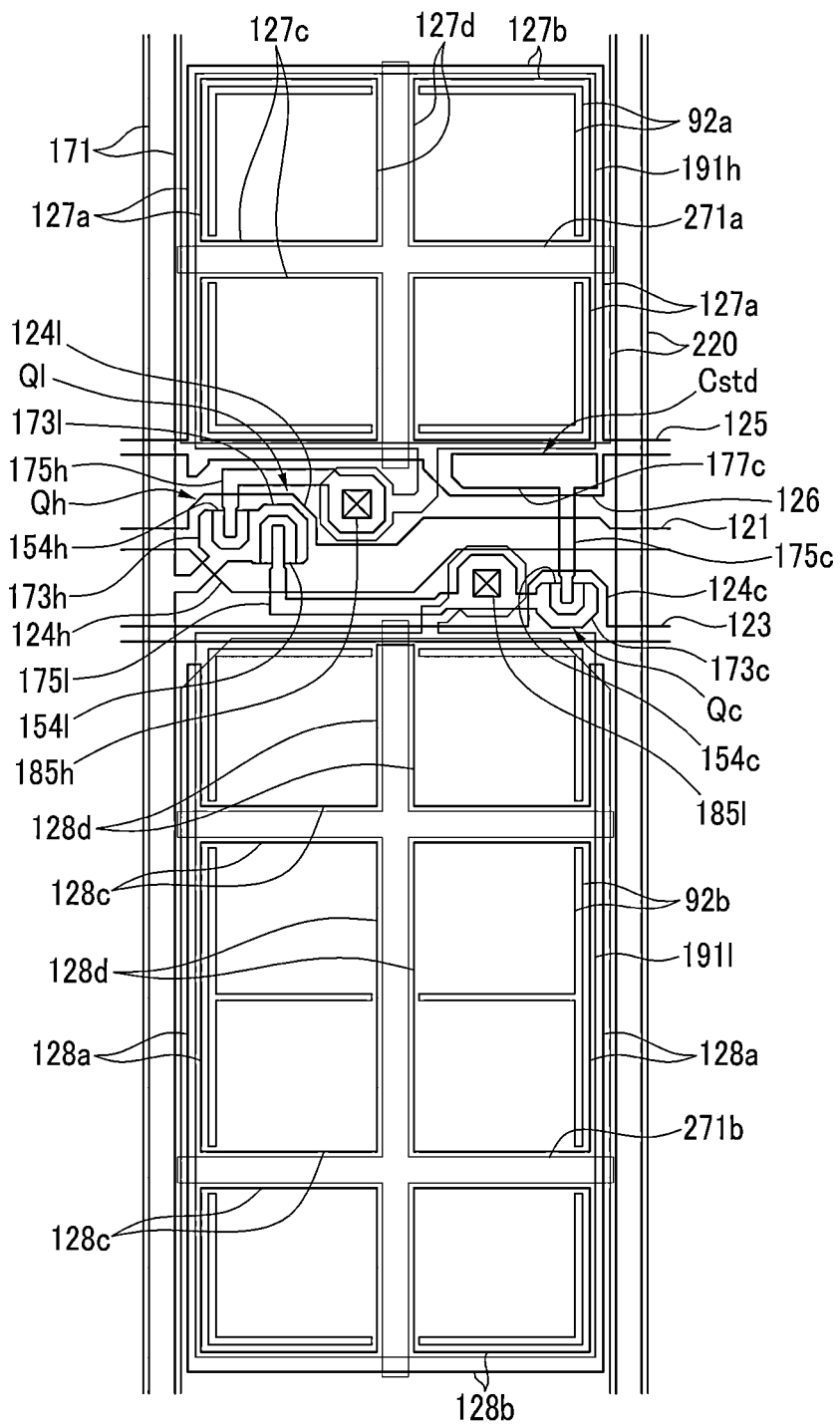
FIG. 37 is a layout view of a liquid crystal display, according to exemplary embodiments.
Figure 38:
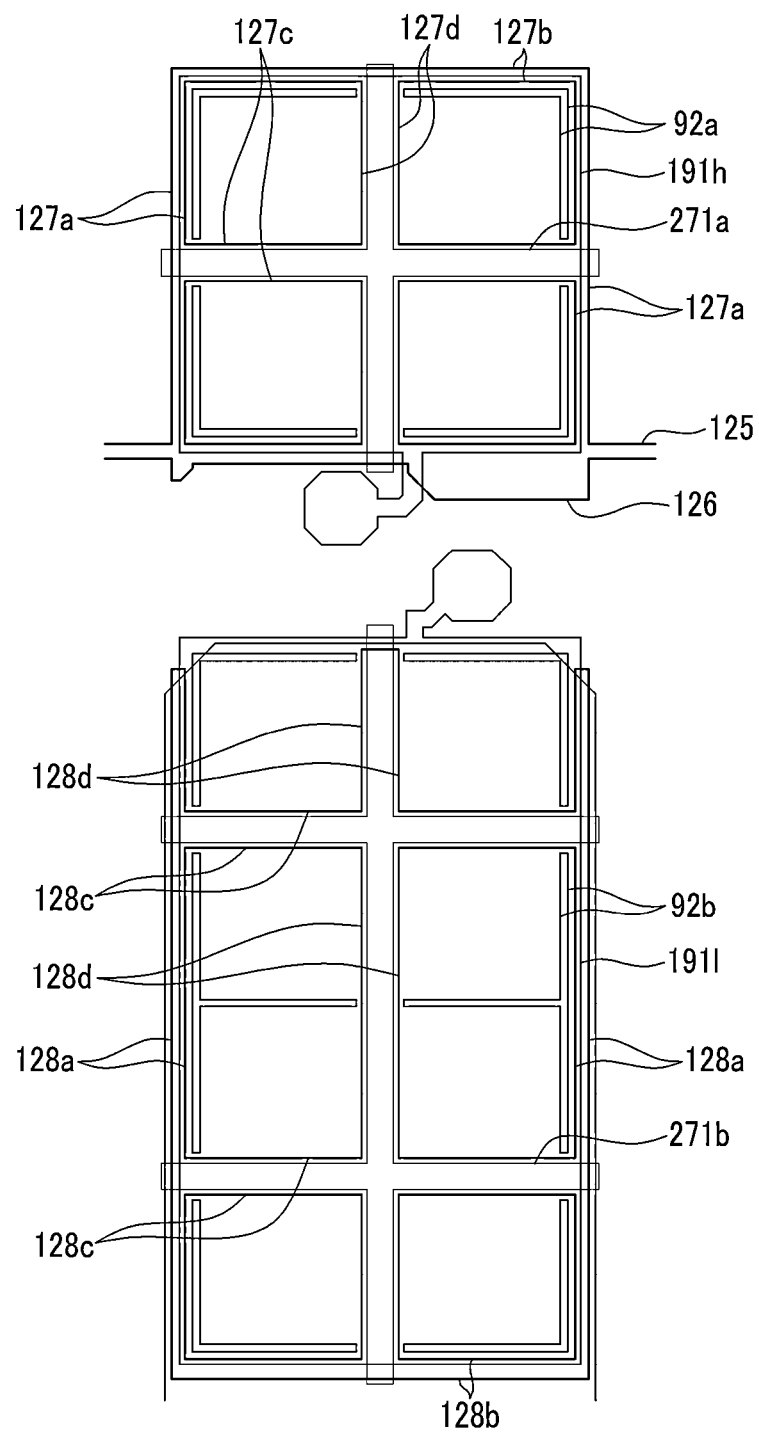
FIG. 38 is a plan view of a region of a field generating electrode and a storage electrode of the liquid crystal display of FIG. 37, according to exemplary embodiments.

FIG. 37 is a layout view of a liquid crystal display, according to exemplary embodiments. FIG. 38 is a plan view of a region of a field generating electrode and a storage electrode of the liquid crystal display of FIG. 37.

Referring to FIGS. 37 and 38, the liquid crystal display is similar to the liquid crystal display described in association with FIGS. 27-31. As such, to avoid unnecessarily obscuring exemplary embodiments described herein, similar descriptions for similar components are omitted.

Unlike the liquid crystal display described in association with FIGS. 27-FIG. 31, the liquid crystal display of FIGS. 37 and 38 includes two first vertical storage electrodes 127a at least partially overlapping a first pixel electrode 191h, a first horizontal storage electrode 127b connecting the two first vertical storage electrodes 127a, and a first central vertical storage electrode 127c separated from the first horizontal storage electrode 127b to connect the two first vertical storage electrodes 127a and overlapping a horizontal portion of a first cross-shaped cutout 271a. The liquid crystal display further includes a first central vertical storage electrode 127d overlapping a vertical portion of the first cutout 271a. In addition, the liquid crystal display includes two second vertical storage electrodes 128a at least partially overlapping a second pixel electrode 191l, a second horizontal storage electrode 128b connecting the two second vertical storage electrodes 128a, a second central horizontal storage electrode 128c connecting the two second vertical storage electrodes 128a and overlapping a horizontal portion of a cross-shaped second cutout 271b. A second central vertical storage electrode 128d overlaps a vertical portion of the second cutout 271b.

According to exemplary embodiments, a storage electrode line 125 includes a storage electrode at least partially overlapping the first pixel electrode 191h, two first vertical storage electrodes 127a extending upward, a first horizontal storage electrode 127b connecting the two first vertical storage electrodes 127a, a first central horizontal storage electrode 127c separated from the first horizontal storage electrode 127b to connect the two first vertical storage electrodes 127a and overlapping a horizontal portion of the cross-shaped first cutout 271a, and a first central vertical storage electrode 127d overlapping a vertical portion of the first cutout 271a.

The first vertical storage electrode 127a and the first horizontal storage electrode 127b are disposed along the edge of the first pixel electrode 191h and, as such, at least partially overlap the first pixel electrode 191h. The first central horizontal storage electrode 127c and the first central vertical storage electrode 127d overlap the cross-shaped first cutout 271a.

In addition, the storage electrode line 125 includes two second vertical storage electrodes 128a at least partially overlapping the second pixel electrode 191l, the second horizontal storage electrode 128b connecting the two second vertical storage electrodes 128a, the second central horizontal storage electrode 128c connecting the two second vertical storage electrodes 128a and overlapping the horizontal portion of the cross-shaped second cutout 271b, and the second central vertical storage electrode 128d overlapping the vertical portion of the second cutout 271b.

The second vertical storage electrode 128a and the second horizontal storage electrode 128b are disposed along the edge of the second pixel electrode 191l and, as such, at least partially overlap the second pixel electrode 191l. The second central horizontal storage electrode 128c and the second central vertical storage electrode 128d overlap the cross-shaped second cutout 271b.

The first central horizontal storage electrode 127c covers a texture exposing a longitudinal axis of liquid crystal 31 in the first pixel electrode 191h when the liquid crystal display is viewed from the left side or the right side of the display. The first central vertical storage electrode 127d covers a texture exposing a longitudinal axis of liquid crystal 31 in the first pixel electrode 191h when the liquid crystal display is viewed from the upper side or the lower side of the display. In addition, the second central horizontal storage electrode 128c covers a texture exposing a longitudinal axis of liquid crystal in the second pixel electrode 191l when the liquid crystal display is viewed from the left side or the right side of the display, and the second central vertical storage electrode 128d covers a texture exposing a longitudinal axis of liquid crystal in the second pixel electrode 191l when the liquid crystal display is viewed from the upper side or the lower side of the display.

In general, in an interface of a cross-shape cutout, longitudinal axes of liquid crystal molecules are arranged in a direction that is perpendicular to the cross-shaped cutout. Thus, the longitudinal axes of the liquid crystal molecules are arranged in a vertical direction in the interface of the horizontal portion of the cross-shaped cutout, and as such, texture associated with the longitudinal axes of the liquid crystal molecules may be viewed when the liquid crystal display is viewed from the left side or the right side of the display. The longitudinal axes of the liquid crystal molecules are arranged in a horizontal direction in the interface of the vertical portion of the cross-shaped cutout and, as such, texture associated with the longitudinal axes of the liquid crystal molecules may be viewed when the liquid crystal display is viewed from the upper side or the lower side of the display.

However, since the liquid crystal display according to the various exemplary embodiments includes the first central horizontal storage electrode 127c, the first central vertical storage electrode 127d, the second central horizontal storage electrode 128c, the second central vertical storage electrode 128d, which are arranged in locations overlapping the horizontal portion and the vertical portion of the cross-shaped cutout, the texture that may be viewed at edges of the subregions Da, Db, Dc, and Dd of the first pixel electrode 191h that exhibits relatively high luminance can be covered. Accordingly, deterioration of display quality in the interfaces of the subregions Da, Db, Dc, and Dd can be prevented.

As described, the liquid crystal display includes the storage electrodes formed along the edges of the plurality of subregions Da, Db, Dc, and Dd of the pixel electrode 191 and at least partially overlap the pixel electrode 191, such that the storage capacity can be assured. At the same time, the texture that may be generated from the interface of the plurality of subregions Da, Db, Dc, and Dd of the pixel electrode 191 can be covered, and accordingly, deterioration of display quality in the interface of the subregions Da, Db, Dc, and Dd can be prevented.

It is noted that the features of the liquid crystal display illustrated in FIGS. 27 and 28 may be implemented in association with the liquid crystal display of FIGS. 37 and 38. In addition, the features and effects of the various constituent elements (or components) of the previously described exemplary embodiments may be the same as the corresponding constituent elements of the exemplary embodiments of FIGS. 37 and 38.

Figure 39:
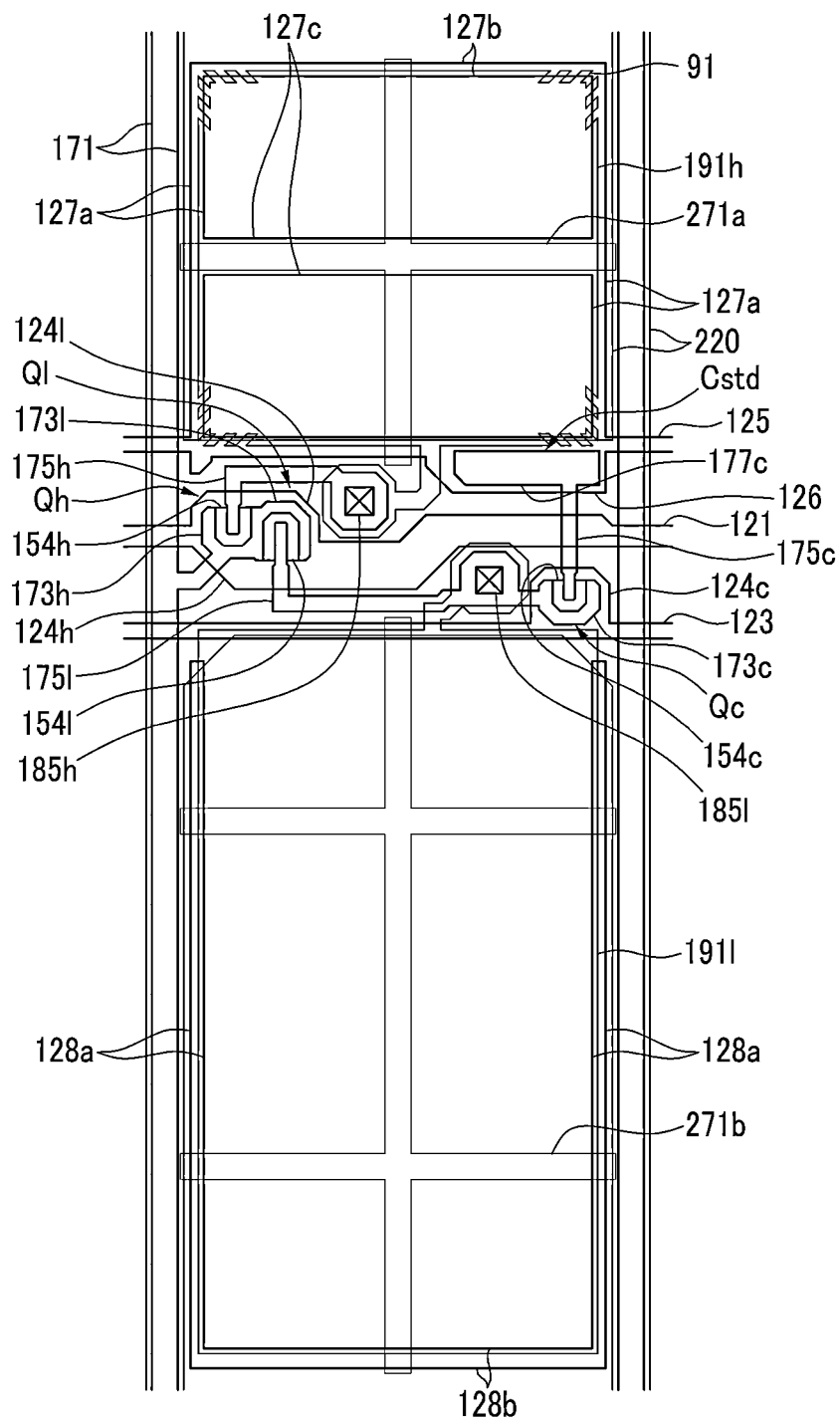
FIG. 39 is a layout view of a liquid crystal display, according to exemplary embodiments.

FIG. 39 is a layout view of a liquid crystal display, according to exemplary embodiments.

As seen in FIG. 39, a first pixel electrode 191h of the liquid crystal display includes a plurality of cutouts 91 formed in a direction parallel with a direction toward a center portion of a region of a field generating electrode from a portion where edges of the pixel electrode 191h extending in different directions meet, rather than having a cutout 92a formed along the edge of the pixel electrode 191h. To this end, it is noted that cutouts 91 of FIG. 39 may be similarly configured as cutouts 91a described in association with FIG. 20. To this end, the plurality of cutouts 91 in FIG. 39 is configured to strongly induce an arrangement direction of the directors of the liquid crystal molecules 31 of an associated liquid crystal layer 3. Thus, the arrangement of the directors of the liquid crystal molecules 31 may be controlled in a desired direction in the edge of the region of the field generating electrodes. That is, the directors of the liquid crystal molecules 31 may be induced toward the center portion of the region of the field generating electrodes from each portion where the edges of the pixel electrode, extending in different directions, meet, e.g., the directors may extend from the edges and vertices of pixel electrode 191 toward a center portion of pixel electrode 191, i.e., the directors may converge upon the center portion of pixel electrode 191. The plurality of cutouts 91 may be disposed along the entire edge of the pixel electrode, or may be formed in a portion of the edge of the pixel electrode.

Further, the liquid crystal display includes a storage electrode at least partially overlapping a first pixel electrode 191h, two first vertical storage electrodes 127a extending upward, a first horizontal storage electrode 127b connecting the two first vertical storage electrodes 127a, and a first central horizontal storage electrode 127c separated from the first horizontal storage electrode 127b to connect the two first vertical storage electrodes 127a. The first vertical storage electrode 127a and the first horizontal storage electrode 127b are disposed along the edge of the first pixel electrode 191h and, as such, at least partially overlap the first pixel electrode 191h.

In addition, the liquid crystal display includes two second vertical storage electrodes 128a at least partially overlapping the second pixel electrode 191l and a second horizontal storage electrode 128b connecting the two second vertical storage electrodes 128a.

The second vertical storage electrode 128a and the second horizontal storage electrode 128b are disposed along the edge of the second pixel electrode 191l and, as such, at least partially overlap the second pixel electrode 191l.

The first central horizontal storage electrode 127c of the liquid crystal display covers a texture exposing a longitudinal axis of liquid crystal 31 in the first and second pixel electrodes 191l when the liquid crystal display is viewed from the left side or the right side of the display.

As described, the liquid crystal display includes the storage electrodes formed along the edges of the plurality of subregions Da, Db, Dc, and Dd of the pixel electrode 191 and at least partially overlapping the pixel electrode 191, such that the storage capacity can be assured. At the same time, the texture that may be generated from the interface of the plurality of subregions Da, Db, Dc, and Dd of the pixel electrode 191 can be covered, and accordingly, deterioration of display quality in the interface of the subregions Da, Db, Dc, and Dd can be prevented.

It is noted that the features of the liquid crystal display illustrated in FIGS. 27 and 28 may be implemented in association with the liquid crystal display of FIG. 39. In addition, the features and effects of the various constituent elements (or components) of the previously described exemplary embodiments may be the same as the corresponding constituent elements of the exemplary embodiments of FIG. 39.

Figure 40:
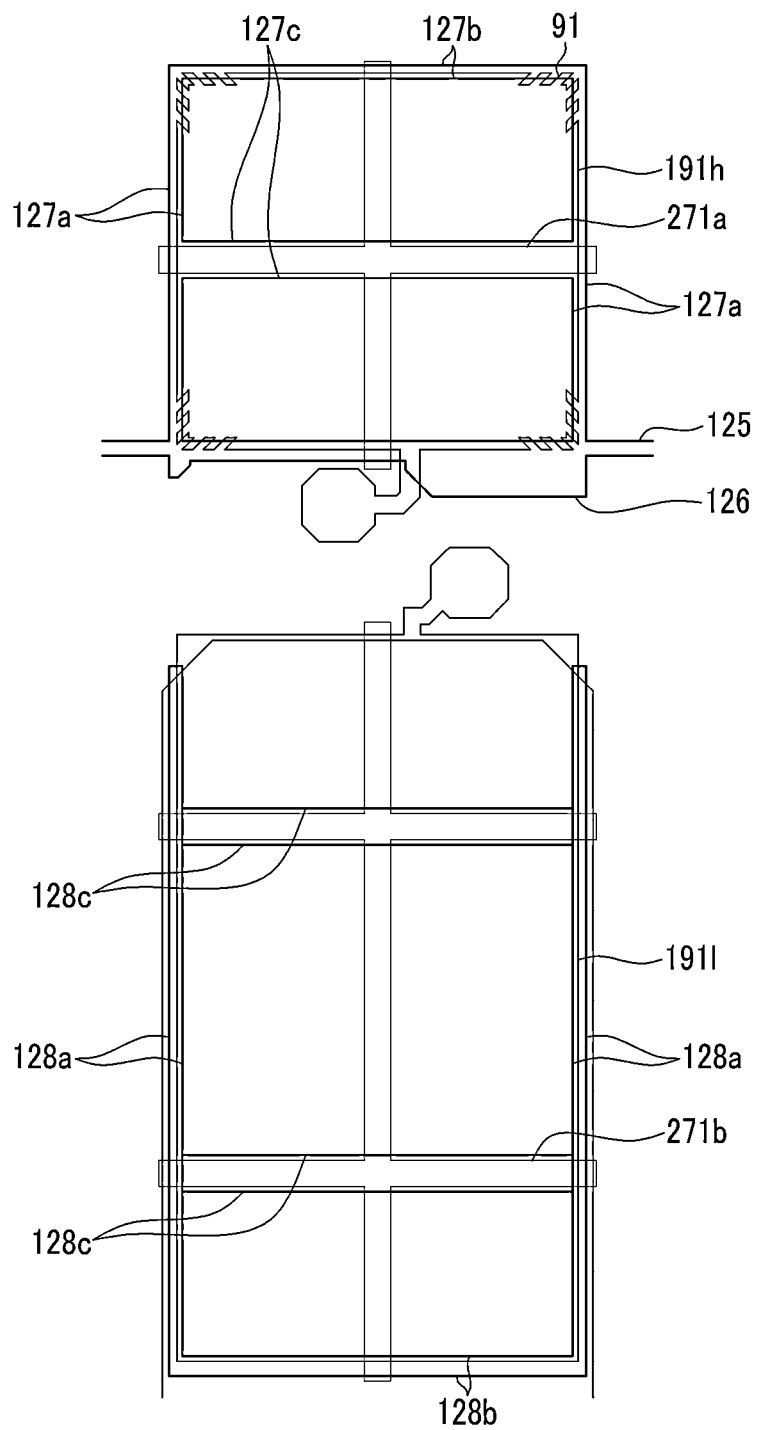
FIG. 40 is a plan view of a region of a field generating electrode and a storage electrode of the liquid crystal display of FIG. 39, according to exemplary embodiments.

FIG. 40 is a plan view of a region of a field generating electrode and a storage electrode of a liquid crystal display, according to exemplary embodiments.

Referring to FIG. 40, the region of the field generating electrode and the storage electrode of the liquid crystal display are similar to those described in association with FIG. 39. As such, to avoid unnecessarily obscuring exemplary embodiments described herein, similar descriptions for similar components are omitted.

However, unlike the field generating electrode and the storage electrode of the liquid crystal display shown in FIG. 39, the region of the field generating electrode and the storage electrode of the liquid crystal display of FIG. 40 includes a second vertical storage electrode 128a and a second horizontal storage electrode 128b that at least partially overlap the second pixel electrode 191l, and further includes a second central horizontal storage electrode 128c overlapping a horizontal portion of a cross-shaped second cutout 271a, disposed corresponding to the second pixel electrode 191l.

According to exemplary embodiments, a storage electrode line 125 includes a storage electrode at least partially overlapping the first pixel electrode 191h, two first vertical storage electrodes 127a extending upward, a first horizontal storage electrode 127b connecting the two first vertical storage electrodes 127a, and a first central horizontal storage electrode 127c separated from the first horizontal storage electrode 127b to connect the two first vertical storage electrodes 127a.

The first vertical storage electrode 127a and the first horizontal storage electrode 127b are disposed along the edge of the first pixel electrode 191h and, as such, at least partially overlap the first pixel electrode 191h.

In addition, the storage electrode line 125 includes two second vertical storage electrodes 128a at least partially overlapping the second pixel electrode 191l, a second horizontal storage electrode 128b connecting the two second vertical storage electrodes 128a, and a second central horizontal storage electrode 128c disposed corresponding to a horizontal portion of a cross-shaped second cutout 271b to connect the two second vertical storage electrodes 128a. The second vertical storage electrode 128a, the second horizontal storage electrode 128b, and the second central horizontal storage electrode 128c are disposed along the edge of the second pixel electrode 191l and, as such, at least partially overlap the second pixel electrode 191l.

The first central horizontal storage electrode 127c and the second central horizontal storage electrode 128c of the liquid crystal display are configured to cover a texture exposing a longitudinal axis of liquid crystal 31 in the first and second pixel electrodes 191l when the liquid crystal display is viewed from the left side or the right side of the display.

As described, the liquid crystal display includes the storage electrodes formed along the edges of the plurality of subregions Da, Db, Dc, and Dd of the pixel electrode 191 and at least partially overlapping the pixel electrode 191, such that the storage capacity can be assured. At the same time, the texture that may be generated from the interface of the plurality of subregions Da, Db, Dc, and Dd of the pixel electrode 191 can be covered, and accordingly, deterioration of display quality in the interface of the subregions Da, Db, Dc, and Dd can be prevented.

It is noted that the features of the liquid crystal display illustrated in FIGS. 27 and 28, and the features of the liquid crystal display described in conjunction with FIG. 39, may be implemented in association with the liquid crystal display of FIG. 40. In addition, the features and effects of the various constituent elements (or components) of the previously described exemplary embodiments may be the same as the corresponding constituent elements of the exemplary embodiments of FIG. 40.

Figure 41:
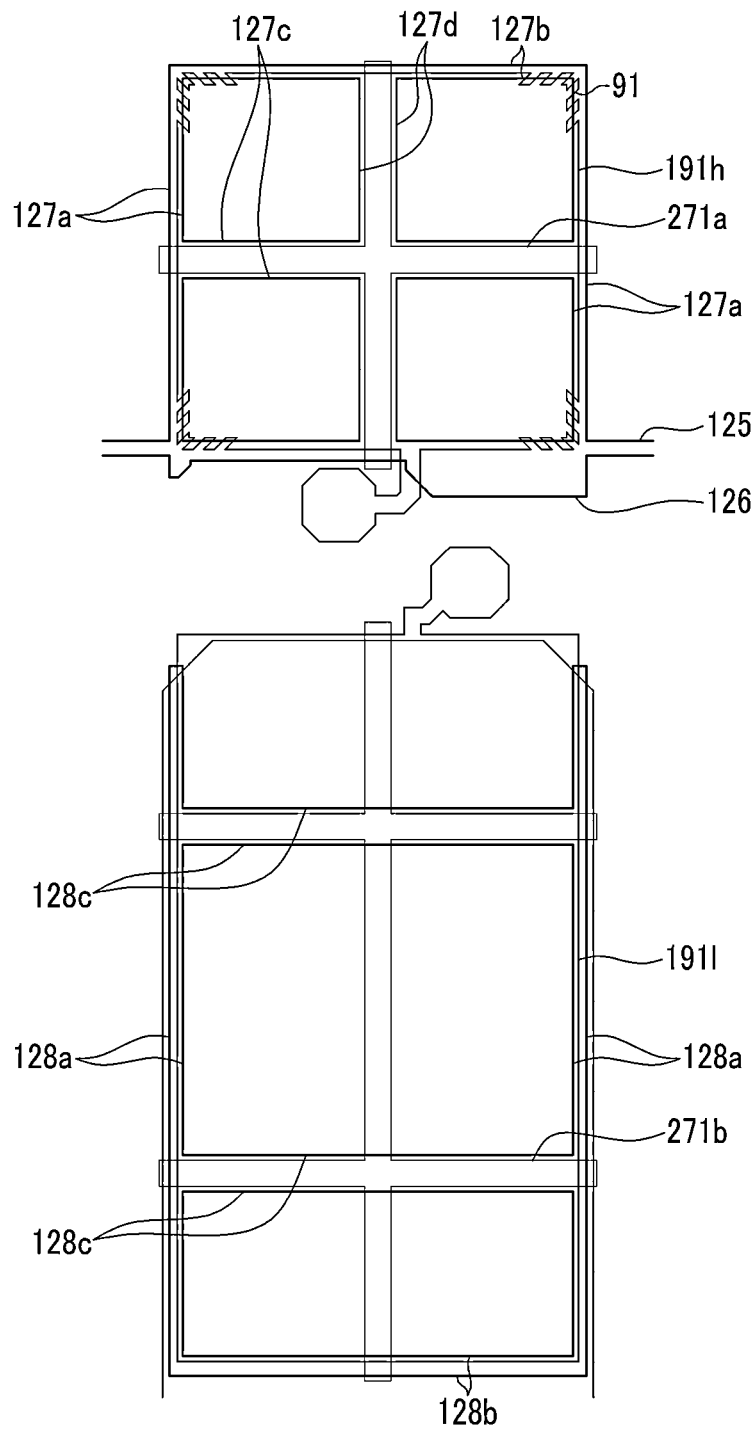
FIG. 41 is a plan view of a region of a field generating electrode and a storage electrode of the liquid crystal display of FIG. 39, according to exemplary embodiments.

FIG. 41 is a plan view of a region of a field generating electrode and a storage electrode of a liquid crystal display, according to exemplary embodiments.

Referring to FIG. 41, the region of the field generating electrode and the storage electrode of the liquid crystal display are similar to those described in connection with FIG. 39. As such, to avoid unnecessarily obscuring exemplary embodiments described herein, similar descriptions for similar components are omitted.

However, unlike the region of the field generating electrode and the storage electrode of the liquid crystal display described with reference to FIG. 39, the liquid crystal display of FIG. 41 includes two first vertical storage electrodes 127a at least partially overlapping a first pixel electrode 191h, a first horizontal storage electrode 127b connecting the two first vertical storage electrodes 127a, and a first central vertical storage electrode 127c separated from the first horizontal storage electrode 127b to connect the two first vertical storage electrodes 127a and overlapping a horizontal portion of a first cross-shaped cutout 271a. The liquid crystal display further includes a first central vertical storage electrode 127d that overlaps a vertical portion of the first cutout 271a.

According to exemplary embodiments, a storage electrode line 125 includes a storage electrode at least partially overlapping the first pixel electrode 191h, two first vertical storage electrodes 127a extending upward, a first horizontal storage electrode 127b connecting the two first vertical storage electrodes 127a, a first central horizontal storage electrode 127c separated from the first horizontal storage electrode 127b to connect the two first vertical storage electrodes 127a and overlapping a horizontal portion of the cross-shaped first cutout 271a, and a first central vertical storage electrode 127d overlapping a vertical portion of the first cutout 271a.

The first vertical storage electrode 127a and the first horizontal storage electrode 127b are disposed along the edge of the first pixel electrode 191h and, as such, at least partially overlap the first pixel electrode 191h.

The first central horizontal storage electrode 127c and the first central vertical storage electrode 127d overlap the cross-shaped first cutout 271a.

In addition, the storage electrode line 125 includes a second central horizontal storage electrode 128c overlapping a horizontal portion of a cross-shaped second cutout 271b disposed corresponding to the second pixel electrode 191l. It is noted that the second central horizontal storage electrode 128c is in addition to a second vertical storage electrode 128a at least partially overlapping the second pixel electrode 191l and a second horizontal storage electrode 128b.

The first central horizontal storage electrode 127c is configured to cover a texture exposing a longitudinal axis of liquid crystal 31 in the first pixel electrode 191h when the liquid crystal display is viewed from the left side or the right side of the display. The first central vertical storage electrode 127d is configured to cover a texture exposing a longitudinal axis of liquid crystal in the first pixel electrode 191h when the liquid crystal display is viewed from the upper side or the lower side of the display.

In general, in an interface of a cross-shape cutout, longitudinal axes of liquid crystal molecules are arranged in a direction that is perpendicular to the cross-shaped cutout. Thus, the longitudinal axes of the liquid crystal molecules are arranged in a vertical direction in the interface of the horizontal portion of the cross-shaped cutout, and as such, texture associated with the longitudinal axes of the liquid crystal molecules may be viewed when the liquid crystal display is viewed from the left side or the right side of the display. The longitudinal axes of the liquid crystal molecules are arranged in a horizontal direction in the interface of the vertical portion of the cross-shaped cutout, and as such, texture associated with the longitudinal axes of the liquid crystal molecules may be viewed when the liquid crystal display is viewed from the upper side or the lower side of the display.

However, since the liquid crystal display of FIG. 41 includes the first central horizontal storage electrode 127c, the first central vertical storage electrode 127d, the second central horizontal storage electrode 128c, and the second central vertical storage electrode 128d arranged in locations overlapping the horizontal portion and the vertical portion of the cross-shaped cutout, the texture that may be viewed at edges of the subregions Da, Db, Dc, and Dd of the first pixel electrode 191h that exhibits relatively high luminance can be covered. As such, deterioration of display quality in the interfaces of the subregions Da, Db, Dc, and Dd can be prevented.

In addition, since the second central horizontal storage electrode 128c overlapping the second pixel electrode 191l is included, the texture exposing the longitudinal axes in the first and second pixel electrodes 191h and 191l can be covered when the liquid crystal display is viewed from the left side or the right side of the display.

As described, the liquid crystal display includes the storage electrodes formed along the edges of the plurality of subregions Da, Db, Dc, and Dd of the pixel electrode 191 and at least partially overlapping the pixel electrode 191, such that the storage capacity can be assured. At the same time, the texture that may be generated from the interface of the plurality of subregions Da, Db, Dc, and Dd of the pixel electrode 191 can be covered, and accordingly, deterioration of display quality in the interface of the subregions Da, Db, Dc, and Dd can be prevented.

It is noted that the features of the liquid crystal display illustrated in FIGS. 27 and 28, and the features of the liquid crystal display described in conjunction with FIG. 39, may be implemented in associated with the liquid crystal display of FIG. 41. In addition, the features and effects of the various constituent elements (or components) of the previously described exemplary embodiments may be the same as the corresponding constituent elements of the exemplary embodiments of FIG. 41.

Figure 42:
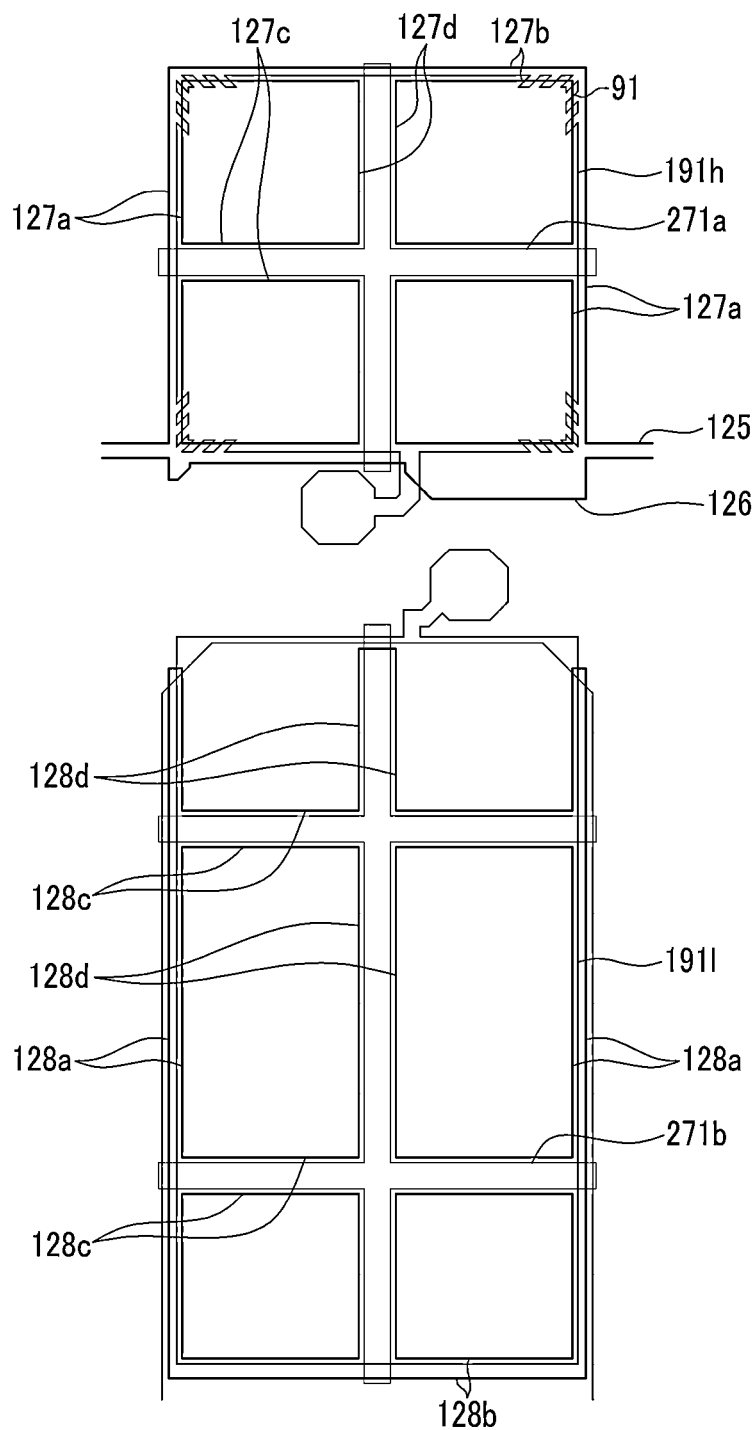
FIG. 42 is a plan view of a region of a field generating electrode and a storage electrode of the liquid crystal display of FIG. 39, according to exemplary embodiments.

FIG. 42 is a plan view of a region of a field generating electrode and a storage electrode of a liquid crystal display, according to exemplary embodiments.

Referring to FIG. 42, the region of the field generating electrode and the storage electrode of the liquid crystal display are similar to those described in association with FIG. 39. As such, to avoid unnecessarily obscuring exemplary embodiments described herein, similar descriptions for similar components are omitted.

However, unlike the region of the field generating electrode and the storage electrode of the liquid crystal display described with reference to FIG. 39, the liquid crystal display of FIG. 42 includes two first vertical storage electrodes 127a at least partially overlapping a first pixel electrode 191h, a first horizontal storage electrode 127b connecting the two first vertical storage electrodes 127a, a first central vertical storage electrode 127c separated from the first horizontal storage electrode 127b to connect the two first vertical storage electrodes 127a and overlapping a horizontal portion of a first cross-shaped cutout 271a, and a first central vertical storage electrode 127d overlapping a vertical portion of the first cutout 271a. The liquid crystal display further includes a first central vertical storage electrode 127d overlapping a vertical portion of the first cutout 271a. In addition, two second vertical storage electrodes 128a at least partially overlapping the second pixel electrode 191l, a second horizontal storage electrode 128b connecting the two second vertical storage electrodes 128a, a second central horizontal storage electrode 128c disposed corresponding to a horizontal portion of a cross-shaped second cutout 271b to connect the two second vertical storage electrodes 128a, and a second central vertical storage electrode 128d overlapping a vertical portion of the second cutout 271b are further included.

According to exemplary embodiments, a storage electrode line 125 includes a storage electrode at least partially overlapping the first pixel electrode 191h, two first vertical storage electrodes 127a extending upward, a first horizontal storage electrode 127b connecting the two first vertical storage electrodes 127a, a first central horizontal storage electrode 127c separated from the first horizontal storage electrode 127b to connect the two first vertical storage electrodes 127a and overlapping a horizontal portion of the cross-shaped first cutout 271a, and a first central vertical storage electrode 127d overlapping a vertical portion of the first cutout 271a.

The first vertical storage electrode 127a and the first horizontal storage electrode 127b are disposed along the edge of the first pixel electrode 191h and, as such, at least partially overlap the first pixel electrode 191h. The first central horizontal storage electrode 127c and the first central vertical storage electrode 127d overlap the cross-shaped first cutout 271a.

In addition, the storage electrode line 125 includes two second vertical storage electrodes 128a at least partially overlapping the second pixel electrode 191l, the second horizontal storage electrode 128b connecting the two second vertical storage electrodes 128a, the second central horizontal storage electrode 128c connecting the two second vertical storage electrodes 128a and overlapping the horizontal portion of the cross-shaped second cutout 271b, and the second central vertical storage electrode 128d overlapping the vertical portion of the second cutout 271b.

The second vertical storage electrode 128a and the second horizontal storage electrode 128b are disposed along the edge of the second pixel electrode 191l and, as such, at least partially overlap the second pixel electrode 191l. The second central horizontal storage electrode 128c and the second central vertical storage electrode 128d overlap the cross-shaped second cutout 271b.

The first central horizontal storage electrode 127c covers a texture exposing a longitudinal axis of liquid crystal in the first pixel electrode 191h when the liquid crystal display is viewed from the left side or the right side of the display. The first central vertical storage electrode 127d covers a texture exposing a longitudinal axis of liquid crystal in the first pixel electrode 191h when the liquid crystal display is viewed from the upper side or the lower side of the display. In addition, the second central horizontal storage electrode 128c covers a texture exposing a longitudinal axis of liquid crystal in the second pixel electrode 191l when the liquid crystal display is viewed from the left side or the right side of the display, and the second central vertical storage electrode 128d covers a texture exposing a longitudinal axis of liquid crystal in the second pixel electrode 191l when the liquid crystal display is viewed from the upper side or the lower side of the display.

In general, in an interface of a cross-shape cutout, longitudinal axes of liquid crystal molecules are arranged in a direction that is perpendicular to the cross-shaped cutout. Thus, the longitudinal axes of the liquid crystal molecules are arranged in a vertical direction in the interface of the horizontal portion of the cross-shaped cutout, and as such, texture associated with the longitudinal axes of the liquid crystal molecules may be viewed when the liquid crystal display is viewed from the left side or the right side of the display. The longitudinal axes of the liquid crystal molecules are arranged in a horizontal direction in the interface of the vertical portion of the cross-shaped cutout, and as such, texture associated with the longitudinal axes of the liquid crystal molecules may be viewed when the liquid crystal display is viewed from the upper side or the lower side of the display.

However, since the liquid crystal display of FIG. 42 includes the first central horizontal storage electrode 127c, the first central vertical storage electrode 127d, the second central horizontal storage electrode 128c, the second central vertical storage electrode 128d arranged in locations overlapping the horizontal portion and the vertical portion of the cross-shaped cutout, the texture that may be viewed at edges of the subregions Da, Db, Dc, and Dd of the first pixel electrode 191h that exhibits relatively high luminance can be covered, and accordingly, deterioration of display quality in the interfaces of the subregions Da, Db, Dc, and Dd can be prevented.

As described, the liquid crystal display of FIG. 42 includes the storage electrodes formed along the edges of the plurality of subregions Da, Db, Dc, and Dd of the pixel electrode 191 and at least partially overlapping the pixel electrode 191, such that the storage capacity can be assured. At the same time, the texture that may be generated from the interface of the plurality of subregions Da, Db, Dc, and Dd of the pixel electrode 191 can be covered, and accordingly, deterioration of display quality in the interface of the small regions can be prevented.

It is noted that the features of the liquid crystal display illustrated in association with FIGS. 27 and 28, and the features of the liquid crystal display described in connection with FIG. 39, may be implemented in association with the liquid crystal display of FIG. 42. In addition, the features and effects of the various constituent elements (or components) of the previously described exemplary embodiments may be the same as the corresponding constituent elements of the exemplary embodiments of FIG. 42.

Figure 43:
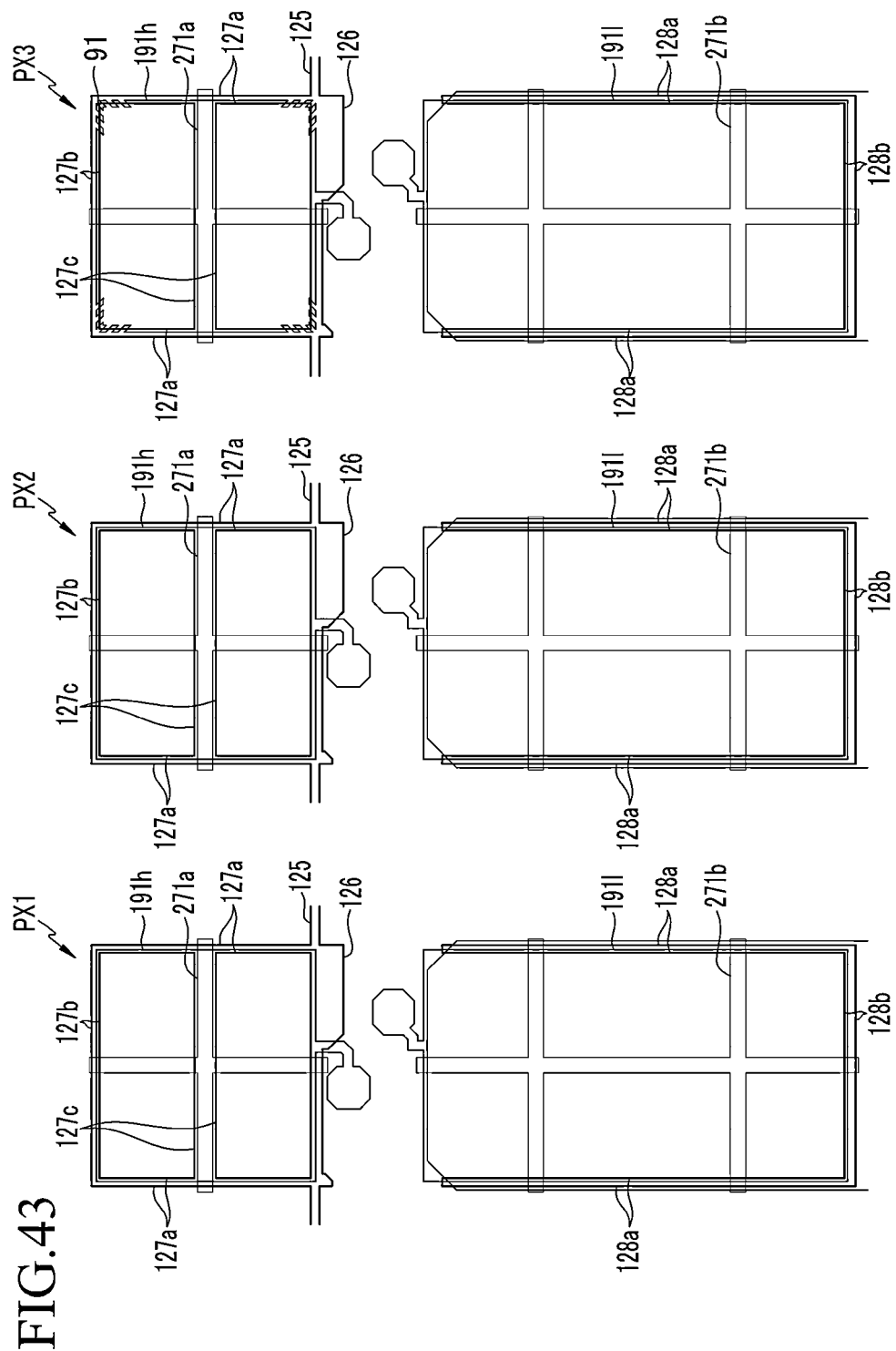
FIG. 43 is a layout view of a region of a field generating electrode of a plurality of pixels of a liquid crystal display, according to exemplary embodiments.

FIG. 43 is a layout view of a region of a field generating electrode of a plurality of pixels of a liquid crystal display, according to exemplary embodiments.

Referring to FIG. 43, the liquid crystal display includes a first pixel PX1, a second pixel PX2, and a third pixel PX2 that are arranged adjacent to one another.

A first pixel electrode 191h of each of the first and second pixels PX1 and PX2 do not include a plurality of cutouts 91 disposed in the edge thereof, such as described in association with FIG. 29. Like the liquid crystal display described in connection with FIG. 39, a first pixel electrode 191h of the third pixel PX3 includes a plurality of cutouts 91 disposed in a direction parallel with a direction toward a center portion of the basic region of the field generating electrode from each portion where edges of the first pixel electrode 191h, extending in different directions, meet. The plurality of pixels may present one of any suitable color, such as one of the primary colors, e.g., red, green, and blue. The third pixel PX3 may be a pixel configured to present a blue color.

Since the plurality of cutouts 91 are disposed in the third pixel PX3 associated with the blue color, an arrangement direction of directors of liquid crystal molecules 31 is strongly induced in the "blue" pixel. As such, arrangement of liquid crystal directors in the edge of the region of the field generating electrode can be induced to a desired direction. That is, the liquid crystal molecules 31 of the liquid crystal layer 3 may be arranged toward a center portion of the region of the field generating electrode from each portion where edges of the pixel electrode, extending in different directions, meet, e.g., directions extending from the edges of the pixel electrode 191 and converging upon the center portion of the region of the field generating electrode. Accordingly, color reproducibility of the blue pixel can be improved by facilitating a plurality of domains disposed in the blue pixel. Accordingly, a yellowish effect of the liquid crystal display can be prevented. As previously described, the plurality of cutouts 91 disposed in the first pixel electrode 191h of the third pixel PX3 may be disposed along the entire edge of the first pixel electrode 191h or may be formed in a part of the edge of the first pixel electrode 191h.

In addition, the liquid crystal display includes storage electrodes at least partially overlapping the first pixel electrode 191h. That is, two first vertical storage electrodes 127a extending upward, a first horizontal storage electrode connecting the two first vertical storage electrodes 127a, and a first central horizontal storage electrode 127c separated from the first vertical storage electrode 127b and connecting the two first vertical storage electrodes 127a. The first vertical storage electrode 127a and the first horizontal storage electrode 127b are disposed along the edge of the first pixel electrode 191h and, as such, at least partially overlap the first pixel electrode 191h.

In addition, two second vertical storage electrodes 128a at least partially overlapping the second pixel electrode 191l and a second horizontal storage electrode 128b connecting the two second vertical storage electrodes 128a are included.

The second vertical storage electrode 128a and the second horizontal storage electrode 128b are disposed along the edge of the second pixel electrode 191l and, as such, at least partially overlap the second pixel electrode 191l.

The first central horizontal storage electrode 127c of the liquid crystal display is configured to cover a texture that exposes a longitudinal axis of liquid crystal 31 in the first and second pixel electrodes 191h and 191l when the liquid crystal display is viewed from the left side or the right side of the liquid crystal display.

As described, the liquid crystal display includes the storage electrodes formed along the edges of the plurality of subregions Da, Db, Dc, and Dd of the pixel electrode 191 and at least partially overlapping the pixel electrode 191, such that the storage capacity can be assured. At the same time, the texture that may be generated from the interface of the plurality of subregions Da, Db, Dc, and Dd of the pixel electrode 191 can be covered, and accordingly, deterioration of display quality in the interface of the subregions Da, Db, Dc, and Dd can be prevented.

It is noted that the features of the liquid crystal display illustrated in FIGS. 27 and 28, and the features of the liquid crystal display described with reference to FIG. 39, may be implemented in association with the liquid crystal display of FIG. 43. In addition, the features and effects of the various constituent elements of the previously described exemplary embodiments may be the same as the corresponding constituent elements of the exemplary embodiments of FIG. 43.

According to exemplary embodiments, it is possible to broaden a viewing angle of a liquid crystal display and increase a response speed, visibility, cutout ratio, and transmittance, as well as prevent deterioration of display quality in edge portions of the pixel electrode and the domain interface. Further, deterioration of display quality and luminance of the liquid crystal display can be prevented by preventing coupling effects between the data line and the common electrode, and the liquid crystal display device yield can be improved.

As described, the liquid crystal display includes the storage electrodes disposed along the edges of the plurality of subregions of the pixel electrode and at least partially overlapping the pixel electrode, such that the storage capacity can be assured. At the same time the texture that may be generated from the interface of the plurality of subregions of the pixel electrode can be covered, and accordingly, deterioration of display quality in the interface of the small regions can be prevented.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A liquid crystal display, comprising:
a first substrate;
a pixel electrode disposed on the first substrate, the pixel electrode comprising a first subpixel electrode portion and a second subpixel electrode portion separated from the first subpixel electrode portion;
a second substrate facing the first substrate;
a common electrode disposed on the second substrate; and
a liquid crystal layer disposed between the first substrate and the second substrate,
wherein the common electrode comprises:
a first cross-shaped cutout overlapping the pixel electrode;
a second cutout disposed adjacent to an edge of the pixel electrode, the second cutout being spaced apart from the pixel electrode in a plan view; and
a third cutout disposed adjacent to the edge of the pixel electrode, the third cutout being aligned with the second cutout in a first direction, and
wherein an extension of the first cross-shaped cutout longitudinally extends along an imaginary line extending in a space separating the second cutout from the third cutout, the imaginary line extending in a second direction crossing the first direction.

2. The liquid crystal display of claim 1, wherein, when the width of the first cross-shaped cutout is W1 and the width of each of the plurality of second cutouts is W2, W1 is equal to or greater than W2.

3. The liquid crystal display of claim 2, wherein W1 and W2 satisfy the following inequality:

$W2 \leq W1 \leq 2W2$.

4. The liquid crystal display of claim 2, further comprising:
a data line connected to the pixel electrode,
wherein at least a portion of at least some of the plurality of second cutouts overlap at least a portion of the data line.

5. The liquid crystal display of claim 4, wherein, in the plan view, an end portion of at least one extension of the first cross-shaped cutout protrudes beyond the edge of the pixel electrode.

6. The liquid crystal display of claim 5, further comprising:
a first alignment layer disposed on the first substrate; and
a second alignment layer disposed on the second substrate,
wherein at least one of the liquid crystal layer, the first alignment layer, and the second alignment layer comprises a photosensitive material.

7. The liquid crystal display of claim 6, wherein liquid crystal molecules of the liquid crystal layer are arranged substantially perpendicular to the surfaces of the first and second substrates when no electric field is imposed on the liquid crystal layer.

8. The liquid crystal display of claim 7, wherein the liquid crystal molecules of the liquid crystal layer are arranged to comprise a pretilt condition converging toward a center portion of the first cross-shaped cutout from the edges of the pixel electrode.

9. The liquid crystal display of claim 8, wherein the pixel electrode is divided into a plurality of subregions, and each subregion is associated with liquid crystal molecules of the liquid crystal layer that are arranged to comprise a pretilt condition in a different direction than the other pretilt directions of the other subregions.

10. The liquid crystal display of claim 7, wherein the pixel electrode comprises:
at least one cutout formed in a vertex of the pixel electrode and extends along a portion of at least one of the edges defining the vertex.

11. The liquid crystal display of claim 7, wherein the width of the pixel electrode is increased from two opposing edges of the pixel electrode toward a center portion of the pixel electrode.

12. The liquid crystal display of claim 7, wherein the pixel electrode comprises:
a cutout adjacent to at least one of the edges of the pixel electrode and disposed parallel to and along the at least one edge.

13. The liquid crystal display of claim 1, further comprising:
a data line connected to the pixel electrode,
wherein at least a portion of at least some of the plurality of second cutouts overlap at least a portion of the data line.

14. The liquid crystal display of claim 13, wherein, in the plan view, at least one edge of the first cross-shaped cutout protrudes beyond the edge of the pixel electrode.

15. The liquid crystal display of claim 14, further comprising:
a first alignment layer disposed on the first substrate; and
a second alignment layer disposed on the second substrate,
wherein at least one of the liquid crystal layer, the first alignment layer, and the second alignment layer comprises a photosensitive material.

16. The liquid crystal display of claim 15, wherein liquid crystal molecules of the liquid crystal layer are arranged substantially perpendicular to the surfaces of the first and second substrates when no electric field is imposed on the liquid crystal layer.

17. The liquid crystal display off claim 16, wherein the liquid crystal molecules of the liquid crystal layer are arranged to comprise a pretilt condition converging toward a center portion of the first cross-shaped cutout from a vertex of the pixel electrode.

18. The liquid crystal display of claim 17, wherein the pixel electrode is divided into a plurality of subregions, and each subregion is associated with liquid crystal molecules of the liquid crystal layer that are arranged to comprise a pretilt condition in a different direction than the other pretilt directions of the other subregions.

19. The liquid crystal display of claim 16, wherein the pixel electrode comprises:
at least one cutout formed in a vertex of the pixel electrode and extends along a portion of at least one of the edges of the pixel electrode defining the vertex.

20. The liquid crystal display of claim 16, wherein the width of the pixel electrode is increased from two opposing edges of the pixel electrode toward a center portion of the pixel electrode.

21. The liquid crystal display of claim 16, wherein the pixel electrode comprises:
a cutout adjacent to at least one of the edges of the pixel electrode and disposed parallel to and along the at least one edge.

22. The liquid crystal display of claim 1, wherein, in the plan view, an end portion of at least one extension of the first cross-shaped cutout protrudes beyond the edge of the pixel electrode.

23. The liquid crystal display of claim 22, further comprising:
a first alignment layer disposed on the first substrate; and
a second alignment layer disposed on the second substrate,
wherein at least one of the liquid crystal layer, the first alignment layer, and the second alignment layer comprises a photosensitive material.

24. The liquid crystal display of claim 23, wherein liquid crystal molecules of the liquid crystal layer are arranged substantially perpendicular to the surfaces of the first and second substrates when no electric field is imposed on the liquid crystal layer.

25. The liquid crystal display of claim 24, wherein the liquid crystal molecules of the liquid crystal layer are arranged to comprise a pretilt condition converging toward a center portion of the first cross-shaped cutout from the edges of the pixel electrode.

26. The liquid crystal display of claim 25, wherein the pixel electrode is divided into a plurality of subregions, and each subregion is associated with liquid crystal molecules of the liquid crystal layer that are arranged to comprise a pretilt condition in a different direction than the other pretilt directions of the other subregions.

27. The liquid crystal display of claim 24, wherein the pixel electrode comprises:
at least one cutout formed in a vertex of the pixel electrode and extends along a portion of at least one of the edges defining the vertex.

28. The liquid crystal display of claim 24, wherein the width of the pixel electrode is increased from two opposing edges of the pixel electrode toward a center portion of the pixel electrode.

29. The liquid crystal display of claim 24, wherein the pixel electrode comprises:

a cutout adjacent to at least one of the edges of the pixel electrode and disposed parallel to and along the at least one edge.

30. The liquid crystal display of claim 1, further comprising:
a first alignment layer disposed on the first substrate; and
a second alignment layer disposed on the second substrate,
wherein at least one of the liquid crystal layer, the first alignment layer, and the second alignment layer comprises a photosensitive material.

31. The liquid crystal display of claim 30, wherein liquid crystal molecules of the liquid crystal layer are arranged substantially perpendicular to the surfaces of the first and second substrates when no electric field is imposed on the liquid crystal layer.

32. The liquid crystal display of claim 31, wherein the liquid crystal molecules of the liquid crystal layer are arranged to comprise a pretilt condition converging toward a center portion of the first cross-shaped cutout from a vertex of the pixel electrode.

33. The liquid crystal display of claim 32, wherein the pixel electrode is divided into a plurality of subregions, and each subregion is associated with liquid crystal molecules of the liquid crystal layer that are arranged to comprise a pretilt in a different direction than the other pretilt directions of the other subregions.

34. The liquid crystal display of claim 31, wherein the pixel electrode comprises:
at least one cutout formed in a vertex of the pixel electrode and extends along a portion of at least one of the edges of the pixel electrode defining the vertex.

35. The liquid crystal display of claim 31, wherein the width of the pixel electrode is increased from two opposing edges of the pixel electrode toward a center portion of the pixel electrode.

36. The liquid crystal display of claim 31, wherein the pixel electrode comprises:
a cutout adjacent to at least one of the edges of the pixel electrode and disposed parallel to and along the at least one edge.

37. The liquid crystal display of claim 1, wherein liquid crystal molecules of the liquid crystal layer are arranged substantially perpendicular to the surfaces of the first and second substrates when no electric field is imposed on the liquid crystal layer.

38. The liquid crystal display of claim 37, wherein the liquid crystal molecules of the liquid crystal layer are arranged to comprise a pretilt condition converging toward a center portion of the first cross-shaped cutout from a vertex of the pixel electrode.

39. The liquid crystal display of claim 38, wherein the pixel electrode is divided into a plurality of subregions, and each subregion is associated with liquid crystal molecules of the liquid crystal layer that are arranged to comprise a pretilt condition in a different direction than the other pretilt directions of the other subregions.

40. The liquid crystal display of claim 37, wherein the pixel electrode comprises:
at least one cutout formed in a vertex of the pixel electrode and extends along a portion of at least one of the edges of the pixel electrode defining the vertex.

41. The liquid crystal display of claim 37, wherein the width of the pixel electrode is increased from two opposing edges of the pixel electrode toward a center portion of the pixel electrode.

42. The liquid crystal display of claim 37, wherein the pixel electrode comprises:
a cutout adjacent to at least one of the edges of the pixel electrode and disposed parallel to and along the at least one edge.

43. The liquid crystal display of claim 1, wherein the pixel electrode comprises:
at least one cutout formed in a vertex of the pixel electrode and extends along a portion of at least one of the edges of the pixel electrode defining the vertex.

44. The liquid crystal display of claim 1, wherein the width of the pixel electrode is increased from two opposing edges of the pixel electrode toward a center portion of the pixel electrode.

45. The liquid crystal display of claim 1, wherein the pixel electrode comprises:
a cutout adjacent to at least one of the edges of the pixel electrode and disposed parallel to and along the at least one edge.

* * * * *